US009736491B2

(12) United States Patent
Nakamura et al.

(10) Patent No.: US 9,736,491 B2
(45) Date of Patent: *Aug. 15, 2017

(54) MOVING PICTURE CODING DEVICE, MOVING PICTURE CODING METHOD, AND MOVING PICTURE CODING PROGRAM

(71) Applicant: JVC KENWOOD Corporation, Yokohama-shi (JP)

(72) Inventors: Hiroya Nakamura, Yokohama (JP); Masayoshi Nishitani, Yokohama (JP); Shigeru Fukushima, Yokohama (JP); Motoharu Ueda, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,518

(22) Filed: Jan. 10, 2017

(65) Prior Publication Data
US 2017/0150168 A1    May 25, 2017

Related U.S. Application Data

(63) Continuation of application No. 14/607,951, filed on Jan. 28, 2015, now Pat. No. 9,635,381, which is a (Continued)

(30) Foreign Application Priority Data

May 31, 2011 (JP) .................. 2011-122770
May 31, 2011 (JP) .................. 2011-122771

(51) Int. Cl.
*H04N 7/12* (2006.01)
*H04N 11/02* (2006.01)
(Continued)

(52) U.S. Cl.
CPC ......... *H04N 19/513* (2014.11); *H04N 19/105* (2014.11); *H04N 19/172* (2014.11); *H04N 19/176* (2014.11); *H04N 19/184* (2014.11)

(58) Field of Classification Search
None
See application file for complete search history.

(56) References Cited

U.S. PATENT DOCUMENTS 5,608,458 A   3/1997 Chen et al.
8,824,555 B2  9/2014 Laroche et al.
(Continued)

FOREIGN PATENT DOCUMENTS

CN   1523896 A   8/2004
CN   1960496 A   5/2007
(Continued)

OTHER PUBLICATIONS

ISO/IEC 14496-10 Information technology—Coding of audio-visual objects—part 10: Advanced Video Coding.
(Continued)

*Primary Examiner* — Talha M Nawaz
(74) *Attorney, Agent, or Firm* — Venable LLP; Michael A. Sartori; F. Brock Riggs

(57) ABSTRACT

A motion vector predictor candidate generation unit derives a plurality of motion vector predictor candidates by prediction from first coded prediction blocks neighboring a prediction block subject to coding within the same picture as the prediction block subject to coding, or from a second coded prediction block located at the same position as or in the neighborhood of the prediction block subject to coding in a picture different from that of the prediction block subject to coding, and adds the derived motion vector predictor candidates in a motion vector predictor candidate. The motion vector predictor candidate generation unit determines, for
(Continued)

the purpose of obtaining a predetermined number of motion vector predictor candidates, which of first coded prediction blocks provides the motion vector from which to derive the motion vector predictor candidate, organizing the blocks in the order of priority.

3 Claims, 48 Drawing Sheets

Related U.S. Application Data continuation of application No. 14/092,560, filed on Nov. 27, 2013, now Pat. No. 8,976,867, which is a continuation of application No. PCT/JP2012/003540, filed on May 30, 2012.

(51) Int. Cl.
  *H04N 11/04* (2006.01)
  *H04N 19/513* (2014.01)
  *H04N 19/105* (2014.01)
  *H04N 19/176* (2014.01)
  *H04N 19/172* (2014.01)
  *H04N 19/184* (2014.01)

(56) References Cited

U.S. PATENT DOCUMENTS

| | | |
|---|---|---|
| 2007/0009050 A1 | 1/2007 | Wang et al. |
| 2007/0081587 A1 | 4/2007 | Raveendran et al. |
| 2007/0081588 A1 | 4/2007 | Raveendran et al. |
| 2008/0092005 A1 | 4/2008 | Huott et al. |
| 2011/0194608 A1 | 8/2011 | Rusert et al. |
| 2013/0070857 A1 | 3/2013 | Kondo |
| 2013/0188716 A1* | 7/2013 | Seregin ............... H04N 19/56 375/240.16 |
| 2013/0229485 A1 | 9/2013 | Rusanovskyy et al. |
| 2013/0243093 A1* | 9/2013 | Chen ............... H04N 19/597 375/240.16 |
| 2013/0294517 A1 | 11/2013 | Fujibayashi et al. |
| 2013/0343459 A1 | 12/2013 | Bici et al. |
| 2014/0003489 A1 | 1/2014 | Hannuksela |
| 2014/0049605 A1 | 2/2014 | Chen et al. |
| 2014/0092964 A1 | 4/2014 | Ugur et al. |
| 2014/0146876 A1* | 5/2014 | Takehara ............... H04N 19/00036 375/240.02 |
| 2014/0161186 A1 | 6/2014 | Zhang et al. |
| 2014/0219346 A1* | 8/2014 | Ugur ............... H04N 19/00575 375/240.12 |
| 2015/0103927 A1* | 4/2015 | Hannuksela ............ H04N 19/597 375/240.26 |

FOREIGN PATENT DOCUMENTS

| | | |
|---|---|---|
| CN | 101686393 A | 3/2010 |
| CN | 101889449 A | 11/2010 |
| JP | 5692260 B2 | 2/2015 |
| KR | 20110113583 A | 10/2011 |
| TW | 201031221 A | 8/2010 |
| WO | 2009032813 A2 | 3/2009 |
| WO | 2011/126345 A2 | 10/2011 |
| WO | 2012/094661 A2 | 7/2012 |
| WO | 2012/128540 A2 | 9/2012 |

OTHER PUBLICATIONS

Joonyoung Park et al., Improvements on median motion vecors of AMVP, Joint Collaborative Team on Video Coding (JCT-VC) of ITU-T SG16 WP3 and ISO/IEC JTC1/SC29/WG11 4th Meeting: Daegu, Korea, Document: KCTVC-D095, ITU-T, Jan. 2011.

Joonyong Park et al., CE9 Subtests N and O: Improvement on AMVP, Joint Collaborative Team on Video Coding (JCT-VC) of ITU-T SG16 WP3 and IST/IEC JTC1/SC29/WG11 5th Meeting: Geneva Switzerland, Document: JCTVC-E350, ITU-T, Mar. 2011.

Thomas Wiegand et al., WD3: Working Draft 3 of High-Efficiency Video Coding, Joint Collabortative Team on Video coding (JCT-VC) of ITU-T SG16 WP3 and ISO/IEC JTC1/SC29/WG11 5th Meeting: Geneva, Switzerland, Document: JCTVC-E603 version 5, ITU-T, Mar. 20, 2011, pp. 104-108.

Hiroya Nakamura et al., Non-CE9: Construction of MVP list without using scaling operation, Joint Collaborative Team on Video Coding (JCT-VC) of ITU-T SG16 WP3 and ISO/IEC JTC1/SC29/WG11 7th Meeting: Geneva, Switzerland, Document: JCTVC-G219, ITU-T, Nov. 2011.

International Search Report and Written Opinion in PCT International Application No. PCT/JP2012/003540, dated Sep. 4, 2012.

Extended European Search Report in European Application No. 12792048.6, dated Sep. 17, 2014.

Notification of Reasons for Refusal for Korean Patent Application No. 10-2013-7034609, dated May 18, 2015.

McCann, et al., "High Efficiency Video Coding (HEVC) Test Model 2 (HM 2) Encoder Description," Joint Collaborative Team on Video Coding (JCT-VC) of ITU-T SG16 WP3 and ISO/IEC JTC1/SC29/WG11, document JCTVC-D502, pp. 1-28, dated Oct. 7, 2010.

* cited by examiner

```
if (slice_type == P || slice_type == B) {
    mv_competition_temporal_flag
    if (mv_competition_temporal_flag) {
        mv_temporal_high_priority_flag
    }
}
if (slice_type == B) {
    collocated_from_l0_flag
}

If (slice_type == P || slice_type == B) {
    mv_list_adaptive_idx_flag
}
```

FIG.11

```
PREDICTION BLOCK
if (PredMode == MODE_INTER) {
    merge_flag [ x0 ][ y0 ]
    if( merge_flag[ x0 ][ y0 ]  &&  NumMergeCand  >  1 ) {
        merge_idx [ x0 ][ y0 ]
    } else {
        if( slice_type == B )
            inter_pred_flag[ x0 ][ y0 ]
        if( inter_pred_flag[ x0 ][ y0 ] == Pred_L0 || Inter_pred_flag[ x0 ][ y0 ] == Pred_BI ) {
            if( num_ref_idx_l0_active_minus1 > 0 )
                ref_idx_l0[ x0 ][ y0 ]
            mvd_l0[ x0 ][ y0 ][ 0 ]
            mvd_l0[ x0 ][ y0 ][ 1 ]
            if ( NumMvpCand(L0) > 1 ))
                mvp_idx_l0[ x0 ][ y0 ]
        }
        if( inter_pred_flag[ x0 ][ y0 ] == Pred_L1 || Inter_pred_flag[ x0 ][ y0 ] == Pred_BI ) {
            if( num_ref_idx_l1_active_minus1 > 0 )
                ref_idx_l1[ x0 ][ y0 ]
            mvd_l1[ x0 ][ y0 ][ 0 ]
            mvd_l1[ x0 ][ y0 ][ 1 ]
            if ( NumMvpCand(L1) > 1 ))
                mvp_idx_l1[ x0 ][ y0 ]
        }
        ...
    }
}
```

MOVING PICTURE CODING DEVICE, MOVING PICTURE CODING METHOD, AND MOVING PICTURE CODING PROGRAM

CROSS REFERENCE TO RELATED APPLICATIONS

This application is a Continuation of U.S. patent application Ser. No. 14/607,951, filed Jan. 28, 2015, which is a Continuation of U.S. patent application Ser. No. 14/092,560, filed Nov. 27, 2013, now U.S. Pat. No. 8,976,867, which is a Continuation of PCT International Application No. PCT/JP2012/003540, filed May 30, 2012, which claims the benefit of Japanese Patent Application No. 2011-122770, filed May 31, 2011, and Japanese Patent Application No. 2011-122771, filed May 30, 2011, all of which are incorporated by reference in their entirety.

BACKGROUND OF THE INVENTION

1. Field of the Invention

The present invention relates to a technology of coding and decoding moving pictures and, more particularly, to a technology of coding and decoding moving pictures by using motion compensation prediction.

2. Description of the Related Art

The MPEG-4AVC/H.264 standard is known as a typical method for compression coding of moving pictures. In motion compensation according to MPEG-4AVC/H.264, a picture is partitioned into a plurality of rectangular blocks. A picture already coded and decoded is used as a reference picture. Motion from the reference picture is predicted. Motion prediction based on motion compensation is referred to as inter prediction. In inter prediction according to MPEG-4AVC/H.264, a plurality of pictures can be used as reference pictures. For motion compensation, an optimum reference for each block picture is selected from the plurality of reference pictures. A reference index is assigned to each reference picture. A reference picture is identified by the reference index. In a B picture, a maximum of two pictures may be selected from the reference pictures already coded and decoded and may be used for inter prediction. Prediction from one of the two reference pictures is denoted by L0 prediction (list 0 prediction), which is primarily used for forward prediction, and prediction from the other is denoted by L1 prediction (list 1 prediction), which is primarily used for backward prediction.

Bi-prediction, which uses two types of inter prediction, i.e., L0 prediction and L1 prediction, is also defined. In the case of bi-prediction, two predictions are performed. Inter prediction signals from L0 prediction and L1 prediction are multiplied by respective weight factors, and offset values are added to the respective results of multiplication. The resultant signals are superimposed on each other to produce an ultimate inter prediction signal. Typical values of weight factors and offset values used for weighted prediction are defined and coded in units of pictures and for each reference picture in a list. Coding information related to inter prediction defined for each block includes a prediction mode for distinguishing between L0 prediction, L1 prediction, and bi-prediction. Coding information defined for each reference list for a given block includes a reference index identifying a reference picture, and a motion vector indicating the direction and amount of movement of the block. These items of coding information are coded and decoded.

In a moving picture coding scheme in which motion compensation is performed, a motion vector is predicted in order to reduce the code size of motion vectors generated in the blocks. In MPEG-4AVC/H.264, the code size is reduced by taking advantage of strong correlation of a motion vector subject to coding to a motion vector for a neighboring block to derive a motion vector predictor based on prediction from the neighboring block, by deriving a motion vector difference between the motion vector subject to coding and the motion vector predictor, and by coding the motion vector difference.

More specifically, the code size of a motion vector is reduced by deriving a median value from the motion vectors for the neighboring blocks A, B, C and defining the value as a motion vector predictor, and by determining a difference between the motion vector and the motion vector predictor (non-patent document 1). If the shape of a block subject to coding and that of the neighboring block differs as shown in FIG. 48B, the topmost block is defined as a prediction block if there are a plurality of blocks neighboring to the left, or the leftmost block is defined as a prediction block if there are a plurality of blocks neighboring above. If the block subject to coding is partitioned into individual blocks of 16×8 pixels or individual blocks of 8×16 pixels, as shown in FIGS. 48C and 48D, a reference target prediction block is determined for each individual block in accordance with the arrangement of the motion compensation block, as indicated by the void arrows of FIGS. 48C and 48D, instead of deriving a median value from the motion vectors for the neighboring blocks. Prediction from the motion vectors for the determined prediction blocks is then performed.

NON-PATENT DOCUMENT 1

ISO/IEC 14496-10 Information technology—Coding of audio-visual objects—Part 10: Advanced Video Coding According to the method described in non-patent document 1, only one prediction block is obtained. This may result, depending on the type of picture, in poor prediction precision provided by a motion vector predictor or poor coding efficiency.

In this background, we have come to be aware of a need to provide a picture coding scheme based on motion compensation prediction in which the coding information is further compressed and the overall code size is reduced.

SUMMARY OF THE INVENTION

Accordingly, a purpose of the embodiment is to provide a moving picture coding and decoding technology capable of reducing the code size of motion vector differences and improving the coding efficiency accordingly, by deriving motion vector predictor candidates. Another purpose is to provide a moving picture coding and decoding technology capable of reducing the code size of coding information and improving the coding efficiency accordingly, by deriving candidates of coding information.

A moving picture coding device according to an embodiment of the present invention is adapted to code moving pictures in units of blocks obtained by partitioning each picture of the moving pictures, by using motion compensation, and comprises: a motion vector predictor candidate generation unit (120, 121) configured to derive a plurality of motion vector predictor candidates by prediction from first coded prediction blocks neighboring a prediction block subject to coding within the same picture as the prediction block subject to coding, or from a second coded prediction block located at the same position as or in the neighborhood of the prediction block subject to coding in a picture different from that of the prediction block subject to coding, and to add the derived motion vector predictor candidates in a motion vector predictor candidate list; a motion vector predictor selection unit (124) configured to select a motion vector predictor from the motion vector predictor candidate list; and a coding unit (109) configured to code information indicating a position of the motion vector predictor candidate selected in the motion vector predictor candidate list. The motion vector predictor candidate generation unit (120, 121) determines, for the purpose of obtaining a predetermined number of motion vector predictor candidates, which of first coded prediction blocks provides the motion vector from which to derive the motion vector predictor candidate, organizing the blocks in the order of priority, such that the motion vector predictor candidate generation unit processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to coding; condition 2: there is found a motion vector that is predicted by using a reference list different from that of the coding mode selected in the prediction block subject to coding and using the same reference picture as that of the coding mode selected in the prediction block subject to coding; condition 3: there is found a motion vector that is predicted by using the same reference list as that of the coding mode selected in the prediction block subject to coding and using a reference picture different from that of the coding mode selected in the prediction block subject to coding; and condition 4: there is found a motion vector that is predicted by using a reference list different from that of the coding mode selected in the prediction block subject to coding and using a reference picture different from that of the coding mode selected in the prediction block subject to coding.

Another embodiment of the present invention relates to a moving image coding method. The moving picture coding method is adapted to code moving pictures in units of blocks obtained by partitioning each picture of the moving pictures, by using motion compensation, and comprises: generating motion vector predictor candidates by deriving a plurality of motion vector predictor candidates by prediction from a first coded prediction block neighboring a prediction block subject to coding within the same picture as the prediction block subject to coding, or from a second coded prediction block located at the same position as or in the neighborhood of the prediction block subject to coding in a picture different from that of the prediction block subject to coding, and by adding the derived motion vector predictor candidates in a motion vector predictor candidate list; selecting a motion vector predictor from the motion vector predictor candidate list; and coding information indicating a position of the motion vector predictor candidate selected in the motion vector predictor candidate list. The generating of motion vector predictor candidates determines, for the purpose of obtaining a predetermined number of motion vector predictor candidates, which prediction block within the first coded prediction blocks provides the motion vector from which to derive the motion vector predictor candidate, organizing the blocks in the order of priority, such that the generating of motion vector predictor candidates processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to coding; condition 2: there is found a motion vector that is predicted by using a reference list different from that of the coding mode selected in the prediction block subject to coding and using the same reference picture as that of the coding mode selected in the prediction block subject to coding; condition 3: there is found a motion vector that is predicted by using the same reference list as that of the coding mode selected in the prediction block subject to coding and using a reference picture different from that of the coding mode selected in the prediction block subject to coding; and condition 4: there is found a motion vector that is predicted by using a reference list different from that of the coding mode selected in the prediction block subject to coding and using a reference picture different from that of the coding mode selected in the prediction block subject to coding.

A moving picture decoding device according to an embodiment of the present invention is adapted to decode a bitstream in which moving pictures are coded in units of blocks obtained by partitioning each picture of the moving pictures, by using motion compensation, and comprises: a motion vector predictor candidate generation unit (220, 221) configured to derive a plurality of motion vector predictor candidates by prediction from first decoded prediction blocks neighboring a prediction block subject to decoding within the same picture as the prediction block subject to decoding, or from a second decoded prediction block located at the same position as or in the neighborhood of the prediction block subject to decoding in a picture different from that of the prediction block subject to decoding, and to add the derived motion vector predictor candidates in a motion vector predictor candidate list; a decoding unit (202) configured to decode information indicating a position of the motion vector predictor candidate that should be selected in the motion vector predictor candidate list; and a motion vector predictor selection unit (223) configured to select a motion vector predictor from the motion vector predictor candidate list, based on the decoded information indicating the position of the motion vector predictor that should be selected. The motion vector predictor candidate generation unit (220, 221) determines, for the purpose of obtaining a predetermined number of motion vector predictor candidates, which of the first decoded prediction blocks provides the motion vector from which to derive the motion vector predictor candidate, organizing the blocks in the order of priority, such that the motion vector predictor candidate generation unit processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to decoding; condition 2: there is found a motion vector that is predicted by using a reference list different from that of the coding mode selected in the prediction block subject to decoding and using the same reference picture as that of the coding mode selected in the prediction block subject to decoding; condition 3: there is found a motion vector that is predicted by using the same reference list as that of the coding mode selected in the prediction block subject to decoding and using a reference picture different from that of the coding mode selected in the prediction block subject to decoding; and condition 4: there is found a motion vector that is predicted by using a reference list different from that of the coding mode selected in the prediction block subject to decoding and using a reference picture different from that of the coding mode selected in the prediction block subject to decoding.

Another embodiment of the present invention relates to a moving image decoding method. The moving picture decoding method is adapted to decode a bitstream in which moving pictures are coded in units of blocks obtained by partitioning each picture of the moving pictures, by using motion compensation, and comprises: generating motion vector predictor candidates by deriving a plurality of motion vector predictor candidates by prediction from first decoded prediction blocks neighboring a prediction block subject to decoding within the same picture as the prediction block subject to decoding, or from a second decoded prediction block located at the same position as or in the neighborhood of the prediction block subject to decoding in a picture different from that of the prediction block subject to decoding, and by adding the derived motion vector predictor candidates in a motion vector predictor candidate list; decoding information indicating a position of the motion vector predictor candidate that should be selected in the motion vector predictor candidate list; and selecting a motion vector predictor from the motion vector predictor candidate list, based on the decoded information indicating the position of the motion vector predictor that should be selected, wherein the generating of motion vector predictor candidates determines, for the purpose of obtaining a predetermined number of motion vector predictor candidates, which of the first decoded prediction blocks provides the motion vector from which to derive the motion vector predictor candidate, organizing the blocks in the order of priority, such that the generating of motion vector predictor candidates processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to decoding; condition 2: there is found a motion vector that is predicted by using a reference list different from that of the coding mode selected in the prediction block subject to decoding and using the same reference picture as that of the coding mode selected in the prediction block subject to decoding; condition 3: there is found a motion vector that is predicted by using the same reference list as that of the coding mode selected in the prediction block subject to decoding and using a reference picture different from that of the coding mode selected in the prediction block subject to decoding; and condition 4: there is found a motion vector that is predicted by using a reference list different from that of the coding mode selected in the prediction block subject to decoding and using a reference picture different from that of the coding mode selected in the prediction block subject to decoding.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11 shows a prediction block level syntax of a bitstream related to a method of predicting a motion vector;

DETAILED DESCRIPTION OF THE INVENTION

The present invention relates to coding of moving pictures, and, more particularly, to deriving a plurality of motion vector predictors from motion vectors of coded neighboring blocks, deriving a motion vector difference between a motion vector of a block subject to coding and a selected motion vector predictor, and coding the motion vector difference, for the purpose of improving the efficiency of coding moving pictures whereby a picture is partitioned into rectangular blocks and motion compensation is performed between pictures in units of blocks. Alternatively, the code size is reduced by using coding information of coded neighboring blocks and estimating coding information of a block subject to coding. In the case of decoding moving pictures, a plurality of motion vector predictors are derived from motion vectors of decoded neighboring blocks, and a motion vector of a block subject to decoding is derived from a vector difference decoded from a bitstream and a selected motion vector predictor. Still alternatively, coding information of a block subject to decoding is estimated by using coding information of decoded neighboring blocks.

Figure 1:
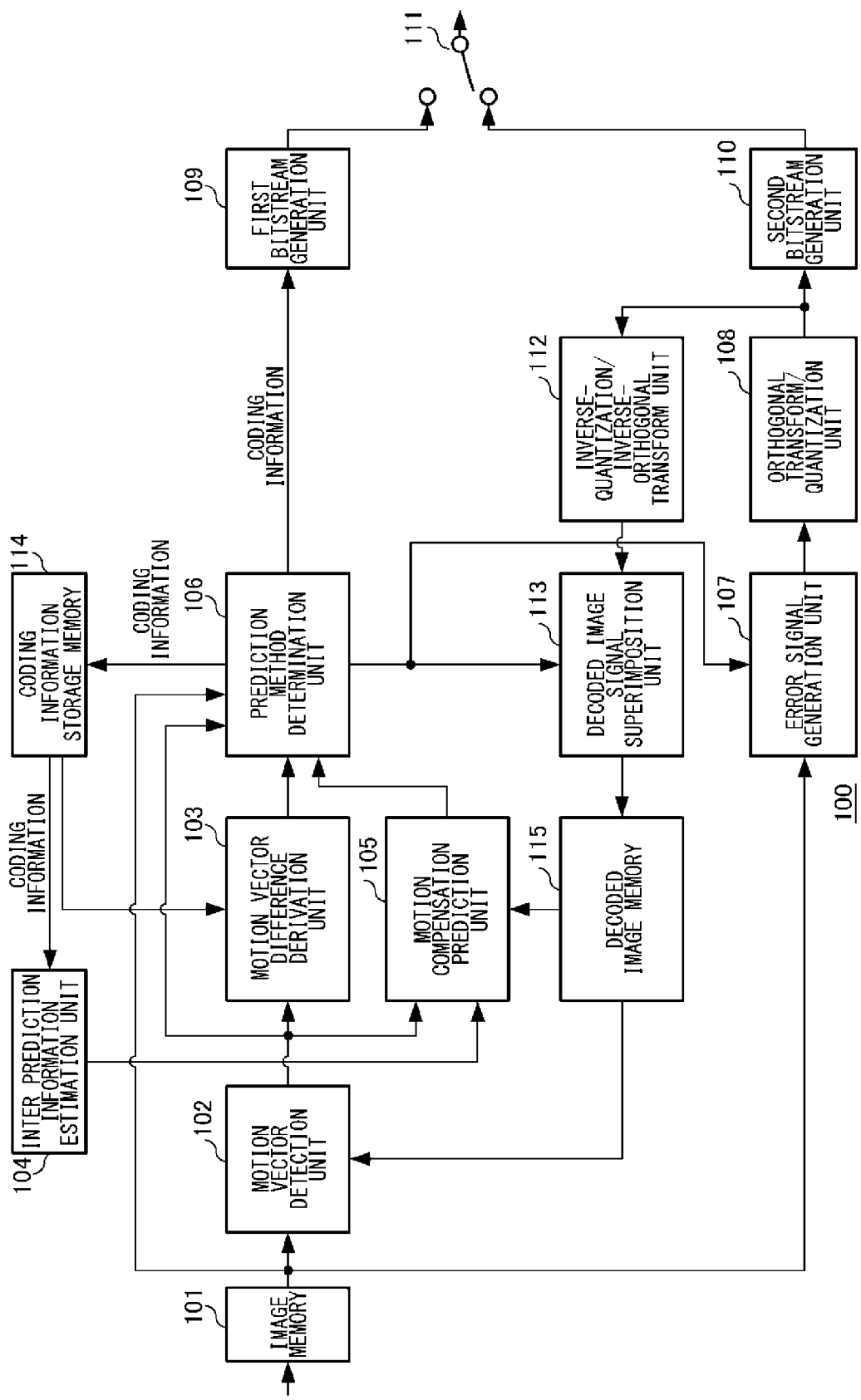
FIG. 1 is a block diagram showing the configuration of a moving picture coding device for performing a method of predicting a motion vector according to an embodiment of the present invention.

FIG. 1 is a block diagram showing the configuration of a moving picture coding apparatus according to an embodiment. The moving picture coding device according to the embodiment includes a picture memory 101, a motion vector estimation unit 102, a motion vector difference derivation unit 103, an inter prediction information estimation unit 104, a motion compensation prediction unit 105, a prediction method decision unit 106, an residual signal generation unit 107, an orthogonal transform/quantization unit 108, a first bitstream generation unit 109, a second bitstream generation unit 110, a multiplexing unit 111, an inverse-quantization/inverse-orthogonal transform unit 112, a decoded picture signal superimposition unit 113, a coding information storage memory 114, and a decoded picture memory 115.

The picture memory 101 temporarily stores a picture signal subject to coding supplied in the order of imaged/displayed time. The picture memory 101 supplies, in predetermined units of pixel blocks, the stored picture signal subject to coding to the motion vector estimation unit 102, the prediction method decision unit 106, and the residual signal generation unit 107. In this process, pictures stored in the order of imaged/displayed time are rearranged in the order of coding and output from the picture memory 101 in units of pixel blocks.

The motion vector estimation unit 102 detects motion vectors for respective prediction blocks, organizing the vectors according to the prediction block size and prediction mode, by subjecting the picture signal supplied from the picture memory 101 and a decoded picture (reference picture) supplied from the decoded picture memory 115 to block matching. The motion vector estimation unit 102 supplies the detected motion vectors to the motion compensation prediction unit 105, the motion vector difference derivation unit 103, and the prediction method decision unit 106. A prediction block is a unit in which motion compensation is performed. Details will be discussed later.

The motion vector difference derivation unit 103 derives a plurality of motion vector predictor candidates by using coding information in the coded picture signal stored in the coding information storage memory 114 and adds the plurality of motion vector predictor candidates in an MVP list. The motion vector difference derivation unit 103 selects the optimum motion vector predictor from the plurality of motion vector predictor candidates added in the MVP list, derives a motion vector difference from the motion vector detected by the motion vector estimation unit 102 and the motion vector predictor, and supplies the derived motion vector difference to the prediction method decision unit 106. In the case of switching between weight parameters to perform weighted prediction for respective prediction blocks as described below, the motion vector difference derivation unit 103 also supplies, in addition to the coding information described above, weight parameters (a weight factor multiplied by a motion compensation picture signal and a weight offset value added to the resultant signal) for weighted prediction of a selected prediction block to the prediction method decision unit 106. Further, the motion vector difference derivation unit 103 supplies an MVP index identifying the selected motion vector predictor selected from the motion vector predictor candidates added in the MVP list to the prediction method decision unit 106. The detailed configuration and operation of the motion vector difference derivation unit 103 will be described later.

The inter prediction information estimation unit 104 estimates inter prediction information in the merge mode. A merge mode is defined as a mode in which inter prediction information of a coded neighboring prediction block subjected to inter prediction or inter prediction information of a prediction block in a different picture subjected to inter prediction, instead of coding inter prediction information such as a prediction mode of a prediction block, a reference index (information of identifying one of a plurality of reference pictures added in a reference list that is used for motion compensation prediction), a motion vector, etc. The inter prediction information estimation unit 104 derives a plurality of merge candidates (inter prediction information candidates) by using coding information of coded prediction blocks stored in the coding information storage memory 114, adds the candidates in a merge candidate list described later, and selects the optimum merge candidate from the plurality of merge candidates added to the merge candidate list. The inter prediction information estimation unit 104 supplies inter prediction information of the selected merge candidate including a prediction mode, a reference index, a motion vector, etc. to the motion compensation prediction unit 105, and supplies a merge index identifying the selected merge candidate to the prediction method decision unit 106. In the case of switching between weight parameters depending on the prediction block as described below, the inter prediction information estimation unit 104 supplies, in addition to the coding information described above, weight parameters for weighted prediction of a selected merge candidate to the motion compensation prediction unit 105. The inter prediction information estimation unit 104 also supplies the merge index identifying the selected merge candidate to the prediction method decision unit 106. In addition to the coding information described above, coding information such as a quantization parameter for quantizing a selected coded prediction block, etc. may be used for prediction. The inter prediction information estimation unit 104 supplies such coding information to the prediction method decision unit 106 if such information used for prediction. The detailed configuration and operation of the inter prediction information estimation unit 104 will be described later.

The motion compensation prediction unit 105 uses the motion vector detected by the motion vector estimation unit 102 and the inter prediction information estimation unit 104 to generate a predicted picture signal from the reference picture by motion compensation prediction. The motion compensation prediction unit 105 supplies the predicted picture signal to the prediction method decision unit 106. In L0 prediction primarily used for forward prediction, and in L1 prediction primarily used for backward prediction, the motion compensation prediction unit 105 performs uni-prediction. In the case of bi-prediction, the motion compensation prediction unit 105 performs bi-prediction such that inter prediction signals from L0 prediction and from L1 prediction are adaptively multiplied by weight factors, respectively, L0 prediction primarily being used for forward prediction, and L1 prediction primarily being used for backward prediction. The motion compensation prediction unit 105 superimposes resultant signals one on the other, with an offset value added, so as to generate an ultimate predicted picture signal. The motion compensation prediction unit 105 may switch weight parameters used for weighted prediction and comprised of weight factors and offset values, in units of pictures, slices, or prediction blocks. In case that the motion compensation prediction unit 105 switches the weight parameters in units of pictures or slices, representative values are defined for respective reference pictures in a list, either in units of pictures or in units of slices, and the representative values are coded. In case that the motion compensation prediction unit 105 switches the weight parameters depending in units of prediction blocks, the weight parameters are defined for each prediction unit and are coded.

The prediction method decision unit 106 determines a prediction method (an optimum prediction block size and an indication as to whether the prediction mode or the merge mode is used, etc.) from a plurality of prediction methods, by evaluating the code size of the motion vector difference, the amount of distortion between the motion compensated prediction signal and the picture signal, etc. The prediction method decision unit 106 supplies coding information including information indicating the determined prediction method and including a motion vector difference dependent on the determined prediction method to the first bitstream generation unit 109. The prediction method decision unit 106 also supplies, as necessary, predicted values of coding information including weight parameters used for weighted prediction and a quantization parameter used for quantization/inverse-quantization, to the first bitstream generation unit 109.

Further, the prediction method decision unit 106 stores, in the coding information storage memory 114, coding information including information indicating the determined prediction method and including a motion vector dependent on the determined prediction method. The prediction method decision unit 106 supplies, as necessary, the weight parameters for weighted prediction supplied from the prediction method decision unit 106 to the coding information storage memory 114. The prediction method decision unit 106 supplies a motion compensated predicted picture signal dependent on the determined prediction mode to the residual signal generation unit 107 and the decoded picture signal superimposition unit 113.

The residual signal generation unit 107 subtracts the prediction signal from the picture signal subject to coding so as to generate an residual signal, and supplies the residual signal to the orthogonal transform/quantization unit 108. The orthogonal transform/quantization unit 108 subjects the residual signal to orthogonal transform and quantization in accordance with a quantization parameter so as to generate an orthogonally transformed, quantized residual signal. The orthogonal transform/quantization unit 108 supplies the residual signal to the second bitstream generation unit 110 and the inverse-quantization/inverse-orthogonal transform unit 112. Further, the orthogonal transform/quantization unit 108 stores the quantization parameter in the coding information storage memory 114.

The first bitstream generation unit 109 codes coding information dependent on the prediction method determined by the prediction method decision unit 106, in addition to coding information defined for each sequence, picture, slice, coding block. More specifically, the first bitstream generation unit 109 generates a first bitstream by coding, in accordance with a predefined syntax rule described later, coding information including a parameter indicating whether inter prediction is used, a parameter indicating whether the merge mode is used (in the case of inter prediction), a merge index in the case of the merge mode, a prediction mode in the case that the merge mode is not used, an MVP index, and information on a motion vector difference, etc. The first bitstream generation unit 109 supplies the first bitstream to the multiplexing unit 111. If the merge mode is used and if there is only one merge candidate available for listing in the merge candidate list described later, the merge index mergeIdx can be identified as 0 so that the merge index is not coded. Similarly, if the merge mode is not used and if there is only one motion vector predictor candidate available for listing in the MVP list described later, the MVP index mergeIdx can be identified as 0 so that the MVP index is not coded.

MVP indices are variable-length coded such that the higher in the order of priority in the MVP list (i.e., the smaller the index number), the smaller the code size of the code assigned to the MVP index. Similarly, merge indices are variable-length coded such that the higher the priority in the merge list (i.e., the smaller the index number), the smaller the code size of the code assigned to the merge index.

In the case of switchably using weighed prediction adapted to each prediction block, the weight parameters for weighted prediction supplied from the prediction method decision unit 106 if the merge mode is not used are also coded. The difference between the predicted value of the quantization parameter coding information for quantization and the value actually used is coded.

The second bitstream generation unit 110 subjects the orthogonally transformed and quantized residual signal to entropy coding according to a predefined syntax rule so as to generate the second bitstream and supplies the second bitstream to the multiplexing unit 111. The multiplexing unit 111 multiplexes the first bitstream and the second bitstream according to a predefined syntax rule and outputs the resultant bitstream.

The inverse-quantization/inverse-orthogonal transform unit 112 subjects the orthogonally transformed and quantized residual signal supplied from the orthogonal transform/quantization unit 108 to inverse-quantization and inverse-orthogonal transform so as to derive the residual signal and supplies the residual signal to the decoded picture signal superimposition unit 113. The decoded picture signal superimposition unit 113 superimposes the prediction signal dependent on the decision by the prediction method decision unit 106 and the residual signal subjected to inverse-quantization and inverse-orthogonal transform by the inverse-quantization/inverse-orthogonal transform unit 112 one upon the other so as to generate a decoded picture. The decoded picture signal superimposition unit 113 stores the decoded picture in the decoded picture memory 115. The decoded picture may be subject to filtering for reducing distortion such as block distortion resulting from coding before being stored in the decoded picture memory 115. In this case, predicted coding information such as a flag for discriminating information on a post filter such as an ALF or a deblocking filter is stored in the coding information storage memory 114 as necessary.

Figure 2:
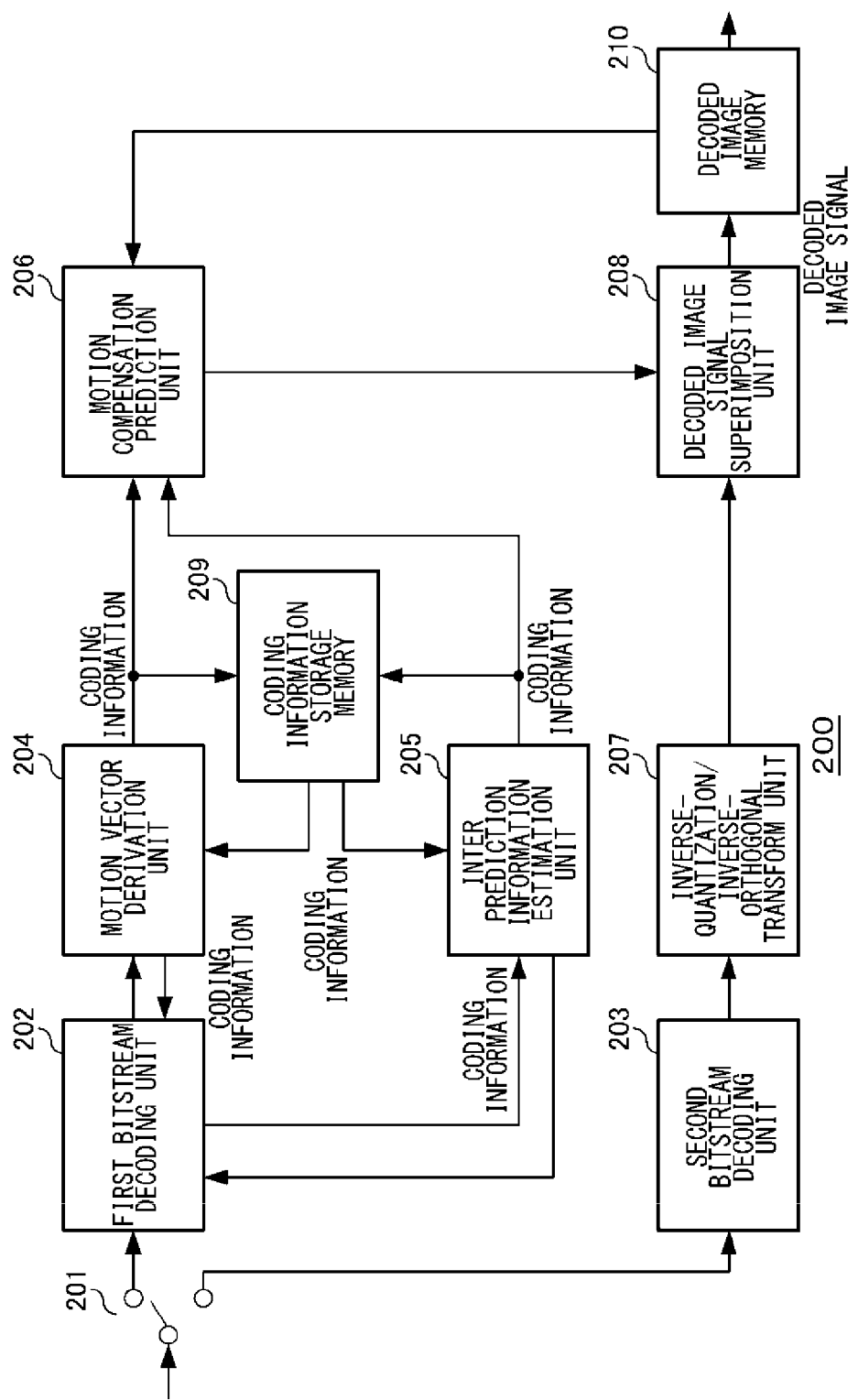
FIG. 2 is a block diagram showing the configuration of a moving picture decoding device for performing a method of predicting a motion vector according to an embodiment.

FIG. 2 is a block diagram showing the configuration of a moving picture decoding device according to the embodiment corresponding to the moving picture coding device of FIG. 1. The moving picture decoding device according to the embodiment includes a demultiplexing unit 201, a first bitstream decoding unit 202, a second bitstream decoding unit 203, a motion vector derivation unit 204, an inter prediction information estimation unit 205, a motion compensation prediction unit 206, an inverse-quantization/inverse-orthogonal transform unit 207, a decoded picture signal superimposition unit 208, a coding information storage memory 209, and a decoded picture memory 210.

The decoding process of the moving picture decoding device of FIG. 2 corresponds to the decoding process provided in the moving picture coding device of FIG. 1.

Therefore, the motion compensation prediction unit 206, the inverse-quantization/inverse-orthogonal transform unit 207, the decoded picture signal superimposition unit 208, the coding information storage memory 209, and the decoded picture memory 210 of FIG. 2 have the same functions as the motion compensation prediction unit 105, the inverse-quantization/inverse-orthogonal transform unit 112, the decoded picture signal superimposition unit 113, the coding information storage memory 114, and the decoded picture memory 115 of the moving picture coding device of FIG. 1, respectively.

The bitstream supplied to the demultiplexing unit 201 is demultiplexed according to a predefined syntax rule. The bitstreams resulting from demultiplexing are supplied to the first bitstream decoding unit 202 and the second bitstream decoding unit 203.

The first bitstream decoding unit 202 decodes the supplied bitstream so as to obtain information defined for each sequence, picture, slice, or coding block, and coding information defined for each prediction block. More specifically, the first bitstream decoding unit 202 decodes, in accordance with a predefined syntax rule described later, coding information relating to the parameter indicating whether inter prediction is used, the merge index in the case of merge mode, the prediction mode in the case the merge mode is not used, the MVP index, and the motion vector difference, etc. The first bitstream decoding unit 202 supplies the decoded coding information to the motion vector derivation unit 204 or the inter prediction information estimation unit 205, and to the motion compensation prediction unit 206. The first bitstream decoding unit 202 stores the coding information in the coding information storage memory 209. If the merge mode is used and if there is only one merge candidate available for listing in the merge candidate list described later, the merge index mergeIdx can be identified as 0 so that the merge index is not coded. In this case, mergeIdx is defined as 0. Therefore, if the merge mode is used, the number of merge candidates added in the merge candidate list derived in the inter prediction information estimation unit 205 is supplied to the first bitstream decoding unit 202. Similarly, if the merge mode is not used and if there is only one motion vector predictor candidate available for listing in the MVP list described later, the MVP index mergeIdx can be identified as 0 so that the MVP index is not coded. In this case, mvpIdx is defined as 0. Therefore, in the case the merge mode is not used, the number of motion vector predictor candidates added in the MVP list derived in the motion vector derivation unit 204 is supplied to the first bitstream decoding unit 202.

The second bitstream decoding unit 203 decodes the supplied bitstream to derive the orthogonally transformed and quantized residual signal. The second bitstream decoding unit 203 supplies the orthogonally transformed and quantized residual signal to the inverse-quantization/inverse-orthogonal transform unit 207.

In the case that the merge mode is not used in the prediction block subject to decoding, the motion vector derivation unit 204 uses the coding information of the decoded picture signal stored in the coding information storage memory 209 to derive a plurality of motion vector predictor candidates and stores the candidates in the MVP list described later. The motion vector derivation unit 204 selects a motion vector predictor in accordance with the coding information decoded in the first bitstream decoding unit 202 and supplied therefrom. The motion vector derivation unit 204 derives a motion vector from the motion vector difference retrieved by decoding in the first bitstream decoding unit 202 and from the motion vector predictor. The motion vector derivation unit 204 supplies the derived motion vector to the motion compensation prediction unit 206 and the coding information storage memory 209. The motion vector derivation unit 204 further supplies to the first bitstream decoding unit 202 the number of motion vector predictor candidates derived in the motion vector derivation unit 204 and added in the MVP list. The detailed configuration and operation of the motion vector derivation unit 204 will be described later.

In the case that the merge mode is used in the prediction block subject to decoding, the inter prediction information estimation unit 205 estimates inter prediction information in the merge mode. The inter prediction information estimation unit 205 uses the coding information of decoded prediction blocks and stored in the coding information storage memory 114 to derive a plurality of merge candidates and adds the candidates in the merge candidate list described later. The inter prediction information estimation unit 205 selects a merge candidate corresponding to the merge index retrieved by decoding in the first bitstream decoding unit 202 and supplied therefrom. The inter prediction information estimation unit 205 supplies inter prediction information including the prediction mode of the selected merge candidate, the reference index, the motion vector predictor, etc. to the motion compensation prediction unit 206 and stores the inter prediction information in the coding information storage memory 209. The inter prediction information estimation unit 205 further supplies to the first bitstream decoding unit 202 the number of merge candidates derived in the inter prediction information estimation unit 205 and added in the merge candidate list. In the case of switching between weight parameters depending on the prediction block as described below, the inter prediction information estimation unit 205 supplies, in addition to the coding information described above, weight parameters for weighted prediction of the selected merge candidate to the motion compensation prediction unit 206. In addition to the coding information described above of the selected coded prediction block, coding information other than inter prediction information such as a quantization parameter for quantization, etc. may be used for prediction. The inter prediction information estimation unit 205 may supply such coding information to the prediction method decision unit 106 if such prediction is performed. The detailed configuration and operation of the inter prediction information estimation unit 205 will be described later.

The motion compensation prediction unit 206 uses the motion vector derived by the motion vector derivation unit 204 to generate a predicted picture signal from the reference picture by motion compensation prediction. The motion compensation prediction unit 206 supplies the predicted picture signal to the decoded picture signal superimposition unit 208. In the case of bi-prediction, the motion compensation prediction unit 206 adaptively multiplies 2 motion compensated predicted picture signals from L0 prediction and L1 prediction by weight factors. The decoded picture signal superimposition unit 208 superimposes the resultant signals so as to generate an ultimate predicted picture signal.

The inverse-quantization/inverse-orthogonal transform unit 207 subjects the orthogonally transformed and quantized residual signal decoded by the first bitstream decoding unit 202 to inverse-quantization and inverse-orthogonal transform so as to obtain the inverse-orthogonally transformed and inverse-quantized residual signal.

The decoded picture signal superimposition unit 208 superimposes predicted picture signal subjected to motion compensation prediction by the motion compensation prediction unit 206 and the residual signal subjected to inverse-quantization and inverse-orthogonal transform by the inverse-quantization/inverse-orthogonal transform unit 207 one upon the other so as to retrieve a decoded picture signal. The decoded picture signal superimposition unit 208 stores the decoded picture signal in the decoded picture memory 211. The decoded picture may be subject to filtering for reducing, for example, block distortion resulting from coding before being stored in the decoded picture memory 211.

The method of predicting a motion vector according to the embodiment is performed in the motion vector difference derivation unit 103 of the moving picture coding device of FIG. 1 and in the motion vector derivation unit 204 of the moving picture decoding device of FIG. 2.

Before describing the method of predicting a motion vector according to the embodiment, terms used in the embodiment will be defined.

(Coding Block)

Figure 3:
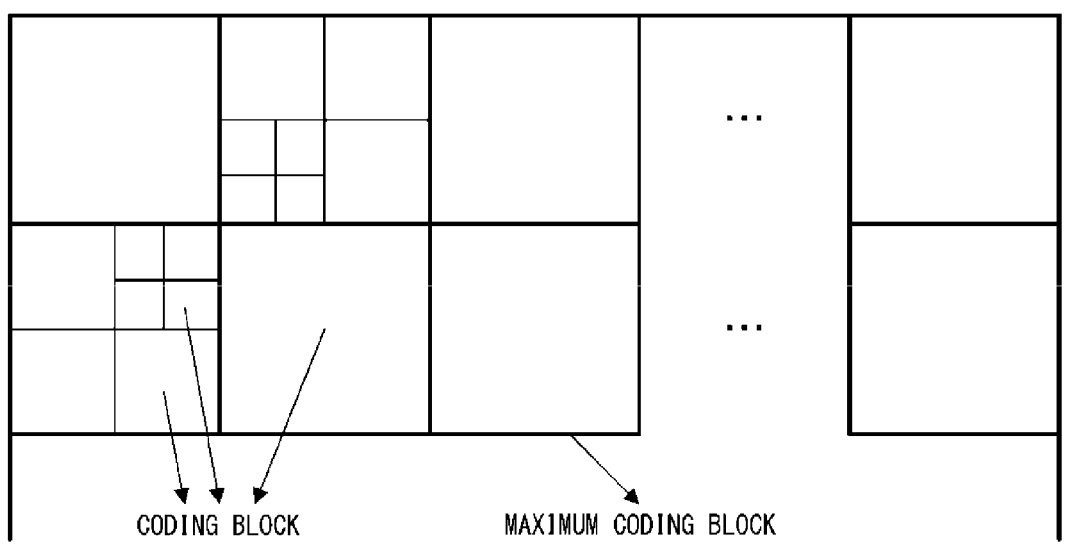
FIG. 3 shows a coding block.

In the embodiment, a screen is evenly partitioned into square-shaped units of equal sizes as shown in FIG. 3. The unit is defined as a tree block, which is a basic unit of address management for designating a block in a picture subject to coding/decoding (block subject to coding in the case of coding, and a block subject to decoding in the case of decoding). Depending on the texture in the screen, a tree block may be hierarchically quartered as necessary to produce blocks of smaller block sizes so as to optimize a coding process. The block will be referred to as a coding block, which is defined as a basic block in coding and decoding. A tree block represents a coding block of the maximum size. Coding blocks of the minimum size beyond which further quartering is prevented will be referred to as minimum coding blocks.

Figure 4:
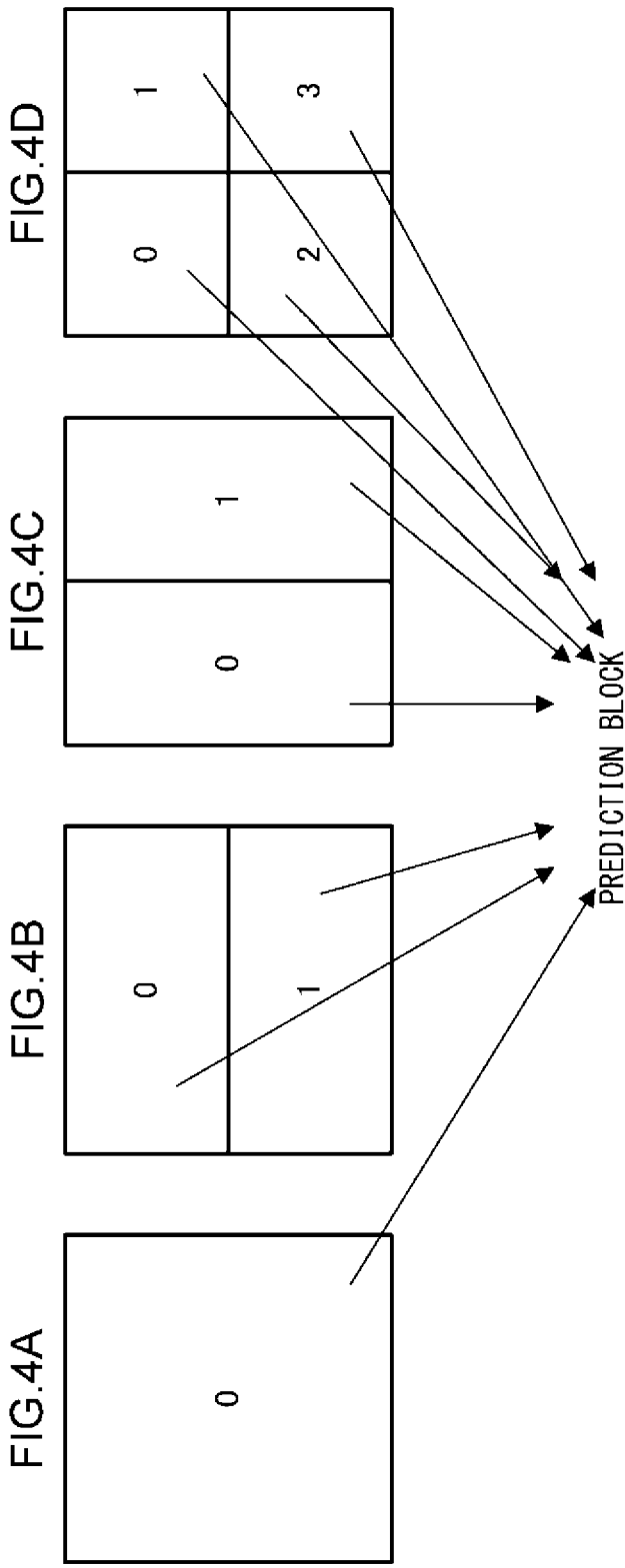
FIGS. 4A-4D show types of shape of prediction blocks.

(Prediction Block)

Where a screen is partitioned for the purpose of motion compensation, smaller block sizes for motion compensation will result in more sophisticated prediction. In this respect, a scheme for motion compensation is adopted in which the optimum block shape and the optimum block size are selected from multiple block shapes and block sizes to partition a coding block accordingly for the purpose of motion compensation. A unit in which motion compensation is performed will be referred to as a prediction block. As shown in FIG. 4, a coding block that remains non-partitioned and defined as a single prediction block (FIG. 4A) will be referred to as 2N×2N partitions, horizontal partitioning of a coding block to produce two prediction blocks (FIG. 4B) will be referred to as 2N×N partitions, vertical partitioning of a coding block to produce two prediction blocks (FIG. 4C) will be referred to as N×2N partitions, and horizontal and vertical even partitioning of a coding to produce four prediction blocks (FIG. 4D) will be referred to as N×N partitions.

Numerals starting with 0 are assigned to the prediction blocks in the coding block for the purpose of identifying the prediction blocks. The numeral will be defined as a prediction block index puPartIdx. The numerals entered to label the respective prediction blocks in the coding block of FIG. 4 denote puPartIdx of the respective prediction blocks.

(Prediction Block Group)

Figure 5:
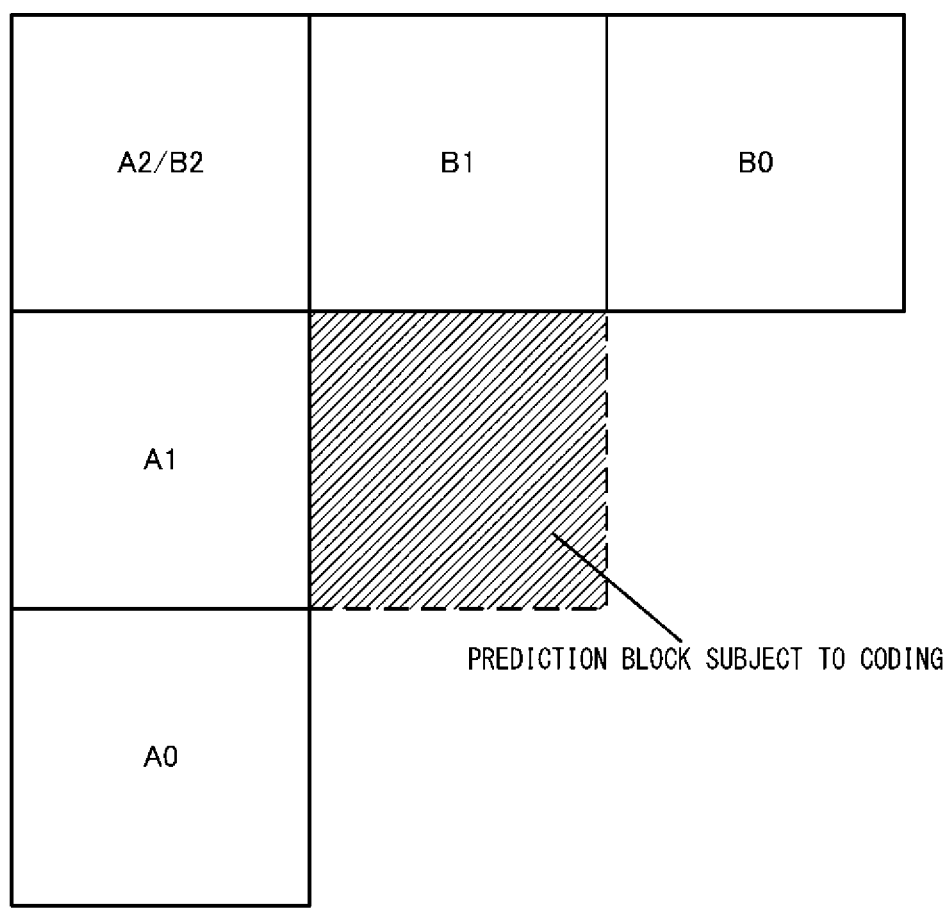
FIG. 5 shows a prediction block group.

A group comprised of a plurality of prediction blocks is defined as a prediction block group. FIG. 5 shows a prediction block group neighboring a prediction block subject to coding/decoding in the same picture as the prediction block subject to coding/decoding. FIG. 9 shows a coded/decoded prediction block group located at the same position as or in the neighborhood of the prediction block subject to coding/decoding in a picture at a point of time different from the prediction block subject to coding/decoding. A description will be given of prediction block groups according to the embodiment with reference to FIGS. 5, 6, 7, 8, and 9.

The first prediction block group including a prediction block A1 neighboring the prediction block subject to coding/decoding to the left in the same picture as the prediction block subject to coding/decoding, a prediction block A0 neighboring the prediction block subject to coding/decoding at bottom left, a prediction block A2 neighboring the prediction block subject to coding/decoding at top left (the same as a prediction block B2 described later) will be defined as a prediction block neighboring to the left.

Figure 6:
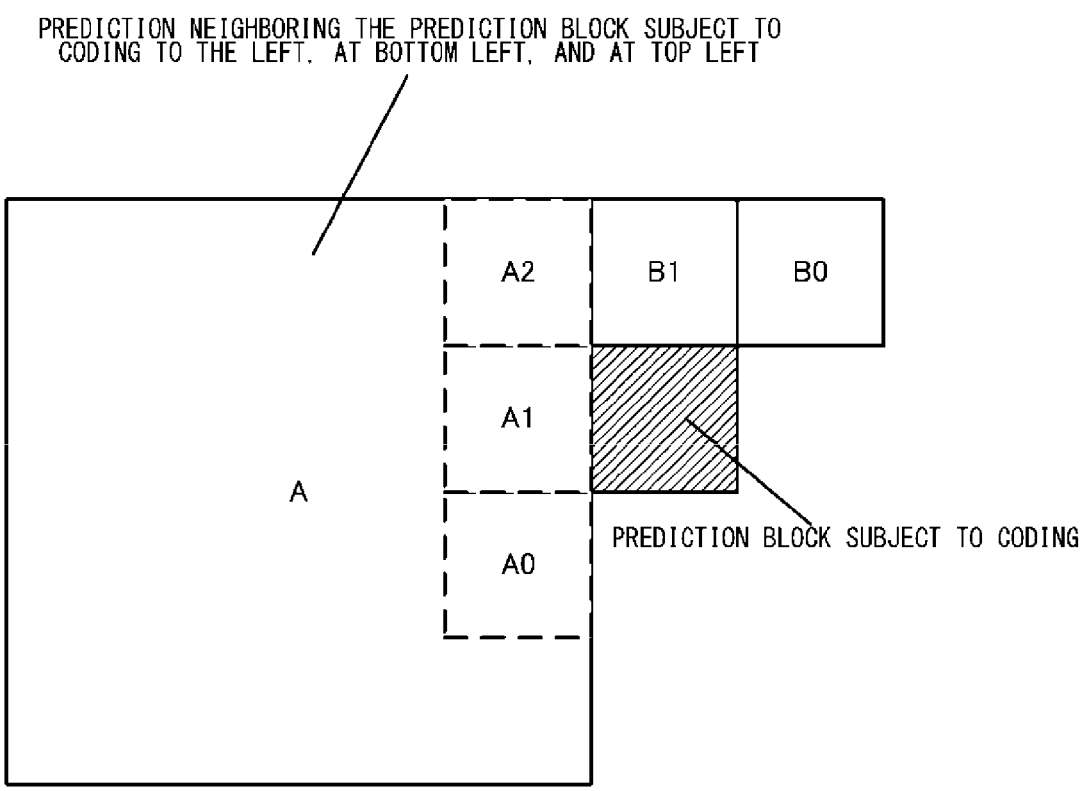
FIG. 6 shows a prediction block group.

Even if, as shown in FIG. 6, the size of the prediction block neighboring the prediction block subject to coding/decoding to the left is larger than that of the prediction block subject to coding/decoding, the aforementioned condition is observed. More specifically, the prediction block A neighboring to the left is defined as the prediction block A1 if it neighbor the prediction block subject to coding/decoding to the left, defined as the prediction block A0 if it neighbors the prediction block subject to coding/decoding at bottom left, and defined as the prediction block A2 if it neighbors the prediction block subject to coding/decoding at top left.

Figure 7:
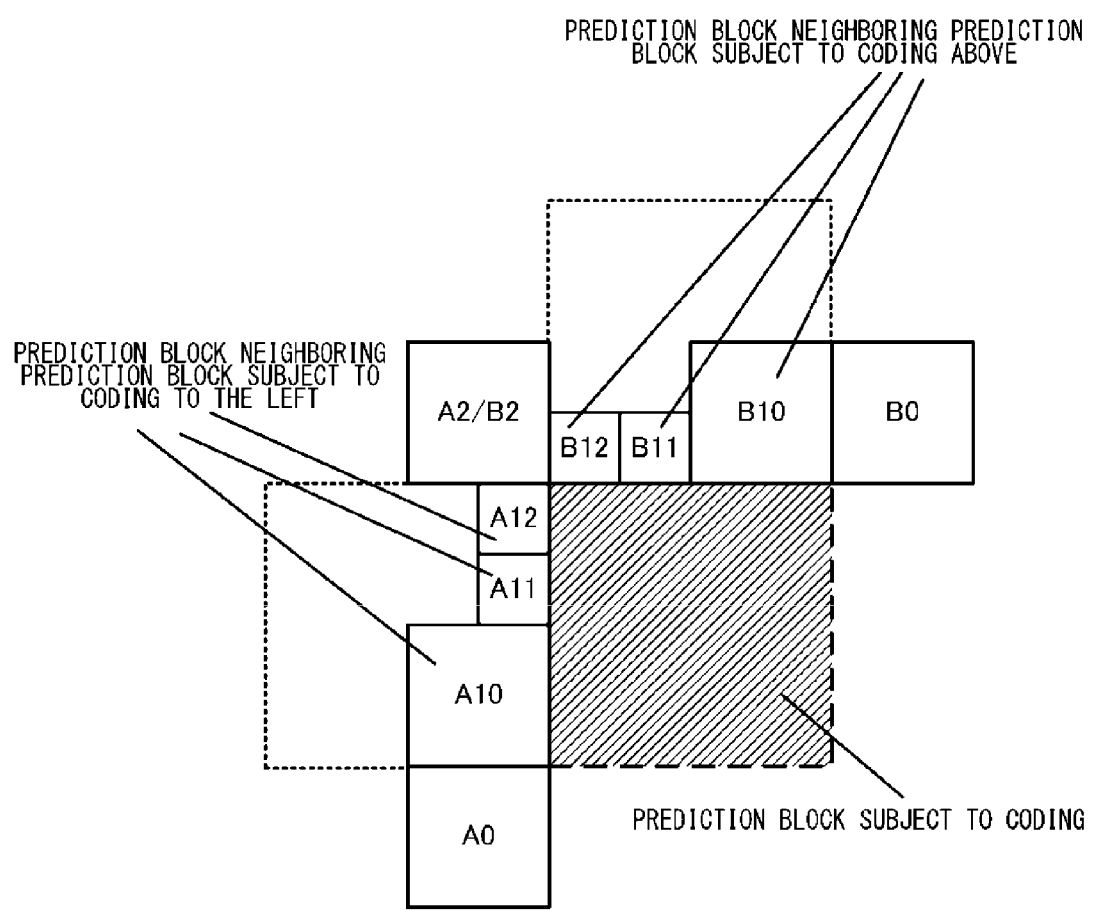
FIG. 7 shows a prediction block group.

If, as shown in FIG. 7, the size of the prediction block neighboring the prediction block subject to coding/decoding to the left is smaller than that of the prediction block subject to coding/decoding, and if there are a plurality of such blocks, only the lowermost prediction block A10 is defined as the prediction block A1 neighboring to the left and is included in the prediction block group neighboring to the left. Alternatively, only the uppermost prediction block A12 may be defined as the prediction block A1 neighboring to the left and included in the prediction block group neighboring to the left. Still alternatively, the lowermost prediction block A10 and the uppermost prediction block A12 may both be included in the prediction block group neighboring to the left. Still alternatively, all of the prediction blocks neighboring to the left A10, A11, and A12 may be included in the prediction block group neighboring to the left. The first prediction block group including a prediction block B1 neighboring the prediction block subject to coding/decoding above in the same picture as the prediction block subject to coding/decoding, a prediction block B0 neighboring the prediction block subject to coding/decoding at top right, a prediction block B2 neighboring the prediction block subject to coding/decoding at top left (the same as the prediction block A2) will be defined as a prediction block neighboring above.

Figure 8:
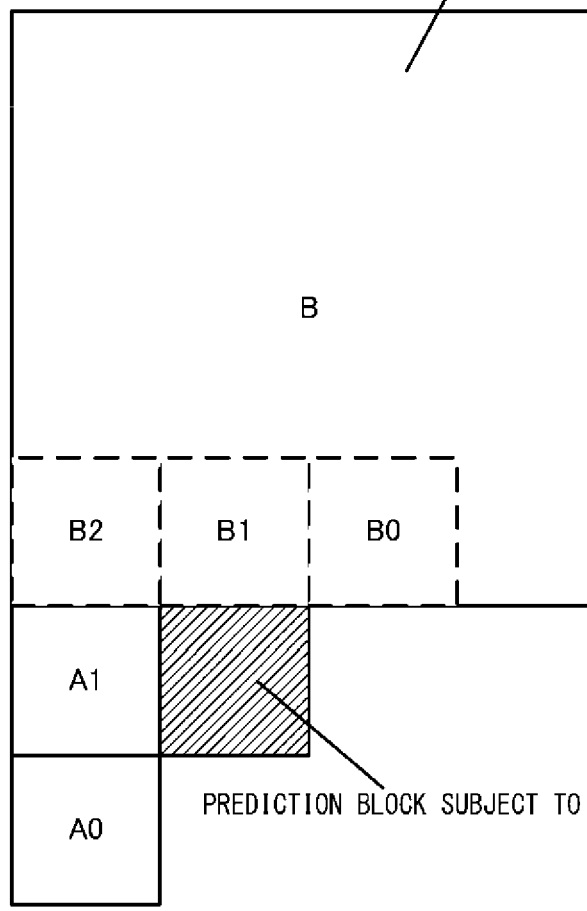
FIG. 8 shows a prediction block group.
Figure 9:
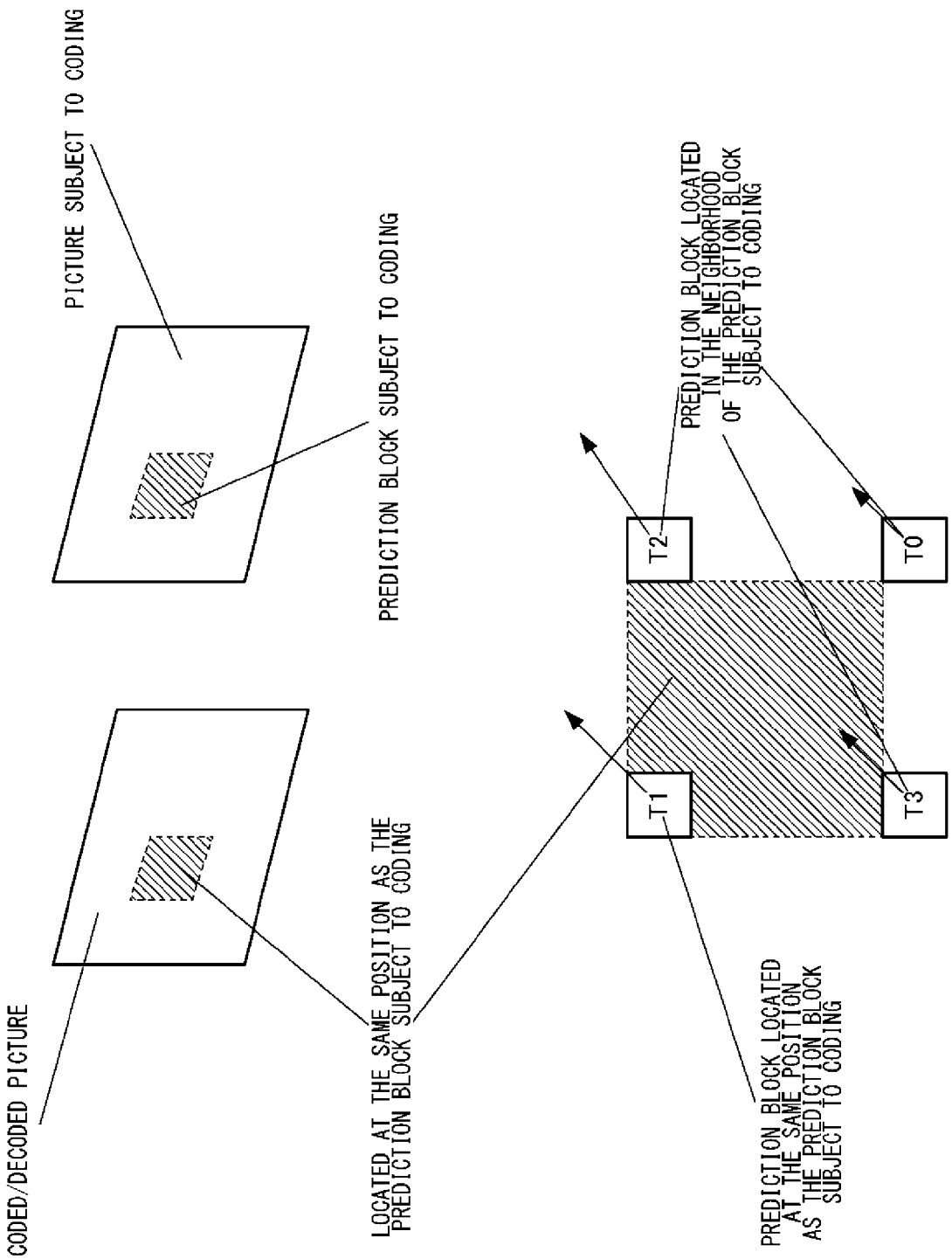
FIG. 9 shows a prediction block group.

Even if, as shown in FIG. 8, the size of the prediction block neighboring the prediction block subject to coding/decoding above is larger than that of the prediction block subject to coding/decoding, the aforementioned condition is observed. More specifically, the prediction block B neighboring above is defined as the prediction block B1 if it is neighboring the prediction block subject to coding/decoding above, defined as the prediction block B0 if it is neighboring the prediction block subject to coding/decoding at top right, and defined as the prediction block B2 if it is neighboring the prediction block subject to coding/decoding at top left.

If, as shown in FIG. 7, the size of the prediction block neighboring the prediction block subject to coding/decoding above is smaller, and there are a plurality of such blocks, only the rightmost prediction block B10 is defined as the prediction block B1 neighboring above and is included in the prediction block group neighboring above. Alternatively, only the leftmost prediction block B12 may be defined as the prediction block B1 neighboring above and included in the prediction block group neighboring above. Still alternatively, the rightmost prediction block B10 and the leftmost prediction block B12 may both be included in the prediction block group neighboring above. Still alternatively, all of the prediction blocks neighboring above may be included in the prediction block group neighboring above.

The prediction block A2/B2 neighboring at top right is included in the prediction block group neighboring to the left and in the prediction block group neighboring above. If the prediction block group neighboring to the left is described, that block will be referred to as the prediction block A2. If the prediction block group neighboring above is described, that block will be defined as the prediction block B2.

According to the scheme described herein, the chance of finding a motion vector predictor candidate is increased by allowing the prediction block neighboring at top left both in the prediction block group neighboring to the left and the prediction block group neighboring above. The maximum processing volume will not be increased if parallel processing is performed. In the case of serial processing, the prediction block neighboring at top left may be allowed to belong to only one of the groups if reduction in processing volume should be given weight.

As shown in FIG. 9, the third prediction block group comprised of coded/decoded prediction blocks T0, T1, T2, T3, and T4 located at the same position as or in the neighborhood of the prediction block subject to coding/decoding in a picture at a point of time different from the prediction block subject to coding/decoding will be defined as a prediction block group at a different point of time.

REFERENCE LIST

In the process of coding or decoding, a reference picture number is designated from reference indices in each reference list LX and the reference picture thus identified is referred to. L0 and L1 are provided so that 0 or 1 may be substituted into X. Inter prediction in which a reference picture added in the reference list L0 is referred to will be referred to as L0 prediction (Pred_L0). Motion compensation prediction in which a reference picture added in the reference list L1 is referred to will be referred to as L1prediction (Pred_L1). L0 prediction is primarily used for forward prediction, and L1 prediction is primarily used for backward prediction. Only L0 prediction is available for P slices. For B slices, L0 prediction, L1 prediction, and bi-prediction in which L0 prediction and L1 prediction are averaged or added with weighting are available. It will be assumed in the processes described below that values with a suffix LX are output for each of L0 prediction and L1 prediction.

(POC)

POC is a variable mapped to a coded picture. A value incremented by 1 at a time in an output sequence is set in POC. A POC value allows decision as to whether pictures are identical, decision of anteroposterior relationship between pictures in an output sequence, or decision of a distance between pictures. For example, two pictures are determined to be identical to each other if they have the same POC value. If two pictures have different POC values, the one with a smaller POC is determined to be output first. The difference in POC between two pictures indicates an inter-frame distance.

The method of predicting a motion vector according to the embodiment will be described with reference to the drawings. The method of predicting a motion vector is executed in units of prediction blocks building a coding block. The method is performed both in a coding process and in a decoding process. Assuming that motion compensation based inter-picture coding (inter prediction) is selected, and in the case of coding, the motion vector prediction method is executed when a motion vector predictor is derived by using a coded motion vector, which is used to derive a motion vector difference subject to coding from a motion vector subject to coding. In the case of decoding, the motion vector prediction method is executed when a motion vector predictor is derived by using a coded motion vector used to derive a motion vector subject to decoding.

(Syntax)

A description will first be given of syntax, which is a rule common to coding and decoding of a bitstream of moving pictures coded by a moving picture coding device provided with the motion vector prediction method according to the embodiment.

Figure 10:
FIG. 10 shows a slice level syntax of a bitstream related to a method of selecting a motion vector.

FIG. 10 shows a first syntax pattern written in a slice header of each slice in a bitstream generated according to the embodiment. In the case of performing motion compensation based inter-picture prediction (inter prediction) in units of slices, i.e., if the slice type is either P (uni-prediction) or B (bi-prediction), a first flag mv_competition_temporal_flag is set. The first flag mv_competition_temporal_flag indicates, in a prediction block in which the merge mode is not defined for inter prediction, whether to predict a motion vector by using a motion vector of a prediction block located at the same position as or in the neighborhood of the target prediction block in a picture at a different point of time as well as using a motion vector of a neighboring prediction block in the same picture, and indicates, in a prediction block in which the merge mode is defined for inter prediction, whether to perform inter prediction by using coding information of a prediction block located at the same position as or in the neighborhood of the target prediction block in a picture at a different point of time as well as using coding information of a neighboring prediction block in the same picture.

Further, if mv_competition_temporal_flag is true (1), a second flag mv_temporal_high_priority_flag is set. The second flag mv_temporal_high_priority_flag indicates, in a prediction block in which the merge mode is not defined for inter prediction, whether to add, in an MVP list described later, a motion vector candidate of a prediction block located at the same position as or in the neighborhood of the target prediction block in a picture at a different point of time in preference to other blocks, and indicates, in a prediction block in which the merge mode is defined for inter prediction, whether to add, in a merge candidate list described later, a merge candidate located at the same position as or in the neighborhood of the target prediction block in a picture at a different point of time in preference to any other candidate. The value may be fixed to true (1) or false (0) for simplification of a decision process described later. The value may be adaptively changed frame by frame in order to improve the coding efficiency. In this way, the code size is further reduced.

By setting mv_temporal_high_priority_flag to true (1) if the picture subject to coding/decoding is at a small distance from the closest reference picture, and setting mv_temporal_high_priority_flag to false (0) if the picture subject to coding/decoding is at a large distance from the reference picture, the code size of an MVP index or a merge index, which are described later, is reduced. This is because, if the distance is relatively small, it can be determined that an MVP candidate or a merge candidate from a different point of time is relatively more suitable as a candidate. For example, if the frame rate is 30 Hz, and the distance between the picture subject to coding/decoding and the closest reference picture is X frames (X=1-3) or less, mv_temporal_high_priority_flag may be set to true (1). If the distance between the pictures subject to coding/decoding and the reference picture is more than X frames, mv_temporal_high_priority_flag may be set to true (0). In this way, the code size of MVP indices or merge indices, described later, can be reduced. If the distance is small, it is determined that reliability of inter prediction is higher than when the distance is large so that the candidate is more suitable. By modifying the threshold X depending on the content of sequence, the code size is reduced more efficiently. In the case of a motion-rich and complicated sequence, the coding efficiency is improved by decreasing the threshold X and thereby lowering the order of priority of the MVP candidate or merge candidate in the temporal dimension. Alternatively, the order of priority may be controlled based on statistics obtained during the coding process. If, as a result of counting the number of coded selected candidates during the coding process, it is determined that the number of motion vector candidates or the number of merge candidates for prediction blocks located at the same position as the target prediction block in a picture at a different point of time is larger than the number of motion vectors for prediction blocks neighboring the target block to the left or above in the same picture, mv_temporal_high_priority_flag for the subsequent picture subject to coding is set to true(1). If the former number is smaller than the latter number, and if the distance between the picture subject to coding/decoding is at a large distance from the reference picture, the flag is set to false (0). In this way, the code size of MVP indices or merge indices, described later, can be reduced.

If the slice type is "B", a third flag collocated_from_l0_flag is set. The flag collocated_from_l0_flag is defined to indicate which of the L0 reference list and the L1 reference list for the picture including the target prediction block includes the picture colPic located at a different point of time and used to derive the motion vector predictor candidate or the merge candidate in the temporal dimension.

Further, if the slice type is P (uni-prediction) or B (bi-prediction), a fourth flag mv_list_adaptive_idx_flag is set. The flag mv_list_adaptive_idx_flag is defined to indicate whether the order of addition in the MVP list or the merge candidate list described later is changed adaptively depending on the prediction block.

The syntax elements described above may be defined in a picture parameter set that defines syntax elements in units of pictures.

Variations of the first flag mv_competition_temporal_flag, the second flag mv_temporal_high_priority_flag, the third flag collocated_from_l0_flag, and the fourth flag mv_list_adaptive_idx_flag may be provided for non-merge motion prediction and for the merge mode and be independently controlled.

FIG. 11 shows a syntax pattern defined for each prediction block. If the value MODE_INTER is substituted into PredMode, indicating the prediction mode of the prediction block, a flag merge_flag[x0][y0] indicating whether the merge mode is used is set. x0 and y0 are indices indicating the position of the top left pixel in the prediction block in the screen produced by luminance signals. merge_flag[x0][y0]

is a flag defined to indicate whether the merge mode is used in the prediction located at (x0, y0) in the screen.

If merge_flag[x0][y0] is 1, it means that the merge mode is used. If NumMergeCand exceeds 1, a syntax element merge_idx[x0][y0], which denotes an index in a merge list (a list of motion vector predictor candidates referred to), is set. x0 and y0 are indices indicating the position of the top left pixel in the prediction block in the screen. merge_idx[x0][y0] is a merge index for the prediction block located at (x0, y0) in the screen. The function NumMergeCand indicates the number of merge candidates and will be described later. The syntax element merge_idx[x0][y0], which denotes an index in a merge list, is coded only when the number of merge candidates NumMergeCand is more than 1 because, if the total number of motion vector predictor candidates is 1, that one candidate will be the target of merge so that the merge candidate referred to is uniquely identified without transmitting merge_idx[x0][y0].

Meanwhile, if merge_flag[x0][y0] is 0, it means that the merge mode is not used. In the case that the slice type is B, a syntax element inter_pred_flag[x0][y0] for discriminating between different inter prediction modes is set. For each reference list LX (X=0 or 1), a syntax element ref_idx_lX[x0][y0], which denotes a reference picture index for identifying a reference picture, a syntax element mvd_lX[x0][y0][j], which denotes a motion vector difference between a motion vector for a prediction block determined through motion vector estimation and a motion vector predictor, are set. X is either 0 or 1 and denotes a direction of prediction, the index x0 in the array indicates the x coordinate of a prediction block, y0 indicates the y coordinate of the prediction block, and j indicates a component of the motion vector difference, j=0 indicating an x component, and j=1 indicating a y component. If the total number of motion vector predictor candidates exceeds 1, a syntax element mvp_idx_lX[x0][y0], which denotes an index in an MVP list (a list of motion vector predictor candidates referred to), is set. x0 and y0 are indices indicating the position of the top left pixel in the prediction block in the screen. mvp_idx_lX[x0][y0] is an MVP index in a list LX for the prediction block located at (x0, y0) in the screen. The suffix LX indicates a reference list. L0 and L1 are provided so that 0 or 1 may be substituted into X. NumMVPCand (LX) is a function for deriving the total number of motion vector predictor candidates for the prediction block identified in the direction of prediction LX (X is either 0 or 1). The index mvp_idx_lX[x0][y0] in the MVP list is coded only when the method of predicting a motion vector identifies the total number of motion vector predictor candidates NumMVPCand (LX) as exceeding 1. This is because, if the total number of motion vector predictor candidates is 1, that one candidate will be the motion vector predictor to be used so that the motion vector predictor candidate referred to is uniquely identified without transmitting mvp_idx_lX[x0][y0].

(Prediction of a Motion Vector in Coding)

A description will be given of the operation of the method of predicting a motion vector according to the embodiment performed in the moving picture coding device for coding a bitstream of moving pictures according to the syntax described above. The method of predicting a motion vector is applied to a prediction block for which motion compensation based inter prediction is performed in units of slices, i.e., applied if the slice type indicates a P slice (predictive slice) or a B slice (bi-predictive slice), and if inter prediction (MODE_INTER) is defined for the prediction block in the slice.

Figure 12:
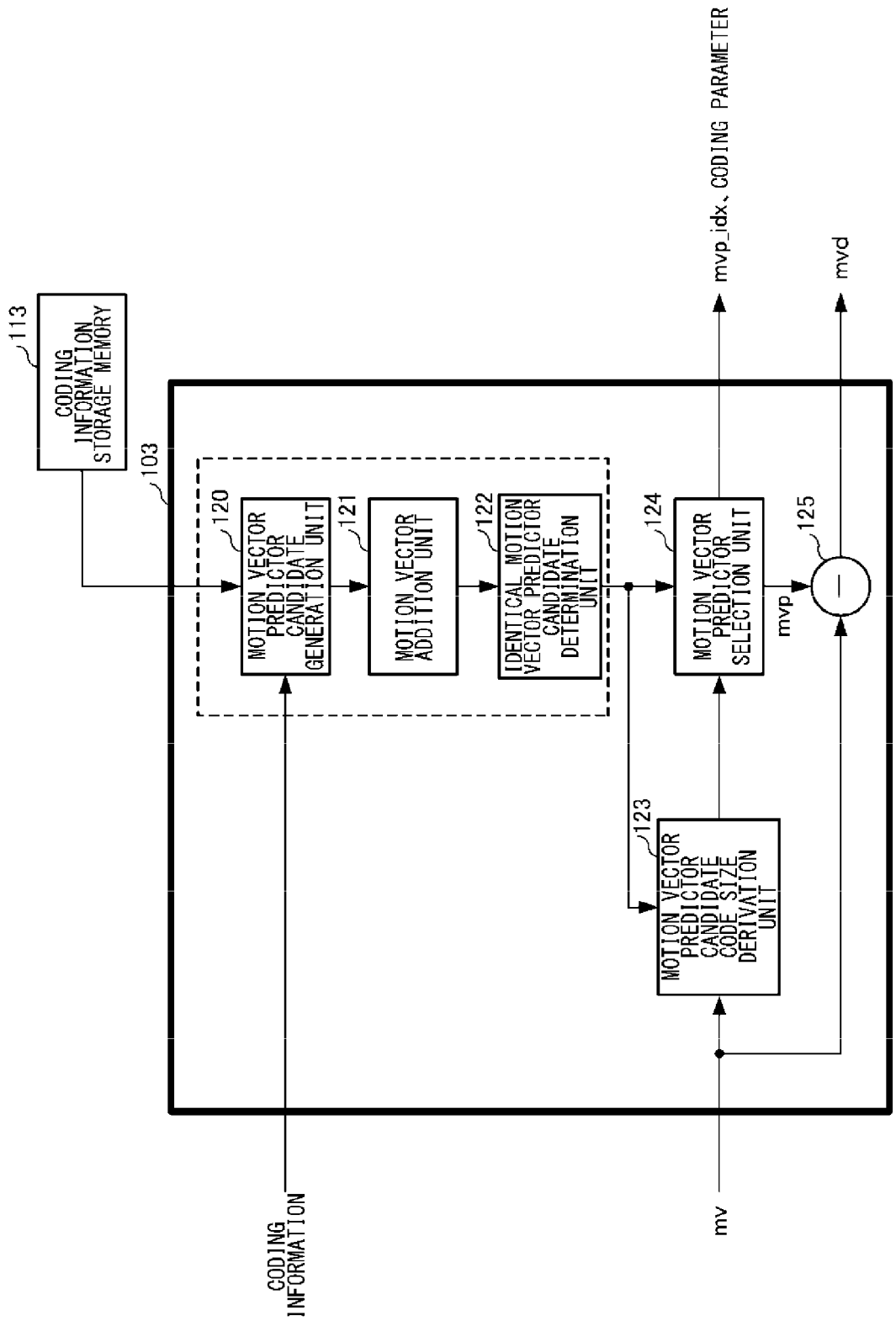
FIG. 12 is a block diagram showing the detailed configuration of the motion vector difference derivation unit of FIG. 1.

FIG. 12 shows the detailed configuration of the motion vector difference derivation unit 103 of the moving picture coding device of FIG. 1. The part bounded by the heavy line in FIG. 12 represents the motion vector difference derivation unit 103.

The part bounded by the heavy dotted line further inside indicates the part where the method of predicting a motion vector described later is performed. The moving picture decoding device corresponding to the moving picture coding device according to the embodiment contains a similar part so that the consistent, same result of decision is obtained on the coding side and on the decoding side. The method of predicting a motion vector will be described with reference to the drawings.

The motion vector difference derivation unit 103 includes a motion vector predictor candidate generation unit 120, a motion vector predictor addition unit 121, an identical motion vector predictor candidate decision unit 122, a motion vector predictor candidate code size derivation unit 123, a motion vector predictor selection unit 124, and a motion vector subtraction unit 125. The motion vector difference derivation unit 103 derives motion vector predictors indicating differences in motion vectors and used in the method of inter prediction selected for the block subject to coding. More specifically, the motion vector difference derivation unit 103 derives a motion vector difference indicating a difference between motion vectors for L0 prediction, if L0 prediction is defined for the block subject to coding. If L1 prediction is defined for the block subject to coding, the motion vector difference derivation unit 103 derives a motion vector difference indicating a difference between motion vectors for L1 prediction. If bi-prediction is defined for the block subject to coding, both L0 prediction and L1 prediction are performed. A motion vector difference between motion vectors for L0 prediction, and a motion vector difference between motion vectors for L1 prediction are derived.

For each of the reference lists (L0, L1), the motion vector predictor candidate generation unit 120 derives mvLXA, mvLXB, and mvLXCol for three prediction block groups, respectively, the three groups including: the prediction block group neighboring to the left (the prediction block group neighboring the prediction block subject to coding to the left in the same picture as the subject prediction block: A0, A1, A2 of FIG. 5); the prediction block group neighboring above (the prediction block group neighboring the prediction block subject to coding above in the same picture as the subject prediction block: B0, B1, B2 of FIG. 5); and the prediction block group at a different point of time (the coded prediction block group located at the same position as or in the neighborhood of the prediction block subject to coding in a picture at a point of time different from the prediction block subject to coding: T0, T1, T2, T3 of FIG. 9). The motion vector predictor candidate generation unit 120 defines mvLXA, mvLXB, and mvLXCol as motion vector predictor candidates and supplies the candidates to the motion vector predictor addition unit 121. Hereinafter, mvLXA and mvLXB will be referred to as spatial motion vectors, and mvLXCol will be referred to as a temporal motion vector. For derivation of a motion vector predictor candidate, the motion vector predictor candidate generation unit 120 uses coding information including the prediction mode of the coded prediction block stored in the coding information storage memory 114, the reference indices in each reference list, POC of the reference picture, the motion vector, etc.

The motion vector predictor candidates mvLXA, mvLXB, and mvLXCol may be derived by scaling in accordance with the relationship between POC of the picture subject to coding and POC of the reference picture.

The motion vector predictor candidate generation unit 120 checks prediction blocks in each prediction block group in a predefined order to determine whether predetermined conditions described later are met. The motion vector predictor candidate generation unit 120 selects the motion vector of the prediction block that first matches the condition and defines the selected motion vector as the motion vector predictor candidate mvLXA, mvLXB, or mvLXCol.

Checking by the motion vector predictor candidate generation unit 120 of the prediction blocks to determine whether the conditions described later are met proceeds: in the order from bottom to top in the prediction block group neighboring to the left (in the order A0, A1, A2 of FIG. 5) to derive a motion vector predictor from the prediction block group neighboring to the left; in the order from right to left in the prediction block group neighboring above (in the order B0, B1, B2 of FIG. 5) to derive a motion vector predictor from the prediction block group neighboring above; and in the order T0, T1, T2, T3 of FIG. 9 to derive a motion vector predictor from the prediction block group at a different point of time. The motion vector predictor candidate generation unit 120 selects the motion vector of the prediction block that first meets the condition and defines the selected motion vector as the motion vector predictor candidate mvLXA, mvLXB, or mvLXCol.

In other words, the lowermost prediction block in the prediction block group neighboring to the left is given the highest priority, and priority is assigned to the blocks in the descending order from bottom to top. The rightmost prediction block in the prediction block group neighboring above is given the highest priority, and priority is assigned to the blocks in the descending order from right to left. The prediction block T0 is given the highest priority in the prediction block group at a different point of time, and priority is assigned in the descending order of T0, T1, T2, T3. The order of priority based on the position of prediction blocks will be referred to as priority order A.

(Explanation of a Loop for Checking Against Conditions)

The prediction block group neighboring to the left and the prediction block group neighboring above are checked whether the following conditions 1, 2, 3, 4 are met in the stated order. An exception to this is method 5 described later, in which the conditions are applied in the order 1, 3, 2, 4.

Condition 1: For prediction in the neighboring prediction block, the same reference list and reference index (reference frame) as used in deriving a motion vector from which is derived a motion vector difference for the prediction block subject to coding/decoding, are used.

Condition 2: For prediction in the neighboring prediction block, a reference list different from the list used in deriving a motion vector, from which is derived a motion vector difference for the prediction block subject to coding/decoding, and the same reference frame as used in the prediction block subject to coding/decoding are used.

Condition 3: For prediction in the neighboring prediction block, the same reference list as used in deriving a motion vector, from which is derived a motion vector difference for the prediction block subject to coding/decoding, and a reference frame different from the frame as used in the prediction block subject to coding/decoding are used.

Condition 4: For prediction in the neighboring prediction block, a reference list and a reference frame different from those used in deriving a motion vector, from which is derived a motion vector difference for the prediction block subject to coding/decoding, are used.

The order of priority based on the conditions listed above will be referred to as priority order B. If any of these conditions is met, it is determined that a motion vector that meets the condition is available in the prediction block so that the subsequent blocks are not checked to determine whether the conditions are met. If condition 1 or condition 2 is met, the motion vector for the neighboring prediction block that meets the condition corresponds to the same reference list and so is directly defined as the motion vector predictor candidate. If condition 3 or condition 4 is met, the motion vector for the neighboring block that meets the condition corresponds to a different reference frame so that the motion vector is subject to scaling before being defined as the motion vector predictor candidate. If the prediction blocks are checked against the conditions in sequence instead of in parallel, and if it is determined, in checking the second prediction block group in sequence (e.g., in checking the prediction block group neighboring above, in the case that the prediction block group neighboring to the left is checked against the conditions first), the motion vector predictor candidate for the prediction block group is of the same value as the motion vector predictor candidate determined in the previous prediction block group, the motion vector predictor candidate identified in the second group may not be employed and control may proceed to check the next prediction block against the conditions. By continuing to check the next prediction block group as described above, reduction in the number of motion vector predictor candidates can be prevented.

The following four methods may be defined as a means of formulating a loop to scan the spatial prediction blocks. The appropriateness and the maximum processing volume differ depending on the method. These factors are taken into consideration, and one of the following methods is selected and defined for use. Only method 1 will be described in detail with reference to the flowcharts of FIGS. 17-21. A skilled person would be able to design the steps to implement the other methods 2-4 in compliance with the steps to implement method 1, so that a detailed description will be omitted. The following description concerns processing spatial prediction blocks in a loop in the moving picture coding device. However, the process in the moving picture decoding device could be similar to the process described below.

Method 1: One of the four conditions is applied to a given prediction block. If the condition is not met, the condition is applied to the next prediction block. When the prediction blocks have been checked against the conditions, going through four cycles, the process is terminated. More specifically, the conditions are applied in the following order of priority (N is A or B).

1. Check prediction block N0 against condition 1 (same reference list, same reference frame)
2. Check prediction block N1 against condition 1 (same reference list, same reference frame)
3. Check prediction block N2 against condition 1 (same reference list, same reference frame)
4. Check prediction block N0 against condition 2 (different reference list, same reference frame)
5. Check prediction block N1 against condition 2 (different reference list, same reference frame)
6. Check prediction block N2 against condition 2 (different reference list, same reference frame)
7. Check prediction block N0 against condition 3 (same reference list, different reference frame)
8. Check prediction block N1 against condition 3 (same reference list, different reference frame)

9. Check prediction block N2 against condition 3 (same reference list, different reference frame)

10. Check prediction block N0 against condition 4 (different reference list, different reference frame)

11. Check prediction block N1 against condition 4 (different reference list, different reference frame)

12. Check prediction block N2 against condition 4 (different reference list, different reference frame)

According to method 1, a motion vector predictor that uses the same reference list as the target block and that does not require scaling is likely to be selected so that the code size of the motion vector difference is likely to be reduced advantageously.

Method 2: Selection of a motion vector predictor that uses the same prediction frame and that does require scaling is given priority. Two of the four conditions are successively applied to a each prediction block. If the conditions are not met, the conditions are then applied to the next prediction block. In the first cycle, conditions 1 and 2 are applied. In the next cycle through the prediction blocks, conditions 3 and 4 are applied. More specifically, the conditions are applied in the following order of priority (N is A or B).

1. Check prediction block N0 against condition 1 (same reference list, same reference frame)

2. Check prediction block N0 against condition 2 (different reference list, same reference frame)

3. Check prediction block N1 against condition 1 (same reference list, same reference frame)

4. Check prediction block N1 against condition 2 (different reference list, same reference frame)

5. Check prediction block N2 against condition 1 (same reference list, same reference frame)

6. Check prediction block N2 against condition 2 (different reference list, same reference frame)

7. Check prediction block N0 against condition 3 (same reference list, different reference frame)

8. Check prediction block N0 against condition 4 (different reference list, different reference frame)

9. Check prediction block N1 against condition 3 (same reference list, different reference frame)

10. Check prediction block N1 against condition 4 (different reference list, different reference frame)

11. Check prediction block N2 against condition 3 (same reference list, different reference frame)

12. Check prediction block N2 against condition 4 (different reference list, different reference frame)

According to method 2, as in method 1, a motion vector predictor that uses the same reference list as the target block and that does not require scaling is likely to be selected so that the code size of the motion vector difference is likely to be reduced advantageously. Further, the maximum number of cycles is 2 so that the number of accesses to the coding information of prediction blocks in the memory is smaller than that of method 1 and complexity required in hardware implementation is reduced accordingly.

Method 3: In the first cycle, condition 1 is applied to the prediction blocks. If the condition is not met, the condition is then applied to the next prediction block. In the next cycle, conditions 2, 3, and 4 are applied to each prediction block before proceeding to the next prediction block. More specifically, the conditions are applied in the following order of priority (N is A or B).

1. Check prediction block N0 against condition 1 (same reference list, same reference frame)

2. Check prediction block N1 against condition 1 (same reference list, same reference frame)

3. Check prediction block N2 against condition 1 (same reference list, same reference frame)

4. Check prediction block N0 against condition 2 (different reference list, same reference frame)

5. Check prediction block N0 against condition 3 (same reference list, different reference frame)

6. Check prediction block N0 against condition 4 (different reference list, different reference frame)

7. Check prediction block N1 against condition 2 (same reference list, different reference frame)

8. Check prediction block N1 against condition 3 (same reference list, different reference frame)

9. Check prediction block N1 against condition 4 (different reference list, different reference frame)

10. Check prediction block N2 against condition 2 (different reference list, same reference frame)

11. Check prediction block N2 against condition 3 (same reference list, different reference frame)

12. Check prediction block N2 against condition 4 (different reference list, different reference frame)

According to method 3, a motion vector predictor that uses the same reference list and the same reference frame as the target block and that does not require scaling is likely to be selected so that the code size of the motion vector difference is likely to be reduced advantageously. Further, the maximum number of cycles is 2 so that the number of accesses to the coding information of prediction blocks in the memory is smaller than that of method 1 and complexity required in hardware implementation is reduced accordingly.

Method 4: Four conditions are successively applied to a given prediction block. If none of the conditions is met, it is determined that no motion vectors that match the conditions is available in the prediction block so that the conditions are applied to the next prediction block. Priority is given to successively applying the conditions to a given prediction block. More specifically, the conditions are applied in the following order of priority (N is A or B).

1. Check prediction block N0 against condition 1 (same reference list, same reference frame)

2. Check prediction block N0 against condition 2 (different reference list, same reference frame)

3. Check prediction block N0 against condition 3 (same reference list, different reference frame)

4. Check prediction block N0 against condition 4 (different reference list, different reference frame)

5. Check prediction block N1 against condition 1 (same reference list, same reference frame)

6. Check prediction block N1 against condition 2 (different reference list, same reference frame)

7. Check prediction block N1 against condition 3 (same reference list, different reference frame)

8. Check prediction block N1 against condition 4 (different reference list, different reference frame)

9. Check prediction block N2 against condition 1 (same reference list, same reference frame)

10. Check prediction block N2 against condition 2 (different reference list, different reference frame)

11. Check prediction block N2 against condition 3 (same reference list, different reference frame)

12. Check prediction block N2 against condition 4 (different reference list, different reference frame)

According to method 4, the maximum number of cycles is 1 so that the number of accesses to the coding information of prediction blocks in the memory is smaller than that of method 1, method 2, or method 3 and complexity required in hardware implementation is reduced accordingly.

Method 5: As in method 4, four conditions are successively applied to a given prediction block. If none of the conditions is not met, it is determined that no motion vectors that match the conditions is available in the prediction block so that the conditions are applied to the next prediction block. Priority is given to successively applying the conditions to a given prediction block. While method 4 gives priority to referring to the same reference frame in checking a given prediction block against the conditions, method 5 gives priority to referring to the same reference list. More specifically, the conditions are applied in the following order of priority (N is A or B).

1. Check prediction block N0 against condition 1 (same reference list, same reference frame)
2. Check prediction block N0 against condition 3 (same reference list, different reference frame)
3. Check prediction block N0 against condition 2 (different reference list, same reference frame)
4. Check prediction block N0 against condition 4 (different reference list, different reference frame)
5. Check prediction block N1 against condition 1 (same reference list, same reference frame)
6. Check prediction block N1 against condition 3 (same reference list, different reference frame)
7. Check prediction block N1 against condition 2 (different reference list, same reference frame)
8. Check prediction block N1 against condition 4 (different reference list, different reference frame)
9. Check prediction block N2 against condition 1 (same reference list, same reference frame)
10. Check prediction block N2 against condition 3 (same reference list, different reference frame)
11. Check prediction block N2 against condition 2 (different reference list, same reference frame)
12. Check prediction block N2 against condition 4 (different reference list, different reference frame)

According to method 5, the number of references to the reference list of the prediction block is further reduced as compared with method 4. Complexity is reduced by reducing the frequency of memory accesses and processing volume required for, for example, checking against the conditions. As in method 4, the maximum number of cycles is 1 so that the number of accesses to the coding information of prediction blocks in the memory is smaller than that of method 1, method 2, or method 3 and complexity required in hardware implementation is reduced accordingly.

Subsequently, the motion vector predictor addition unit 121 evaluates the order of priority of the motion vector predictor candidates mvLXA, mvLXB, and mvLXCol and stores the candidates in an MVP list mvpListLX in accordance with the order of priority. Steps for storing the candidates in the MVP list mvpListLX will be described in detail later.

The identical motion vector predictor candidate decision unit 122 finds identical motion vector values from the motion vector predictor candidates stored in the MVP list mvpListLX. The identical motion vector predictor candidate decision unit 122 allows one of the motion vector predictor candidates found to have the identical motion vector values to remain in the MVP list mvpListLX and deletes the other candidates from the list, thereby preventing duplication of motion vector predictor candidates and updating the MVP list mvpListLX accordingly. The identical motion vector predictor candidate decision unit 122 supplies the updated MVP list mvpListLX to the motion vector predictor candidate code size derivation unit 123 and the motion vector predictor selection unit 124.

Meanwhile, the motion vector estimation unit 102 of FIG. 1 detects a motion vector mv in each prediction block. The motion vector mv is input to the motion vector predictor candidate code size derivation unit 123 along with the motion vector predictor candidates in the updated MVP list mvpListLX.

The motion vector predictor candidate code size derivation unit 123 derives motion vector differences between the motion vector mv and the motion vector predictor candidates stored in the MVP list mvpListLX. The motion vector predictor candidate code size derivation unit 123 derives the code sizes produced when the motion vector differences are coded, for each of the elements in the MVP list mvpListLX, and supplies the code sizes to the motion vector predictor selection unit 124.

The motion vector predictor selection unit 124 selects, from the elements added in the MVP list mvpListLX, the motion vector predictor candidate mvpListLX[i] with the smallest code size as the motion vector predictor mvp. If a plurality of motion vector predictor candidates having the smallest generated code size are found in the MVP list mvpListLX, the motion vector predictor selection unit 124 selects the motion vector predictor candidate mvpListLX[i] with the smallest index in the MVP list mvpListLX, as the optimum motion vector predictor mvp. The motion vector predictor selection unit 124 supplies the selected motion vector predictor mvp to the motion vector subtraction unit 125. Further, the motion vector predictor selection unit 124 outputs the index i in the MVP list corresponding to the selected motion vector predictor mvp as an MVP index mvp_idx for LX (X=0 or 1).

The motion vector predictor selection unit 124 also outputs, as needed, the coding information used in the prediction block in the MVP list indicated by mvp_idx to the prediction method decision unit 106 of FIG. 1. The coding information output includes weight parameters for weighted prediction, quantization parameters for quantization, etc.

Finally, the motion vector subtraction unit 125 derives a motion vector difference mvd by subtracting the selected motion vector predictor mvp from the motion vector mv and outputs the motion vector difference mvd.

$$mvd = mv - mvp$$

Referring back to FIG. 1, the motion compensation prediction unit 105 refers to a decoded picture stored in the decoded picture memory 115 and performs motion compensation in accordance with the motion vector mv supplied from the motion vector estimation unit 102, so as to obtain a motion compensated prediction signal. The motion compensation prediction unit 105 supplies the motion compensated prediction signal to the prediction method decision unit 106.

The prediction method decision unit 106 determines the method of prediction. The prediction method decision unit 106 derives the code size and coding distortion for each prediction mode. The prediction block size and prediction mode that gives the smallest code size and coding distortion generated are determined. The motion vector difference mvd supplied from the motion vector subtraction unit 125 of the motion vector difference derivation unit 103 and the index mvp_idx indicating the motion vector predictor and supplied from the motion vector predictor selection unit 124 are coded and the code size of motion information is derived. Further, the code size of a prediction residual signal code, obtained by coding an error between the motion compensated prediction signal supplied from the motion compensation prediction unit 105 and the picture signal subject to coding supplied from the picture memory 101, is derived. The total generated code size is determined by deriving a sum of the code size of the motion information and the code size of the prediction residual signal. The derived size is defined as the first evaluation value.

The picture difference thus coded is then decoded for evaluation as to the amount of distortion. Coding distortion is derived as a ratio indicating an error from the original picture produced as a result of coding. By comparing the total code size and coding distortion from one instance of motion compensation with that of another, the prediction block size and the prediction mode that result in the smallest code size and coding distortion are determined. The aforementioned method of predicting a motion vector is performed using the motion vector mv determined by the prediction block size and prediction mode thus determined. The index indicating the motion vector predictor is coded as a flag mvp_idx_lX[i] defined in the second syntax pattern for each prediction block. While it is desirable to derive the generated code size by simulating the coding steps, the generated code size may be determined by approximate derivation or rough estimation.

(Prediction of a Motion Vector in Decoding)

A description will be given of a method according to the embodiment of predicting a motion vector in a moving picture decoding device for decoding a coded bitstream of moving pictures.

A description will be given of flags in a bitstream decoded by the first bitstream decoding unit 202. FIG. 10 shows a first syntax pattern written in a slice header of each slice in a bitstream generated by the moving picture coding device according to the embodiment and decoded by the first bitstream decoding unit 202. If it is known from the flag written in the slice header of a bitstream that the slice type is either P or B, a first flag mv_competition_temporal_flag is decoded. The first flag mv_competition_temporal_flag indicates, in a prediction block in which the merge mode is not defined for inter prediction, whether to predict a motion vector by using a motion vector of a prediction block located at the same position as or in the neighborhood of the target prediction block in a picture at a different point of time as well as using a motion vector of a neighboring prediction block in the same picture, and indicates, in a prediction block in which the merge mode is defined for inter prediction, whether to perform inter prediction by using coding information of a prediction block located at the same position as or in the neighborhood of the target prediction block in a picture at a different point of time as well as using coding information of a neighboring prediction block in the same picture. If mv_competition_temporal_flag is true (1), a motion vector is predicted, in a prediction block in which the merge mode is not defined for inter prediction, by using a motion vector of a prediction block located at the same position as or in the neighborhood of the target prediction block in a picture at a different point of time as well as using a motion vector of a neighboring prediction block in the same picture, and inter prediction is performed, in a prediction block in which the merge mode is defined for inter prediction, by using coding information of a prediction block located at the same position as or in the neighborhood of the target prediction block in a picture at a different point of time as well as using coding information of a neighboring prediction block in the same picture. Further, if mv_competition_temporal_flag is true (1), a second flag mv_temporal_high_priority_flag is decoded and examined. If mv_temporal_high_priority_flag is true (1), a motion vector or a merge candidate of a prediction block located at the same position as or in the neighborhood of the prediction block subject to coding/decoding in a picture at a different point of time is added in the MVP list or the merge candidate list in preference to other candidates.

If the slice type is "B", a third flag collocated_from_l0_flag is decoded so as to determine which of the L0 and L1 reference picture lists for the picture including the target prediction block should be used. The flag collocated_from_l0_flag is defined to indicate which of the L0 reference list and the L1 reference list for the picture including the target prediction block includes the picture colPic located at a different point of time and used to derive the motion vector predictor candidate or the merge candidate in the temporal dimension.

Further, if the slice type is P or B, a fourth flag mv_list_adaptive_idx_flag is decoded so as to adaptively change the order of addition in the MVP list or the merge candidate list described later depending on the prediction block. The flag mv_list_adaptive_idx_flag is defined to indicate whether the order of addition in the MVP list or the merge candidate list described later is changed adaptively depending on the prediction block.

The syntax elements described above may be defined in a picture parameter set that defines syntax elements in units of pictures.

Variations of the first flag mv_competition_temporal_flag, the second flag mv_temporal_high_priority_flag, the third flag collocated_from_l0_flag, and the fourth flag mv_list_adaptive_idx_flag may be provided for non-merge motion prediction and for the merge mode and be independently controlled.

FIG. 11 shows a second syntax pattern defined for each prediction block in a bitstream generated by the moving picture coding device according to the embodiment and decoded by the first bitstream decoding unit 202. FIG. 11 shows a syntax pattern defined for each prediction block. In the case of inter prediction (if MODE_INTER is substituted into PredMode, indicating the prediction mode of the prediction block), a flag merge_flag[x0][y0] indicating whether the merge mode is used is decoded. x0 and y0 are indices indicating the position of the top left pixel in the prediction block in the screen. merge_flag[x0][y0] is a flag defined to indicate whether the merge mode is used in the prediction located at (x0, y0) in the screen.

If merge_flag[x0][y0] is 1 and if NumMergeCand, indicating the total number of candidates in the merge mode, exceeds 1, the syntax element merge_idx[x0][y0], which denotes an index in a merge list (a list of motion vector predictor candidates referred to), is decoded. x0 and y0 are indices indicating the position of the top left pixel in the prediction block in the screen. merge_idx[x0][y0] is a merge index for the prediction block located at (x0, y0) in the screen.

Meanwhile, if merge_flag[x0][y0] is 0, the syntax element mvd_lX[x0][y0][j], which denotes a motion vector difference between a motion vector for the prediction block determined through motion vector estimation and a motion vector predictor, is decoded for each reference list LX (X=0 or 1). X is either 0 or 1 and denotes a direction of prediction, the index x0 in the array indicates the x coordinate of the prediction block, y0 indicates the y coordinate of the prediction block, and j indicates a component of the motion vector difference, j=0 indicating an x component, and j=1 indicating a y component. If the total number of motion vector predictor candidates exceeds 1, the syntax element mvp_idx_lX[x0][y0], which denotes an index in an MVP list (a list of motion vector predictor candidates referred to), is decoded. x0 and y0 are indices indicating the position of the top left pixel in the prediction block in the screen. mvp_idx_lX[x0][y0] is an MVP index in a list LX for the prediction block located at (x0, y0) in the screen. The suffix LX indicates a reference list. L0 and L1 are provided so that 0 or 1 may be substituted into X. NumMVPCand (LX) is a function for deriving the total number of motion vector predictor candidates for the prediction block identified in the direction of prediction LX (X is either 0 or 1) and will be described later. The index mvp_idx_lX[x0][y0] in the MVP list is coded only when the method of predicting a motion vector identifies the total number of motion vector predictor candidates NumMVPCand (LX) as exceeding 1. This is because, if the total number of motion vector predictor candidates is 1, that one candidate will be the motion vector predictor to be used so that the motion vector predictor candidate referred to is uniquely identified without transmitting mvp_idx_lX[x0][y0].

Figure 13:
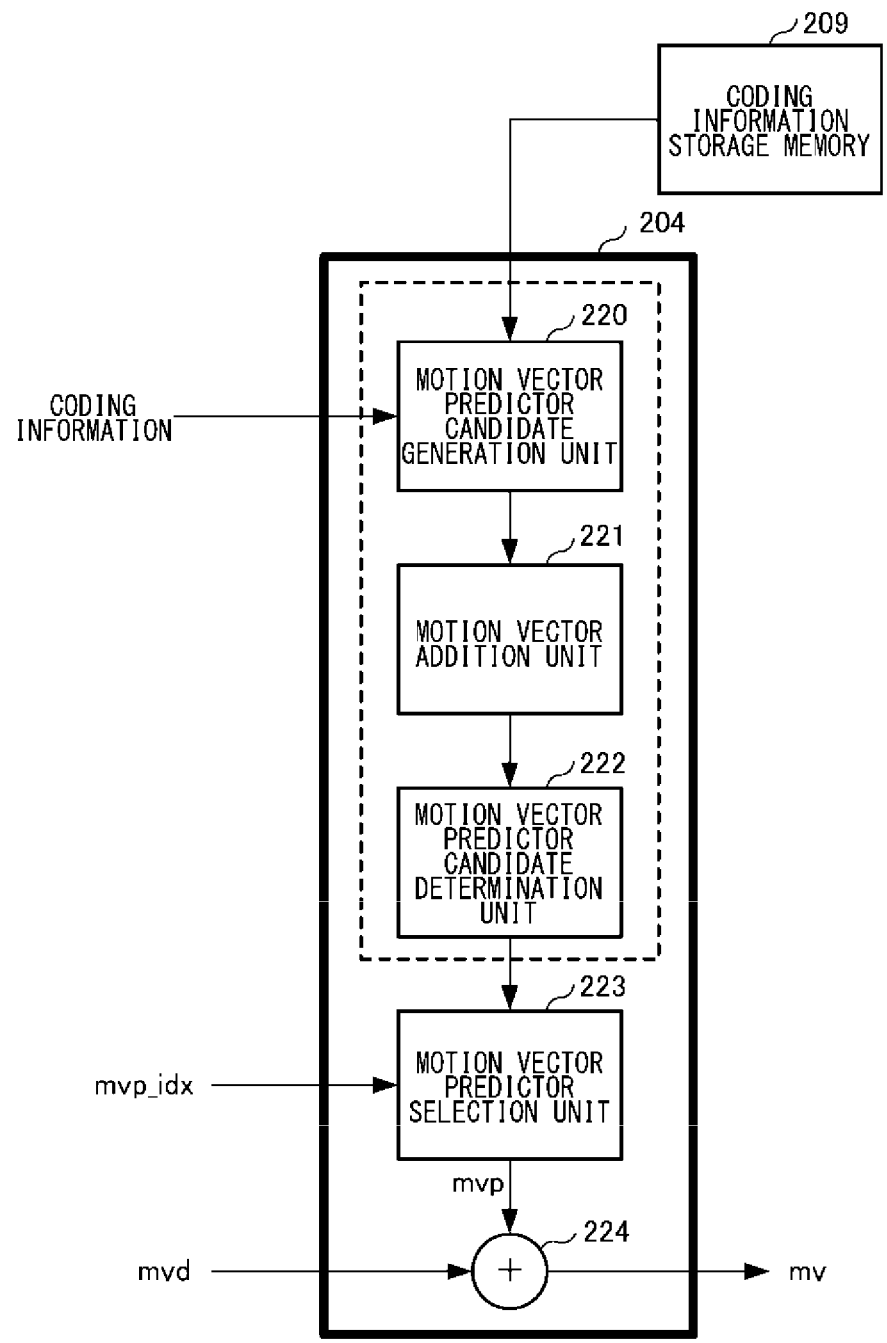
FIG. 13 is a block diagram showing the detailed configuration of the motion vector derivation unit of FIG. 2.

When the method of predicting a motion vector according to the embodiment is performed, the motion vector derivation unit 204 of the moving picture decoding device of FIG. 2 performs the associated process. FIG. 13 shows the detailed configuration of the motion vector derivation unit 204 of the moving picture decoding device of FIG. 2 corresponding to the moving picture coding device according to the embodiment. The part bounded by the heavy dotted line in FIG. 13 represents the motion vector derivation unit 204. The part bounded by the heavy dotted line further inside indicates the part where the method of predicting a motion vector described later is performed. The moving picture coding device corresponding to the moving picture decoding device contains a similar part so that the consistent, same result of decision is obtained on the coding side and on the decoding side. The method of predicting a motion vector on the decoding side will be described with reference to the drawings.

The motion vector derivation unit 204 includes a motion vector predictor candidate generation unit 220, a motion vector predictor addition unit 221, an identical motion vector predictor candidate decision unit 222, a motion vector predictor selection unit 223, and a motion vector addition unit 224.

By defining the motion vector predictor candidate generation unit 220, the motion vector predictor addition unit 221, and the identical motion vector predictor candidate decision unit 222 in the motion vector derivation unit 204 to operate identically with the motion vector predictor candidate generation unit 120, the motion vector predictor addition unit 121, and the identical motion vector predictor candidate decision unit 122 in the motion vector difference derivation unit 103 on the coding side, respectively, identical motion vector predictor candidates can be obtained on the coding side and on the decoding side.

The motion vector predictor candidate generation unit 220 performs the same process as the motion vector predictor candidate generation unit 120 of FIG. 12. The motion vector predictor candidate generation unit 220 reads, from the coding information storage memory 209, motion vectors of a decoded prediction block neighboring the block subject to decoding in the same picture as the block subject to decoding and of a decoded prediction block located at the same position as or in the neighborhood of the block subject to decoding in a picture at a different point of time, the motion vectors being decoded and stored in the coding information storage memory 209. The motion vector predictor candidate generation unit 220 generates at least one motion vector predictor candidate mvLXA, mvLXB, and mvLXCol from the decoded motion vectors of other blocks read from the coding information storage memory 209. The motion vector predictor candidate generation unit 220 supplies the generated candidates to the motion vector predictor addition unit 221. The motion vector predictor candidates mvLXA, mvLXB, and mvLXCol may be derived by scaling, depending on the reference index. The motion vector predictor candidate generation unit 220 performs the same process as the motion vector predictor candidate generation unit 120 of FIG. 12. Therefore, methods 1, 2, 3, 4, and 5 described in association with the motion vector predictor candidate generation unit 120 of FIG. 12 as a means to derive a motion vector predictor can also be applied to the motion vector predictor candidate generation unit 220 so that a detailed description thereof is omitted.

The motion vector predictor addition unit 221 performs the same operation as the motion vector predictor addition unit 121 of FIG. 12. The motion vector predictor addition unit 121 evaluates the order of priority of the motion vector predictor candidates mvLXA, mvLXB, and mvLXCol and stores the candidates in an MVP list mvpListLX in accordance with the order of priority. Steps for storing the candidates in the MVP list mvpListLX will be described in detail later.

Subsequently, the identical motion vector predictor candidate decision unit 222 performs the same process as the identical motion vector predictor candidate decision unit 122 of FIG. 12. The identical motion vector predictor candidate decision unit 222 finds identical motion vector values from the motion vector predictor candidates stored in the MVP list mvpListLX. The identical motion vector predictor candidate decision unit 222 allows one of the motion vector predictor candidates found to have the identical motion vector values to remain in the MVP list mvpListLX and deletes the other candidates from the list, thereby preventing duplication of motion vector predictor candidates and updating the MVP list mvpListLX accordingly. The updated MVP list mvpListLX is provided to the motion vector predictor selection unit 223.

The motion vector difference mvd retrieved by decoding in the first bitstream decoding unit 202 is input to the motion vector addition unit 224. If the index mvp_idx indicating the motion vector predictor is coded, the index mvp_idx of the motion vector predictor retrieved by decoding in the first bitstream decoding unit 202 is input to the motion vector predictor selection unit 223.

Thus, the motion vector predictor selection unit 223 receives the motion vector predictor candidate remaining in the MVP list mvpListLX plus, if the index mvp_idx indicating the motion vector predictor is coded, the index mvp_idx indicating the decoded motion vector predictor.

The motion vector predictor selection unit 223 first determines whether only one motion vector predictor candidate remains in the MVP list mvpListLX. If one candidate remains in the list, the motion vector predictor selection unit 223 retrieves the motion vector predictor candidate remaining in the MVP list mvpListLX as the motion vector predictor mvp. If more than one motion vector predictor candidate remains in the MVP list mvpListLX, the motion vector predictor selection unit 223 reads the index mvp_idx of the motion vector predictor retrieved by decoding in the first bitstream decoding unit 202 and retrieves the motion vector predictor candidate corresponding to the read index mvp_idx from the MVP list mvpListLX. The motion vector predictor selection unit 223 supplies the retrieved motion vector predictor candidate to the motion vector addition unit 224 as the motion vector predictor mvp.

Finally, the motion vector addition unit 224 derive a motion vector mv by adding the motion vector difference mvd retrieved by decoding in the first bitstream decoding unit 202 and supplied therefrom to the motion vector predictor mvp, and outputs the motion vector mv.

$$mv=mvp+mvd$$

As described above, a motion vector is derived for each prediction block. The motion vector is used to generate a predicted picture by motion compensation. By adding the predicted picture to the residual signal retrieved from the bitstream by decoding, a decoded picture is generated.

Figure 14:
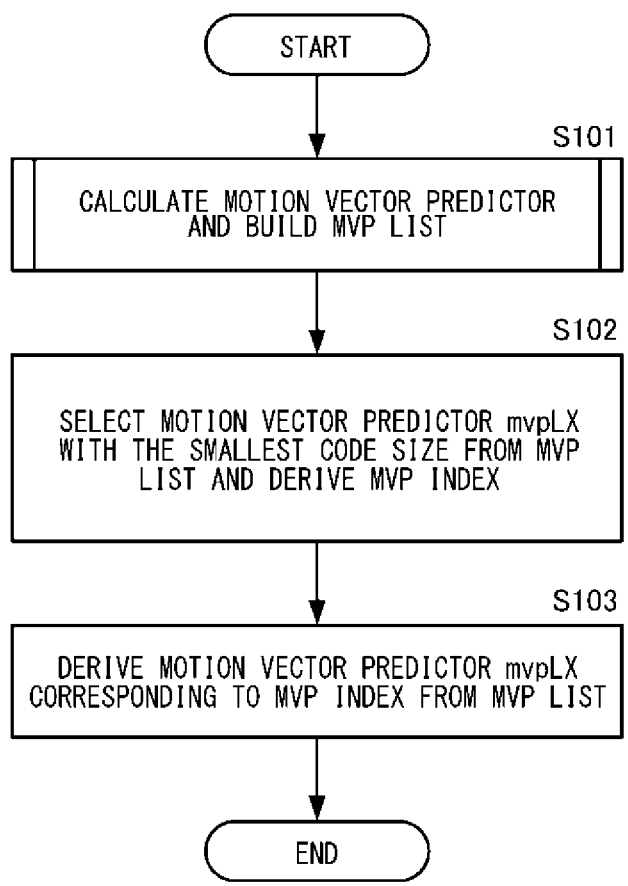
FIG. 14 is a flowchart showing the operation of the motion vector difference derivation unit of FIG. 1.
Figure 15:
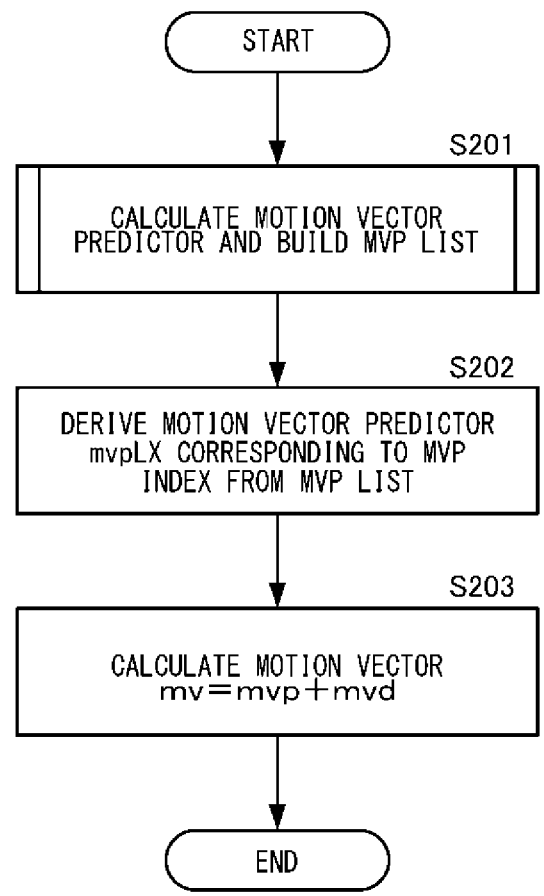
FIG. 15 is a flowchart showing the operation of the motion vector derivation unit of FIG. 2.

The processing steps in the motion vector difference derivation unit 103 of the moving picture coding device and that of the motion vector derivation unit 204 of the moving picture decoding device will be described with reference to the flowcharts of FIGS. 14 and 15, respectively. FIG. 14 is a flowchart showing the processing steps to derive a motion vector difference in the moving picture coding device, and FIG. 15 is a flowchart showing the processing steps to derive a motion vector in the moving picture decoding device.

The processing steps performed on the coding side will be described with reference to FIG. 14. On the coding side, the motion vector predictor candidate generation unit 120, the motion vector predictor addition unit 121, and the identical motion vector predictor candidate decision unit 122 in the motion vector difference derivation unit 103 builds an MVP list by deriving motion vector predictor candidates, adding the derived motion vector predictor candidates to the MVP list, and deleting unnecessary motion vector predictor candidates (S101).

Subsequently, the motion vector predictor candidate code size derivation unit 123 derives a motion vector difference between the motion vector mv and the motion vector predictor candidates mvpListLX[i] stored in the MVP list mvpListLX. The motion vector predictor candidate code size derivation unit 123 derives the code size of the motion vector difference as coded for each element in the MVP list mvpListLX. The motion vector predictor selection unit 124 selects, from the elements added in the MVP list mvpListLX, the motion vector predictor candidate mvpListLX[i] with the smallest code size as the motion vector predictor mvp. If a plurality of motion vector predictor candidates having the smallest generated code size are found in the MVP list mvpListLX, the motion vector predictor selection unit 124 selects the motion vector predictor candidate mvpListLX[i] with the smallest index in the MVP list mvpListLX, as the optimum motion vector predictor mvp. The motion vector predictor selection unit 124 supplies the selected motion vector predictor mvp to the motion vector subtraction unit 125. Further, the motion vector predictor selection unit 124 outputs the index i in the MVP list corresponding to the selected motion vector predictor mvp as an MVP index mvp_idx for LX (X=0 or 1) (S102).

Finally, the motion vector subtraction unit 125 derives a motion vector difference mvd by subtracting the selected motion vector predictor mvp from the motion vector mv and outputs the motion vector difference mvd (S103).

$$mvd=mv-mvp$$

A description will now be given of the processing steps performed on the decoding side with reference to FIG. 15. On the decoding side, as on the coding side, the motion vector predictor candidate generation unit 220, the motion vector predictor addition unit 221, and the identical motion vector predictor candidate decision unit 222 in the motion vector derivation unit 204 builds an MVP list by deriving motion vector predictor candidates, adding the derived motion vector predictor candidates to the MVP list, and deleting unnecessary motion vector predictor candidates (S201).

Subsequently, the motion vector predictor selection unit 223 first determines whether only one motion vector predictor candidate remains in the MVP list mvpListLX. If one candidate remains in the list, the motion vector predictor selection unit 223 retrieves the motion vector predictor candidate remaining in the MVP list mvpListLX as the motion vector predictor mvp. If more than one motion vector predictor candidate remains in the MVP list mvpListLX, the motion vector predictor selection unit 223 reads the index mvp_idx of the motion vector predictor retrieved by decoding in the first bitstream decoding unit 202 and retrieves the motion vector predictor candidate corresponding to the read index mvp_idx from the MVP list mvpListLX (S202).

Subsequently, the motion vector addition unit 224 derive a motion vector mv by adding the motion vector difference mvd retrieved by decoding in the first bitstream decoding unit 202 and supplied therefrom to the motion vector predictor mvp, and outputs the motion vector mv (S203 of FIG. 15).

$$mv=mvp+mvd$$

The method of deriving a motion vector predictor and building an MVP list performed in S101 of FIG. 14 and in S201 of FIG. 15 will be described in further detail with reference to FIG. 16.

The method of predicting a motion vector common to the moving picture coding device and the moving picture decoding device will be described.

(Method of Predicting a Motion Vector)

Figure 16:
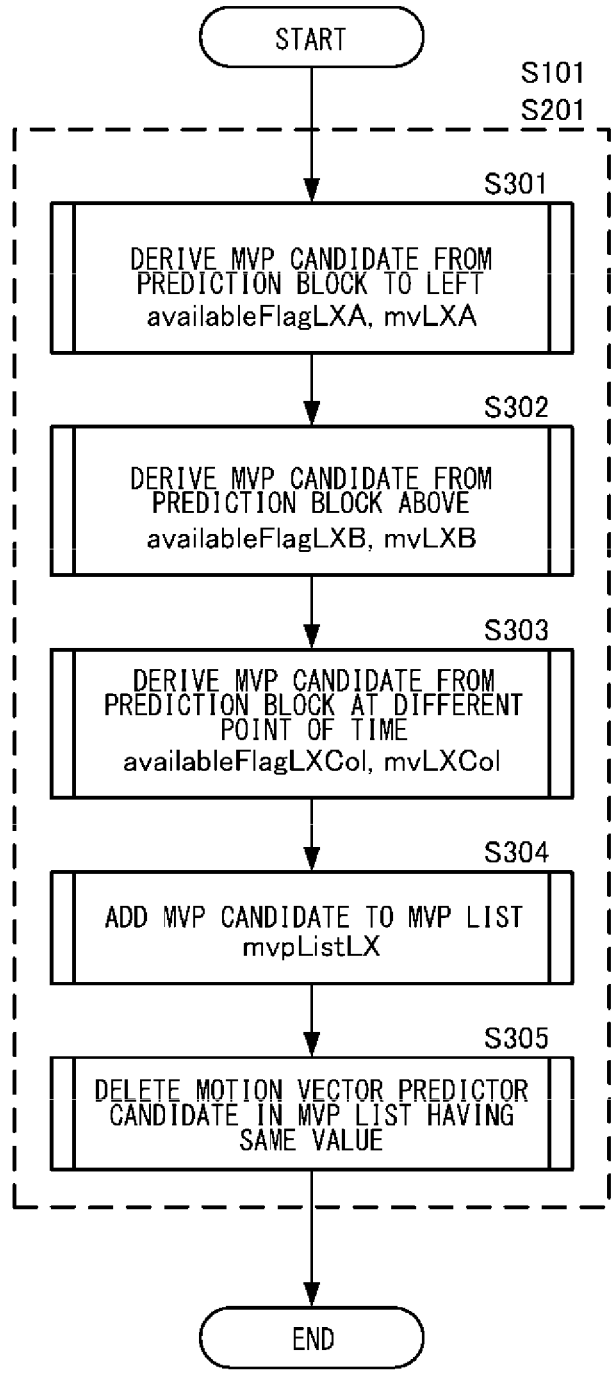
FIG. 16 is a flowchart showing a method of predicting a motion vector.

The method of deriving a motion vector predictor and building an MVP list according to the embodiment is performed in units of prediction blocks and for each reference list LX (X is 0 or 1) through steps shown in FIG. 16. If MODE_INTER (inter prediction) is substituted into PredMode, and if Pred_L0 (L0 prediction) or Pred_BI (bi-prediction) is substituted into the flag inter_pred_flag[x0][y0] indicating a method of inter prediction, motion vector predictor candidates for the reference list L0 are derived and an MVP list is built accordingly. x0 and y0 are indices indicating the position of the top left pixel in the prediction block in the screen. inter_pred_flag[x0][y0] is a flag defined to indicate a method of inter prediction in the prediction located at (x0, y0) in the screen. If Pred_L1 (L1 prediction) or Pred_BI (bi-prediction) is substituted into the flag inter_pred_flag[x0] [y0], motion vector predictor candidates for the reference list L1 are derived and an MVP list is built accordingly. In other words, if Pred_BI (bi-prediction) is substituted into inter_pred_flag[x0][y0], motion vector predictor candidates are derived both for the reference list L0 and the reference list L1 and an MVP list is built accordingly. FIG. 16 is a flowchart showing the flow of the process in the motion vector predictor candidate generation units 120, 220, the motion vector predictor addition units 121, 221, and the identical motion vector predictor candidate decision units 122, 222 having common functions in the motion vector difference derivation unit 103 of the moving picture coding device and in the motion vector derivation unit 204 of the moving picture decoding device. The steps will be described in sequence.

A motion vector predictor candidate for prediction from a prediction block neighboring to the left is derived. A flag availableFlagLXA indicating whether the neighboring block is available, a motion vector mvLXA, and POC of the reference picture pocLXA are output (S301 of FIG. 16). In the case of L0, X is 0. In the case of L1, X is 1 (the same shall apply hereinafter). A candidate motion vector predictor for prediction from a prediction block neighboring above is then derived. A flag availableFlagLXB indicating whether the neighboring block is available, a motion vector mvLXB, and POC of the reference picture pocLXB are derived (S302 of FIG. 16). The steps S301 and S302 are common to L0 prediction and L1 prediction. The common processing steps to derive the flag availableFlagLXN indicating the availability of the block, the motion vector mvLXN, and POC of the reference picture pocLXN (N is A or B, the same shall apply hereinafter) will be described later in detail with reference to the flowcharts of FIGS. 17-22.

Subsequently, the motion vector predictor candidate in the temporal dimension is derived. A flag availableFlagLXCol indicating the availability of the block, a motion vector mvLXCol, and a flag mvXCrossFlag indicating whether intersection occurs are output (S303 of FIG. 16). The processing steps for these derivations will be described later in detail with reference to the flowcharts of FIGS. 24-29 and FIG. 22.

Subsequently, the MVP list mvpListLX is constructed and motion vector predictor candidates mvLXN (N is A, B, or Col. The same shall apply hereinafter) (S304 of FIG. 16). The processing steps for these derivations will be described later in detail with reference to the flowcharts of FIGS. 30-36.

If there are a plurality of motion vectors have the same value in the MVP list mvpListLX, the motion vectors except for the motion vector earliest in the order are removed subsequently (S305 of FIG. 16).

Referring back to FIG. 15, if the number NumMVPCand (LX) of elements in the MVP list mvpListLX is 1, the ultimate MVP index mvpIdx is then defined to be 0. Otherwise, mvp_idx_LX[xP,yP] is defined as mvpIdx (S202 in FIG. 15), where xP, yP are indices indicating the position of the top left pixel in the prediction block in the screen. mvp_idx_LX[xP,yP] is an MVP index of the prediction block located at (xP, yP) in the screen from prediction using the list LX (L0 or L1). The suffix LX indicates a reference list. L0 and L1 are provided so that 0 or 1 may be substituted into X.

Subsequently, the mvpIdx-th motion vector mvpListLX [mvpIdx] added in the MVP list from prediction using LX is assigned as the ultimate motion vector predictor mvpLX from prediction using the list LX (S203 of FIG. 15).

[Derivation of Motion Vector Predictor Candidates from at Least One Prediction Block Neighboring to the Left or Above (S301, S302 of FIG. 16)]

Inputs in these steps include the coordinates (xP, yP) of the top left pixel at the start of the prediction block subject to coding/decoding in the target picture subject to coding/decoding, the width nPSW and the height nPSH of the prediction block subject to coding/decoding, and the reference index refIdxLX (X is 0 or 1) for each reference list of the prediction block. The suffix LX indicates a reference list. L0 and L1 are provided so that 0 or 1 may be substituted into X. The reference lists L0 and L1 are lists for managing a plurality of reference pictures for the purpose of performing block-by-block motion compensation in units of blocks by referring to an arbitrary one of a plurality of reference picture candidates. The reference index refIdxLX is an index assigned to each reference picture in each reference list and used to designate a reference picture.

Outputs from this process include the motion vector mvLXN of the prediction block neighboring to the left or above, the flag availableFlagLXN indicating whether the coding information of the prediction block group N derived from prediction using the reference list LX is available. 0 or 1, indicating a reference list, is substituted into the suffix X. A (left) or B (above), indicating an area of neighboring prediction block group, is substituted into N.

As shown in FIGS. 5, 6, 7, and 8, motion vector predictor candidates are derived from prediction blocks neighboring a prediction block (prediction block subject to processing by the part shown in FIG. 12) defined for the purpose of motion compensation in coding blocks in the same picture.

FIG. 5 shows a target prediction block and neighboring prediction blocks. Motion vector predictor candidates are selected from a prediction block group A comprised of prediction blocks Ak (k=0, 1, 2) neighboring the target prediction block to the left, and a prediction block group B comprised of prediction blocks Bk (k=0, 1, 2) neighboring above.

The method of deriving a motion vector predictor candidate mvLXN from prediction block groups N neighboring to the left and above (i.e., the steps S301 and S302 of FIG. 16) will be described with reference to the flowchart of FIG. 17. 0 or 1, indicating a reference list, is substituted into the suffix X. A (left) or B (above), indicating an area of neighboring prediction block group, is substituted into N.

Figure 17:
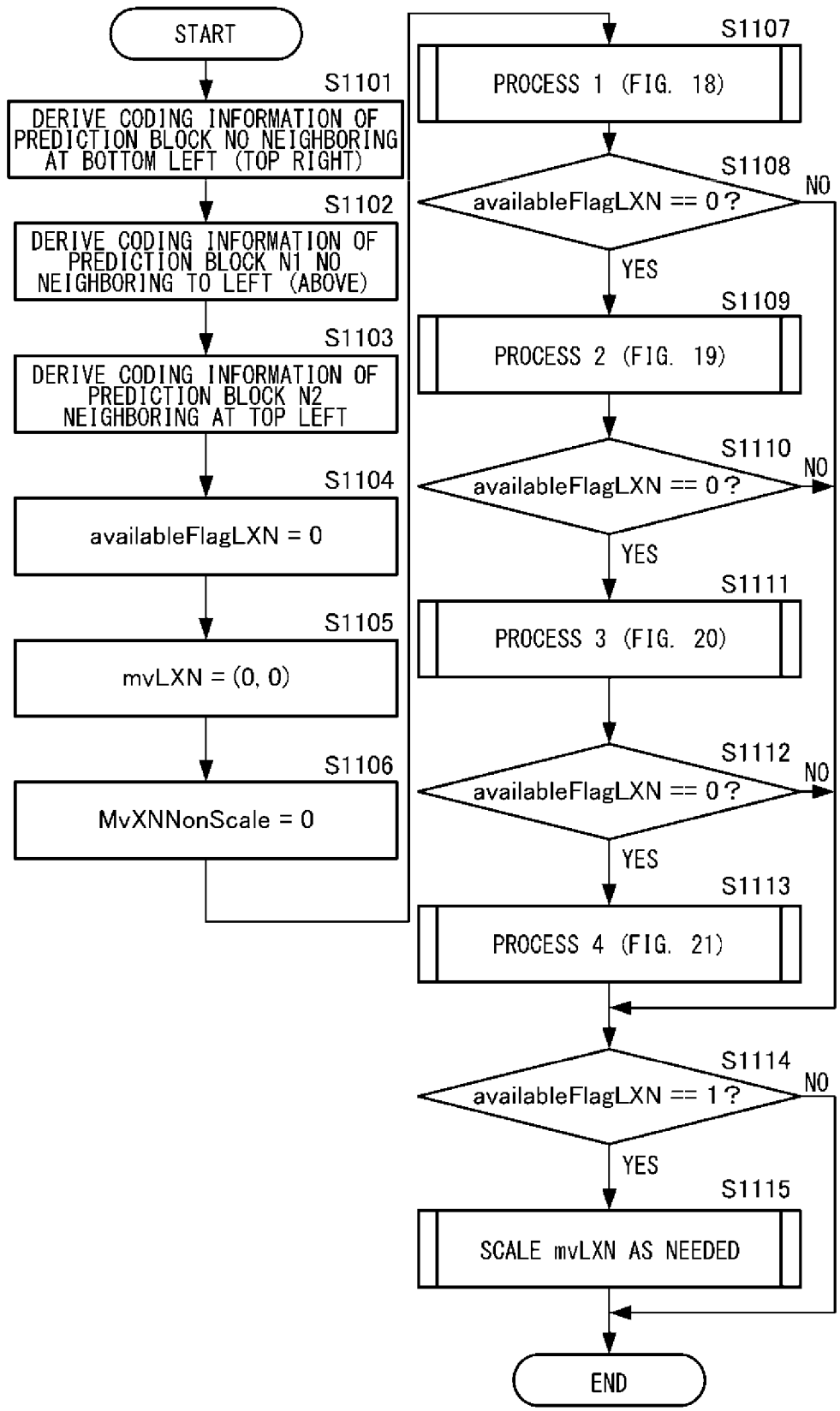
FIG. 17 is a flowchart showing a method of deriving a motion vector predictor candidate.

Referring to FIG. 17, the variable N is set such that N=A so that at least one motion vector predictor candidate is derived from at least one prediction blocks neighboring the prediction block subject to coding/decoding. The variable N is set such that N=B so that at least one motion vector predictor candidate is derived from at least one prediction blocks neighboring above.

The prediction blocks neighboring the prediction block subject to coding/decoding are identified. If a prediction block Nk (k=0, 1, 2) is available, the coding information is derived (S1101, S1102, S1103). In the case of the prediction block group neighboring the prediction block subject to coding/decoding to the left (N=A), the prediction block A0 neighboring at bottom left, the prediction block A1 neighboring to the left, and the prediction block A2 neighboring at top left are identified and the coding information is derived accordingly. In the case of the prediction block group neighboring the prediction block subject to coding/decoding above (N=B), the prediction block B0 neighboring at top right, the prediction block B1 neighboring above, and the prediction block B2 neighboring at top left are identified and the coding information is derived accordingly (S1101, S1102, S1103). If the prediction block Nk is located inside a slice including the prediction block subject to coding/decoding, the block is available for prediction. If the prediction block Nk is located outside the slice, the block is not available.

Subsequently, the flag availableFlagLXN indicating whether a motion vector predictor can be selected from the prediction block group N is set to 0, the motion vector mvLXN representing the prediction block group is set to (0, 0), and the flag MvXNNonScale indicating the motion vector representing the prediction block group N is not subject to scaling is set to 0 (S1104, S1105, S1106).

Figure 18:
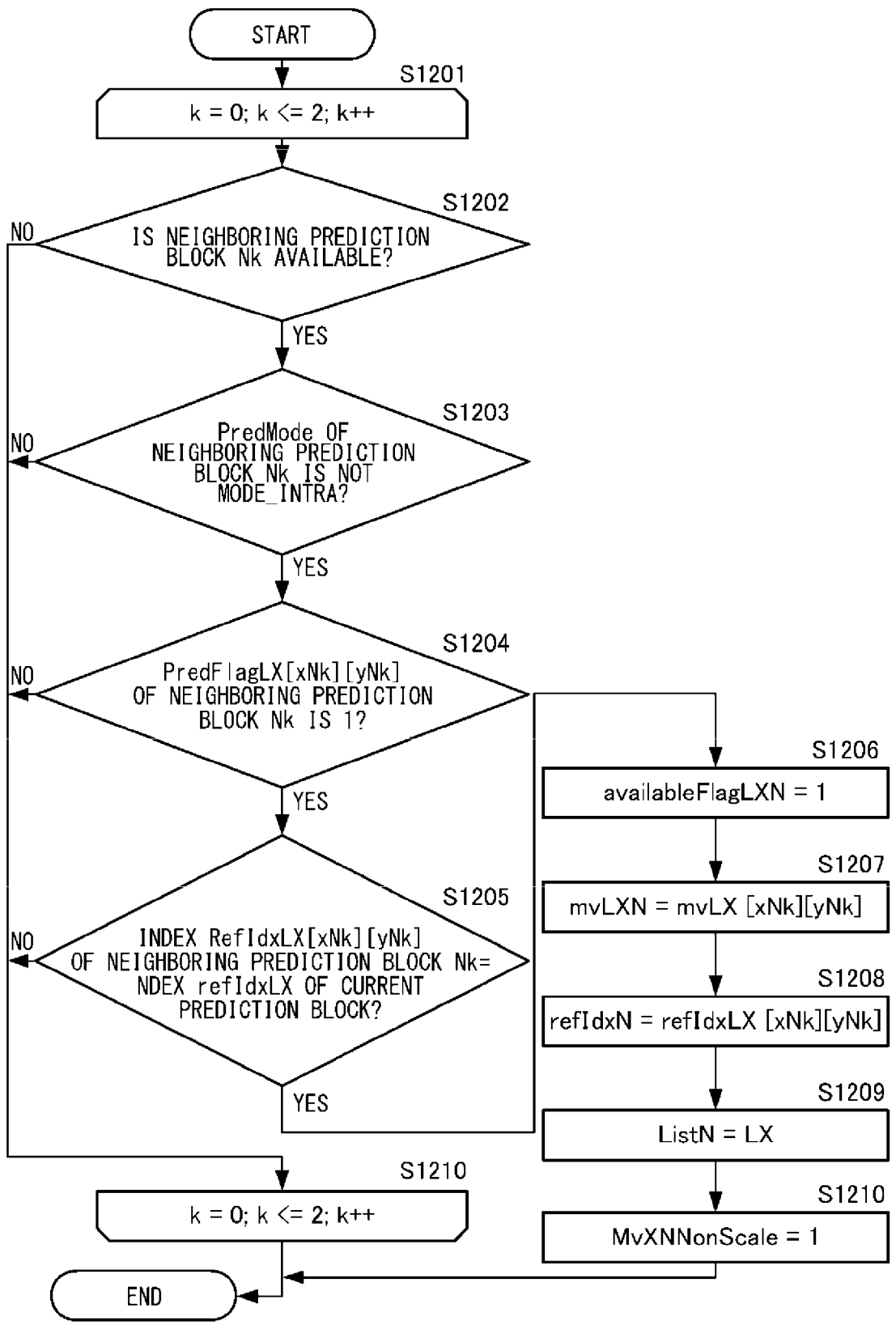
FIG. 18 is a flowchart showing a method of deriving a motion vector predictor candidate.

Subsequently, the process of the flowchart shown in FIG. 18 is performed (S1107). The neighboring prediction blocks N0, N1, N2 in the prediction block group N are examined to identify prediction blocks having a motion vector relative to the same reference list LX as the reference list LX referred to by the prediction block subject to coding/decoding and the same reference index.

FIG. 18 is a flowchart showing the processing steps in step S1107 of FIG. 17. The neighboring prediction blocks Nk (k=0, 1, 2) are subject to the following steps in the order that k is 0, 1, and 2 (S1201-S1210). In the case that N is A, the following steps are applied from bottom to top. In the case that N is B, the steps are applied from right to left.

If the neighboring prediction block Nk is available (YES in S1202), if the coding mode PredMode of the prediction block Nk is not intra (MODE_INTRA) (YES in S1203), and if predFlagLX (flag indicating whether LX prediction is used) of the neighboring prediction block Nk is 1 (YES in S1204), the reference index refIdxLX[xNk][yNk] of the neighboring prediction block Nk is compared with the index refIdxLX of the target prediction block are compared (S1205). If the reference indices are identical (YES in S1205), the flag availableFlagLXN is set to 1 (S1206), mvLXN is set to the same value as mvLXN[xNk][yNk] (S1207), refIdxN is set to the same value as refIdxLX[xNk][yNk] (S1208), ListN is set to LX (S1209), and the flag MvXNNonScale indicating non-scaling is set to 1 (S1210).

In the embodiment, the motion vector mvLXN with the flag MvXNNonScale set to 1, indicating non-scaling, i.e., the motion vector mvLXN derived without scaling represents a motion vector predicted from the motion vector of the prediction block referring to the same reference picture relative to the motion vector of the prediction block subject to coding/decoding and so is determined to be relatively more suitable as a motion vector predictor candidate of the prediction block subject to coding/decoding. Meanwhile, the motion vector mvLXN with the flag MvXCross set to 0, i.e., the motion vector mvLXN derived by scaling represents a motion vector predictor predicted from the motion vector of the prediction block referring to a reference picture different from the reference picture relative to the motion vector of the prediction block subject to coding/decoding and so is determined to be less suitable as a motion vector predictor candidate of the prediction block subject to coding/decoding. In other words, the flag MvXNNonScale indicating non-scaling is used as a guideline to determine whether a motion vector is suitable as a motion vector predictor candidate.

If none of these conditions is met (NO in S1202, NO in S1203, NO in S1204, or NO in S1205), k is incremented by 1, and the next neighboring prediction block is processed (S1202-S1209). The steps are repeated until availableFlagLXN is 1 or the steps for N2 are completed.

Figure 19:
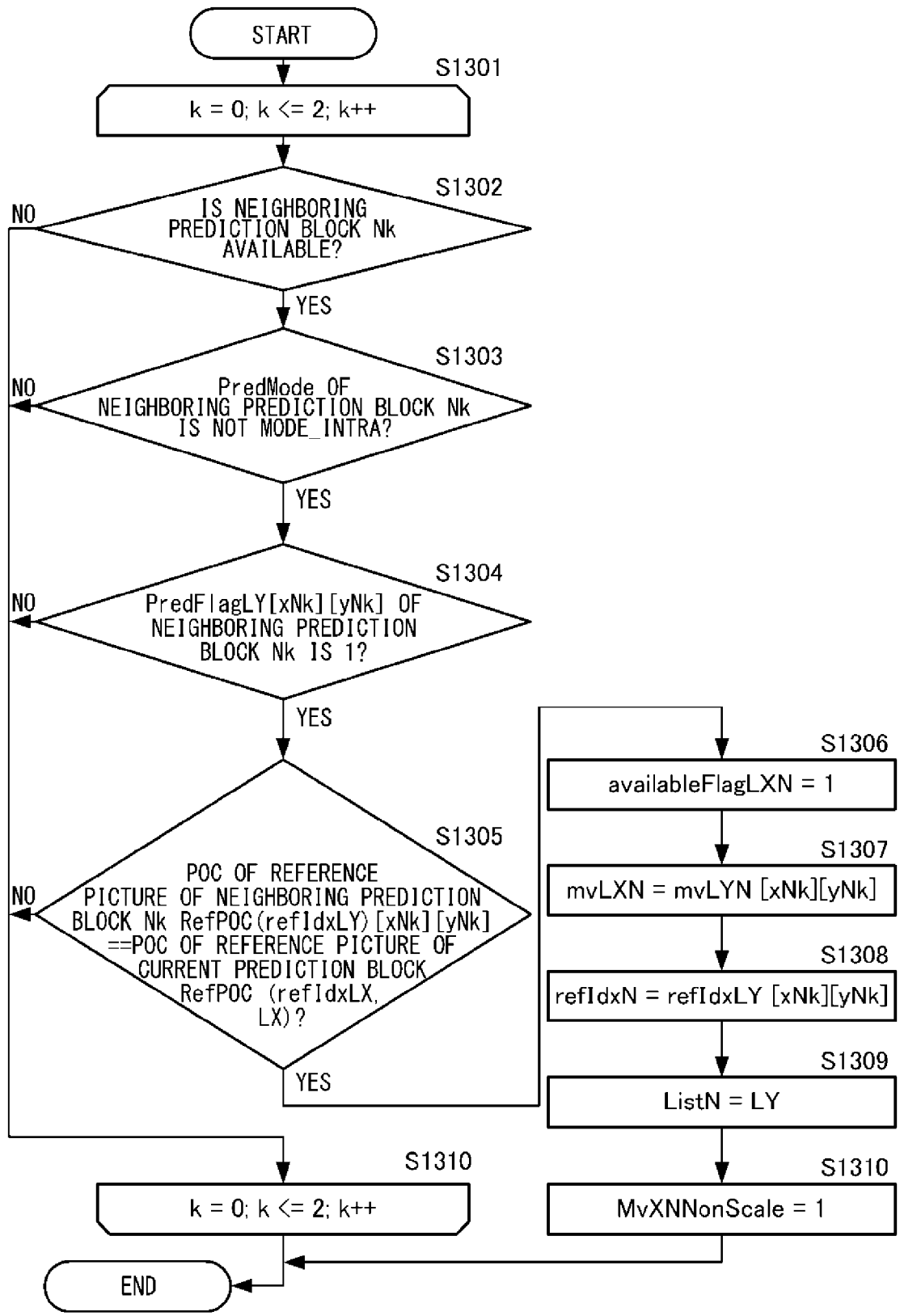
FIG. 19 is a flowchart showing a method of deriving a motion vector predictor candidate.

Referring back to the flowchart of FIG. 17, the steps of the flowchart shown in FIG. 19 are then performed (S1109) when availableFlagLXN is 0 (YES in S1108). The prediction blocks N0, N1, N2 neighboring the prediction block group N are examined so as to identify prediction blocks having a motion vector relative to the reference list LY (Y=!X: when the reference list L0 currently referred to is L0, the opposite reference list will be L1; when the reference currently referred to is L1, the opposite reference list will be L0) opposite to the reference list LX referred to in the prediction block subject to coding/decoding and relative to the same reference POC.

FIG. 19 is a flowchart showing the processing steps in step S1109 of FIG. 17. The neighboring prediction blocks Nk (k=0, 1, 2) are subject to the following steps in the order that k is 0, 1, and 2 (S1301-S1310). In the case that N is A, the following steps are applied from bottom to top. In the case that N is B, the steps are applied from right to left.

If the neighboring prediction block Nk is available (YES in S1302), if the coding mode PredMode of the prediction block Nk is not intra (MODE_INTRA) (YES in S1303), and if predFlagLY (flag indicating whether LY prediction is used) of the neighboring prediction block Nk is 1 (YES in S1304), POCRefPicOrderCnt (currPic, refIdxLY[xNk][yNk], LY) of the reference picture RefPicListY[refIdxLY[xNK][yNk]] of the reference list LY opposite to the reference list LX currently referred to by the neighboring prediction block Nk is compared with POCRefPicOrderCnt (currPic, refIdxLX, LX) of the reference picture RefPicListX[refIdxLX] of the list LY of the target prediction block. If POCs of the reference pictures are identical (YES of S1305), the flag availableFlagLXN is set to 1 (S1306), mvLXN is set to the same value as mvLXN[xNk][yNk] (S1307), refIdxN is set to the same value as refIdxLY[xNk][yNk] (S1308), ListN is set to LY (S1309), and the flag MvXNNonScale indicating non-scaling is set to 1 (S1310).

If none of these conditions is met (NO in S1302, NO in S1303, NO in S1304, or NO in S1305), k is incremented by 1, and the next neighboring prediction block is processed (S1302-S1309). The steps are repeated until availableFlagLXN is 1 or the steps for N2 are completed.

Figure 20:
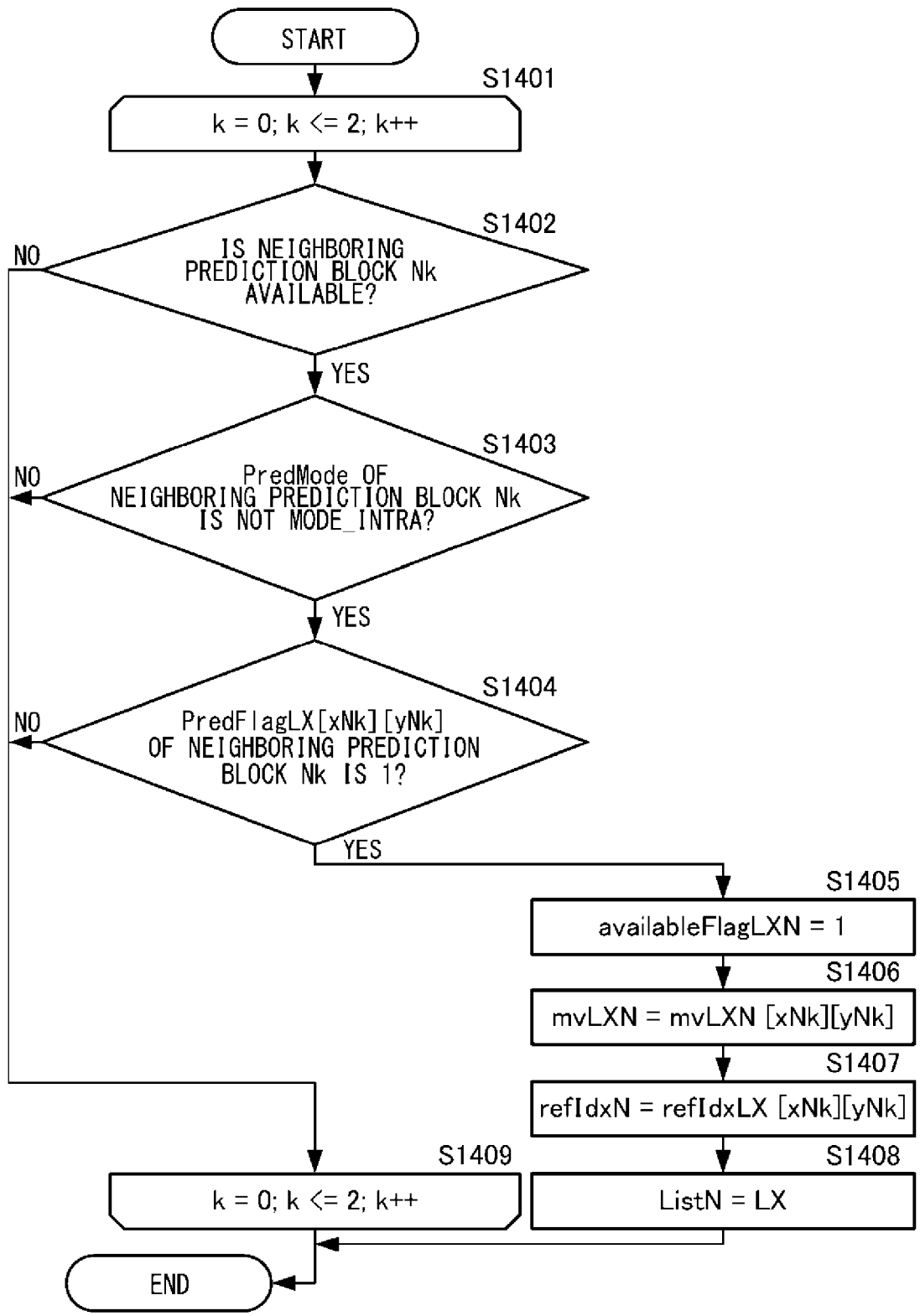
FIG. 20 is a flowchart showing a method of deriving a motion vector predictor candidate.

Referring back to the flowchart of FIG. 17, the steps of the flowchart shown in FIG. 20 are then performed (S1111) when availableFlagLXN is 0 (YES in S1110). The neighboring prediction blocks N0, N1, N2 in the prediction block group N are examined to identify prediction blocks having a motion vector relative to the same reference list LX as the reference list LX referred to by the prediction block subject to coding/decoding and relative to a different reference POC.

FIG. 20 is a flowchart showing the processing steps in step S1111 of FIG. 17. The neighboring prediction blocks Nk (k=0, 1, 2) are subject to the following steps in the order that k is 0, 1, and 2 (S1401-S1409). In the case that N is A, the following steps are applied from bottom to top. In the case that N is B, the steps are applied from right to left.

If the neighboring prediction block Nk is available (YES in S1402), if the coding mode PredMode of the prediction block Nk is not intra (MODE_INTRA) (YES in S1403), and if predFlagLX (flag indicating whether LX prediction is used) of the neighboring prediction block Nk is 1 (YES in S1404), the flag availableFlagLXN is set to 1 (S1405), mvLXN is set to the same value as mvLXN[xNk][yNk] (S1406), refIdxN is set to the same value as refIdxLX[xNk][yNk] (S1407), and ListN is set to LX (S1408).

If none of these conditions is met (NO in S1402, NO in S1403, or NO in S1404), k is incremented by 1, and the next neighboring prediction block is processed (S1402-S1408). The steps are repeated until availableFlagLXN is 1 or the steps for N2 are completed.

Figure 21:
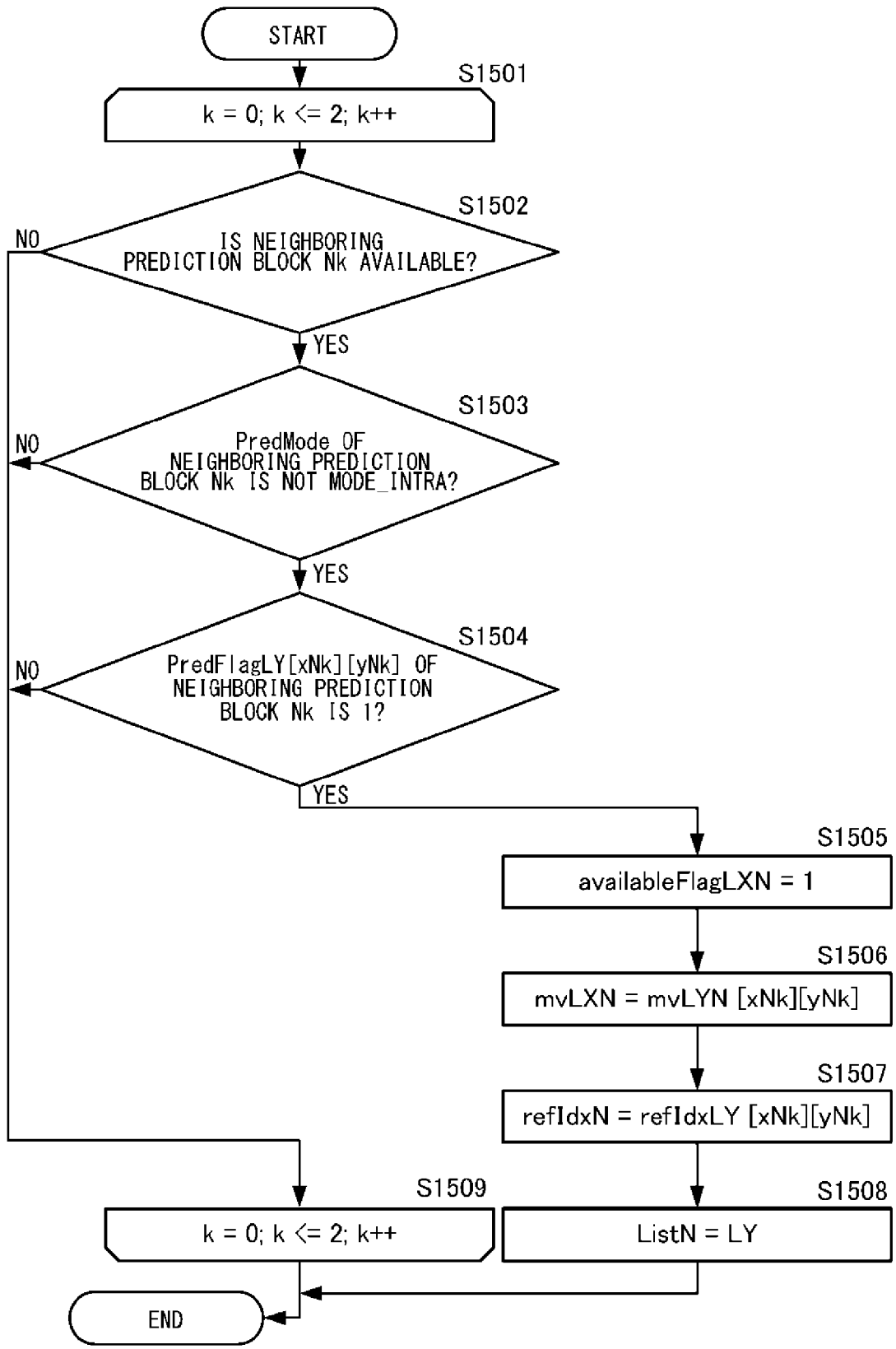
FIG. 21 is a flowchart showing a method of deriving a motion vector predictor candidate.

Referring back to the flowchart of FIG. 17, the steps of the flowchart shown in FIG. 21 are then performed (S1113) when availableFlagLXN is 0 (YES in S1112). (The prediction blocks N0, N1, N2 neighboring the prediction block group N are examined so as to identify prediction blocks having a motion vector relative to the reference list LY (Y=!X: when the reference list L0 currently referred to is L0, the opposite reference list will be L1; when the reference currently referred to is L1, the opposite reference list will be L0) opposite to the reference list LX referred to in the prediction block subject to coding/decoding and relative to a different reference POC).

FIG. 21 is a flowchart showing the processing steps in step S1113 of FIG. 17. The neighboring prediction blocks Nk (k=0, 1, 2) are subject to the following steps in the order that k is 0, 1, and 2 (S1501-S1509). In the case that N is A, the following steps are applied from bottom to top. In the case that N is B, the steps are applied from right to left.

If the neighboring prediction block Nk is available (YES in S1502), if the coding mode PredMode of the prediction block Nk is not intra (MODE_INTRA) (YES in S1503), and if predFlagLY (flag indicating whether LY prediction is used) of the neighboring prediction block Nk is 1 (YES in S1504), the flag availableFlagLXN is set to 1 (S1505), mvLXN is set to the same value as mvLXN[xNk][yNk] (S1506), refIdxN is set to the same value as refIdxLX[xNk][yNk] (S1507), and ListN is set to LX (S1508).

If none of these conditions is met (NO in S1502, NO in S1503, or NO in S1504), k is incremented by 1, and the next neighboring prediction block is processed (S1502-S1508). The steps are repeated until availableFlagLXN is 1 or the steps for N2 are completed.

Figure 22:
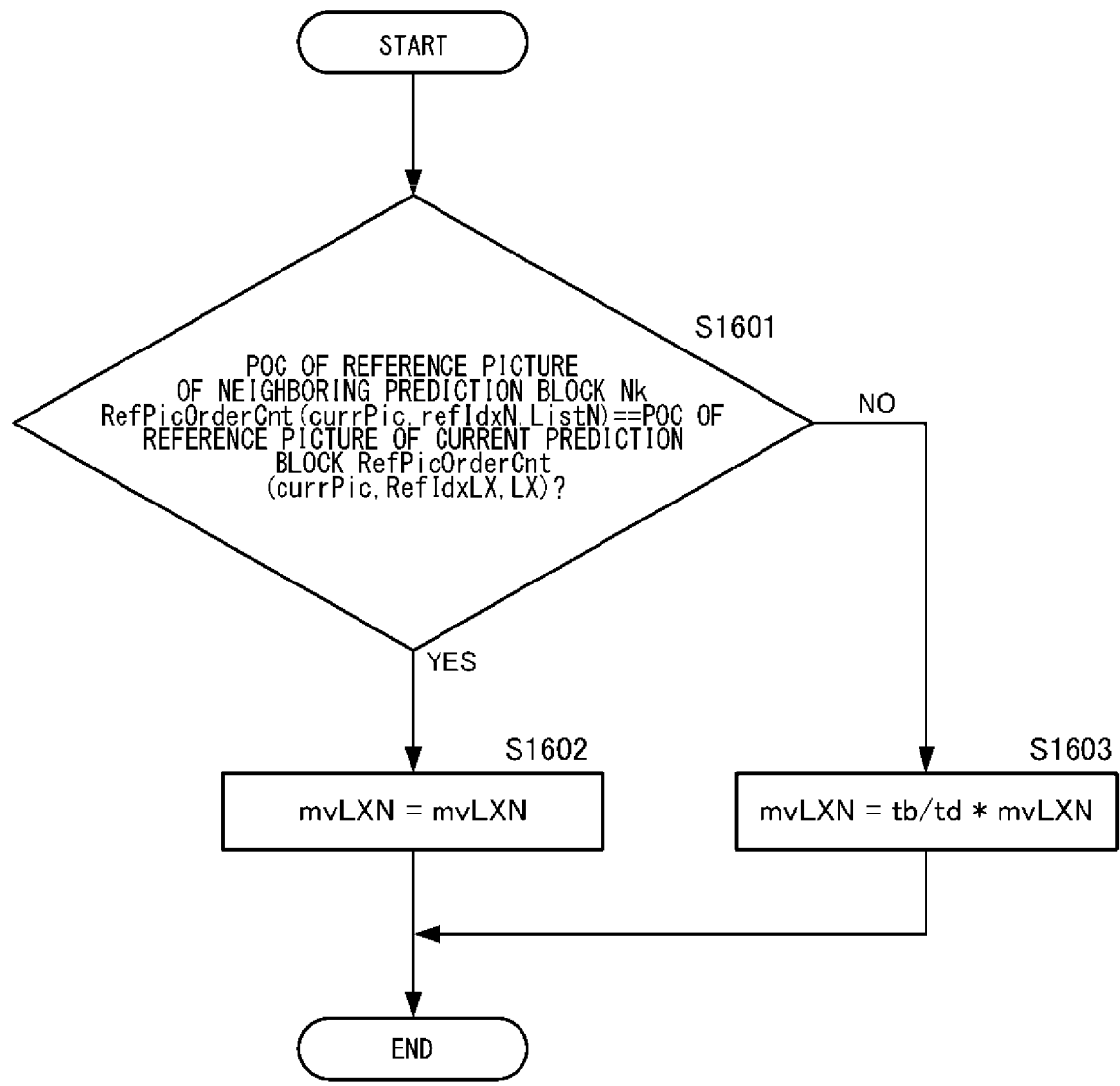
FIG. 22 is a flowchart showing a method of deriving a motion vector predictor candidate.

Referring back to the flowchart of FIG. 17, the steps of scaling mvLXN shown in FIG. 22 are then performed (S1115) when availableFlagLXN is 1 (YES in S1114).

Figure 23:
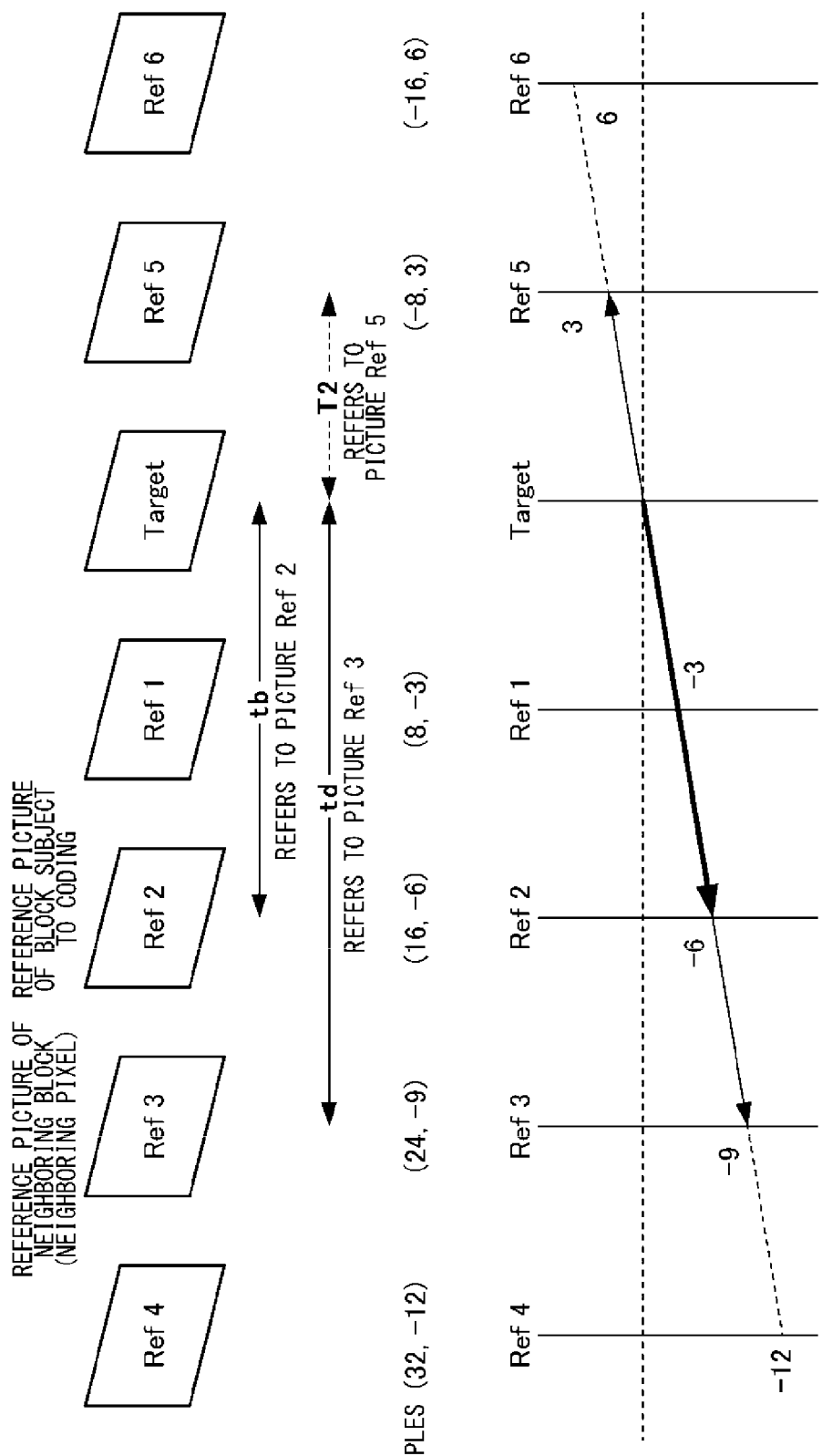
FIG. 23 shows scaling of a motion vector.

FIG. 22 is a flowchart showing the processing steps in step S1115 of FIG. 15 for scaling of a motion vector. FIG. 23 illustrates scaling of a motion vector in the temporal dimension by way of a specific example. If POCRefPicOrderCnt (currPic, refIdxN, ListN) of the reference picture RefPicListN[refIdxLN] of the reference list ListN of the referenced prediction block is identical to POCRefPicOrderCnt (currPic, refIdxLX, LX) of the reference picture RefPicListX[refIdxLX] of LX (YES in S1601), the value of mvLXN is retained (S1602). Otherwise (NO in S1601), scaling is performed according to the following expression.

$$mvLXN = tb/td * mvLXN$$

where td indicates a difference between POCPicOrderCnt (currPic) of the current picture subject to coding/decoding and POCRefPicOrderCnt (currPic, refIdxN, ListN) of the reference picture RefPicListN[refIdxN] referred to by the reference list ListN of the neighboring prediction block.

$$td = PicOrderCnt(currPic) - RefPicOrderCnt(currPic, refIdxN, ListN)$$

tb indicates a difference between POCPicOrderCnt (currPic) of the current picture subject to coding/decoding and POC of the reference picture referred to by the reference list LX of the current picture subject to coding/decoding.

$$tb = PicOrderCnt(currPic) - RefPicOrderCnt(currPic, refIdxLX, LX)$$

[Derivation of Motion Vector Predictor Candidates in the Temporal Dimension (S303 of FIG. 16)]

Inputs in these steps include the coordinates (xP, yP) of the top left pixel at the start of the prediction block subject to coding/decoding, the width nPSW and the height nPSH of the prediction block subject to coding/decoding, and the reference index refIdxLX (X is 0 or 1) for each reference list of the prediction block. The suffix LX indicates a reference list. L0 and L1 are provided so that 0 or 1 may be substituted into X. The reference lists L0 and L1 are lists for managing a plurality of reference pictures for the purpose of performing block-by-block motion compensation by referring to an arbitrary one of a plurality of reference picture candidates. The reference index refIdxLX is an index assigned to each reference picture in each reference list and used to designate a reference picture.

Outputs from the process include the motion vector mvLXCol of the prediction block located at the same position as the target prediction block, and the flag availableFlagLXCol indicating whether the coding information of the prediction block group Col derived from prediction using the reference list LX is available. 0 or 1, indicating a reference list, is substituted into the suffix X.

Figure 24:
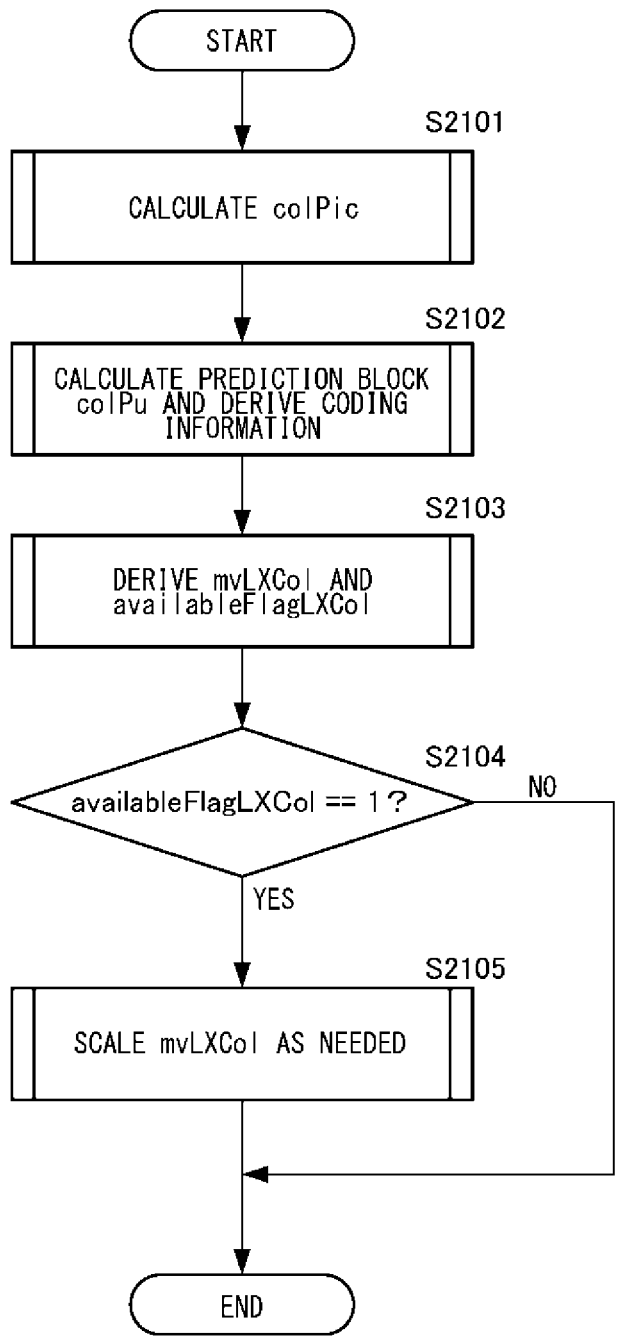
FIG. 24 is a flowchart showing a method of deriving a motion vector predictor candidate.

FIG. 24 is a flowchart showing the processing steps in step S303 of FIG. 16. A reference picture colPic is derived from slice_type and collocated_from_l0_flag (S2101 of FIG. 24).

Figure 25:
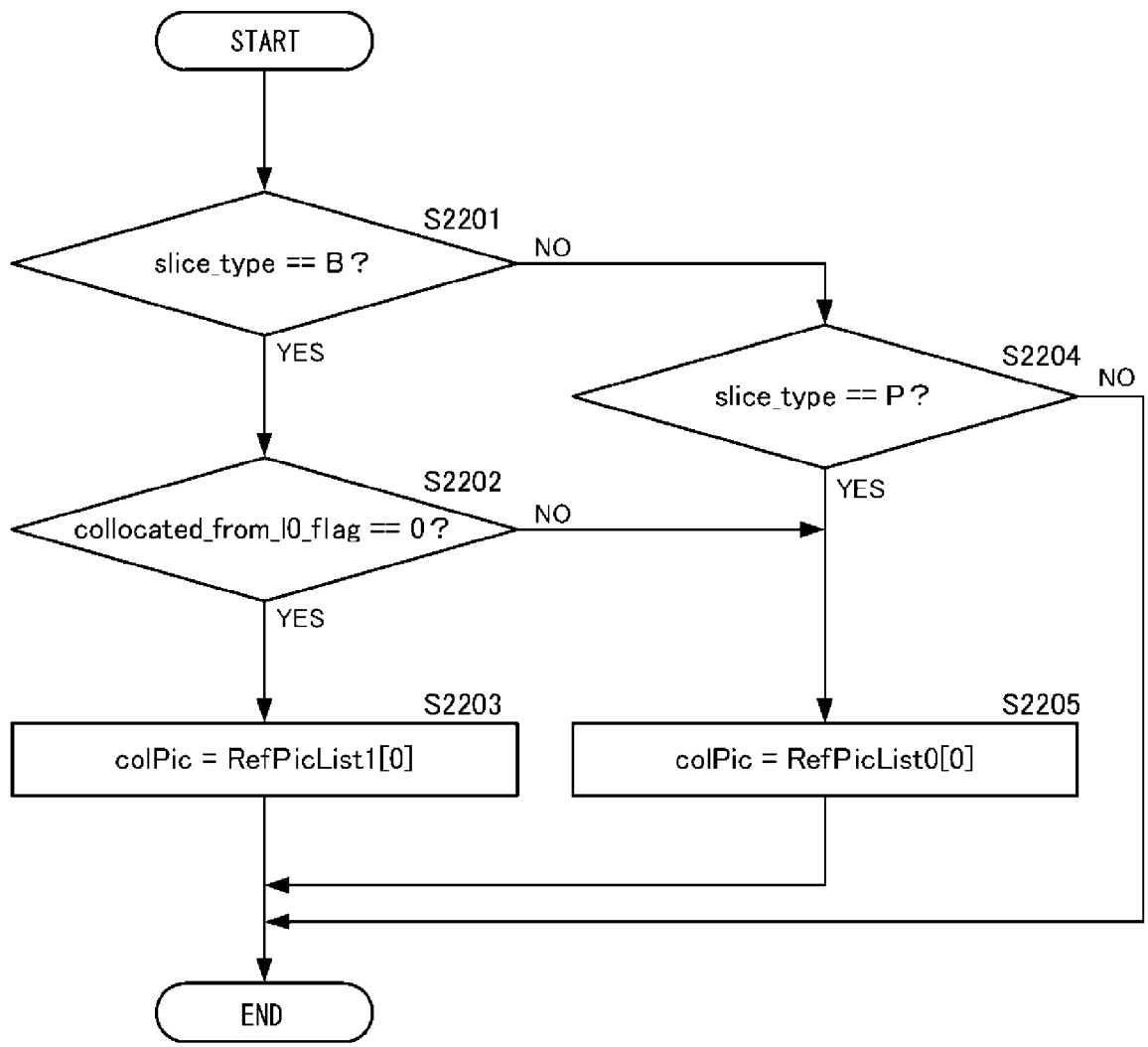
FIG. 25 is a flowchart showing a method of deriving a motion vector predictor candidate.

FIG. 25 is a flowchart showing the processing steps of deriving the reference picture colPic in step S2101 of FIG. 24. If slice_type is B, and if the third flag collocated_from_l0_flag of FIG. 10 is 0 (YES in S2201 of FIG. 25, YES in S2202 of FIG. 22), RefPicList1[0], i.e., the picture in the reference picture list 1 with the reference index 0 will be colPic (S2203 of FIG. 25). Otherwise, (NO in S2201 of FIG. 25, NO in S2202, NO in S2204), RefPicList0[0], the picture in the reference picture list 0 with the reference index 0 will be colPic (S2205 of FIG. 25).

Control is then returned to the flowchart of FIG. 24, whereupon a prediction block colPu is derived and coding information is derived accordingly (S2102 of FIG. 24).

Figure 26:
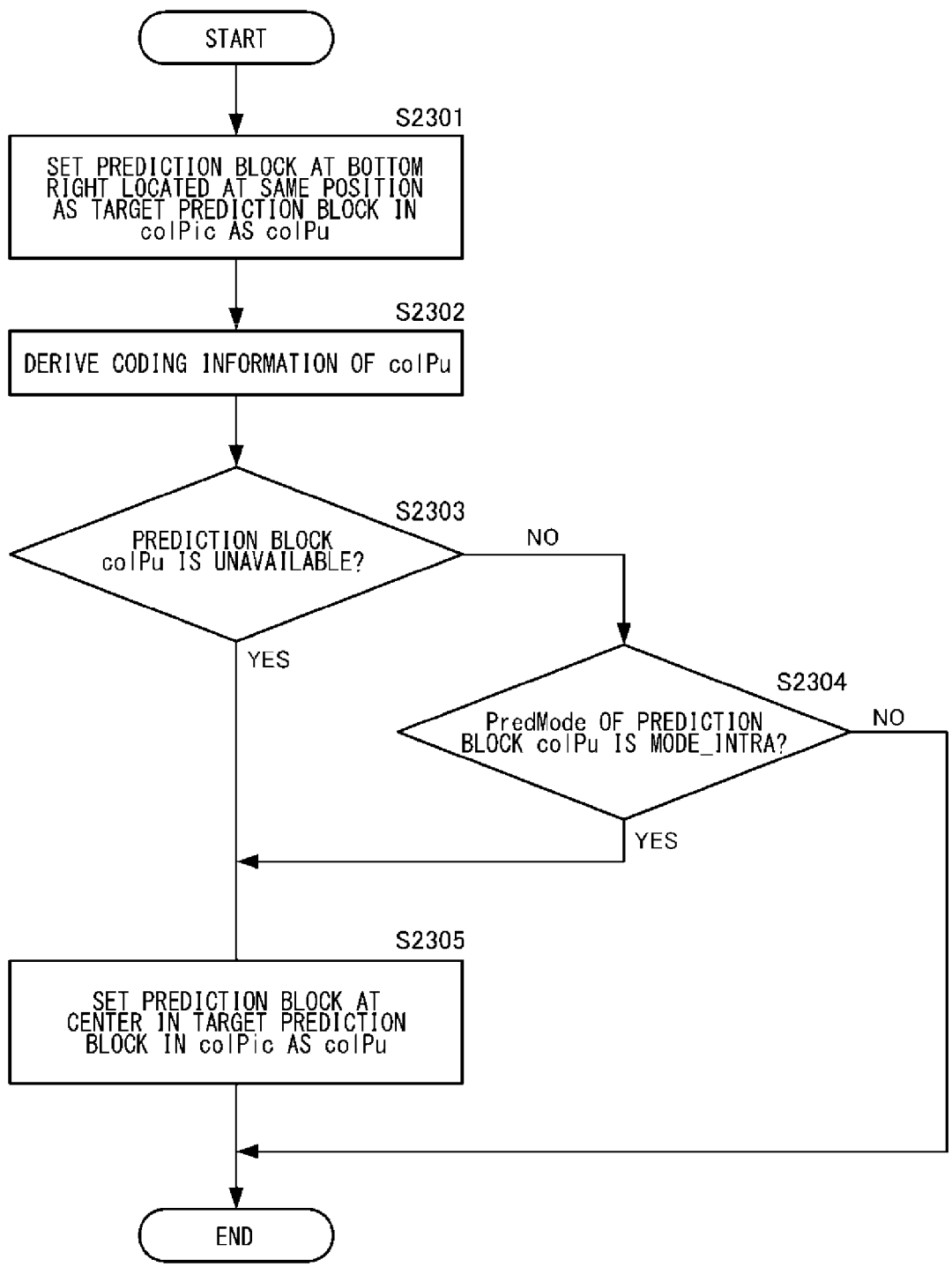
FIG. 26 is a flowchart showing a method of deriving a motion vector predictor candidate.

FIG. 26 is a flowchart showing the processing steps of deriving the prediction block colPu in step S2102 of FIG. 24.

The prediction block located at bottom right (outside) of the target prediction block in colPic is defined as colPu (S2301 of FIG. 26). The prediction block corresponds to the prediction block T0 of FIG. 9.

The coding information of the prediction block colPu is then derived. If PredMode of the prediction block colPu is MODE_INTRA or if the block is not available (S2303, S2304 of FIG. 26), the prediction block located at top left (inside) of the target prediction block in colPic is defined as colPu (S2305 of FIG. 26). The prediction block corresponds to the prediction block T1 of FIG. 9. If PredMode of the prediction block colPu is MODE_INTRA, or if the block is not available, a search is made in the order of the prediction blocks T2, T3 of FIG. 9 for an available prediction block for which PredMode is not MODE_INTRA.

Referring back to the flowchart of FIG. 24, mvLXCol and availableFlagLXCol are derived (S2103 of FIG. 24).

Figure 27:
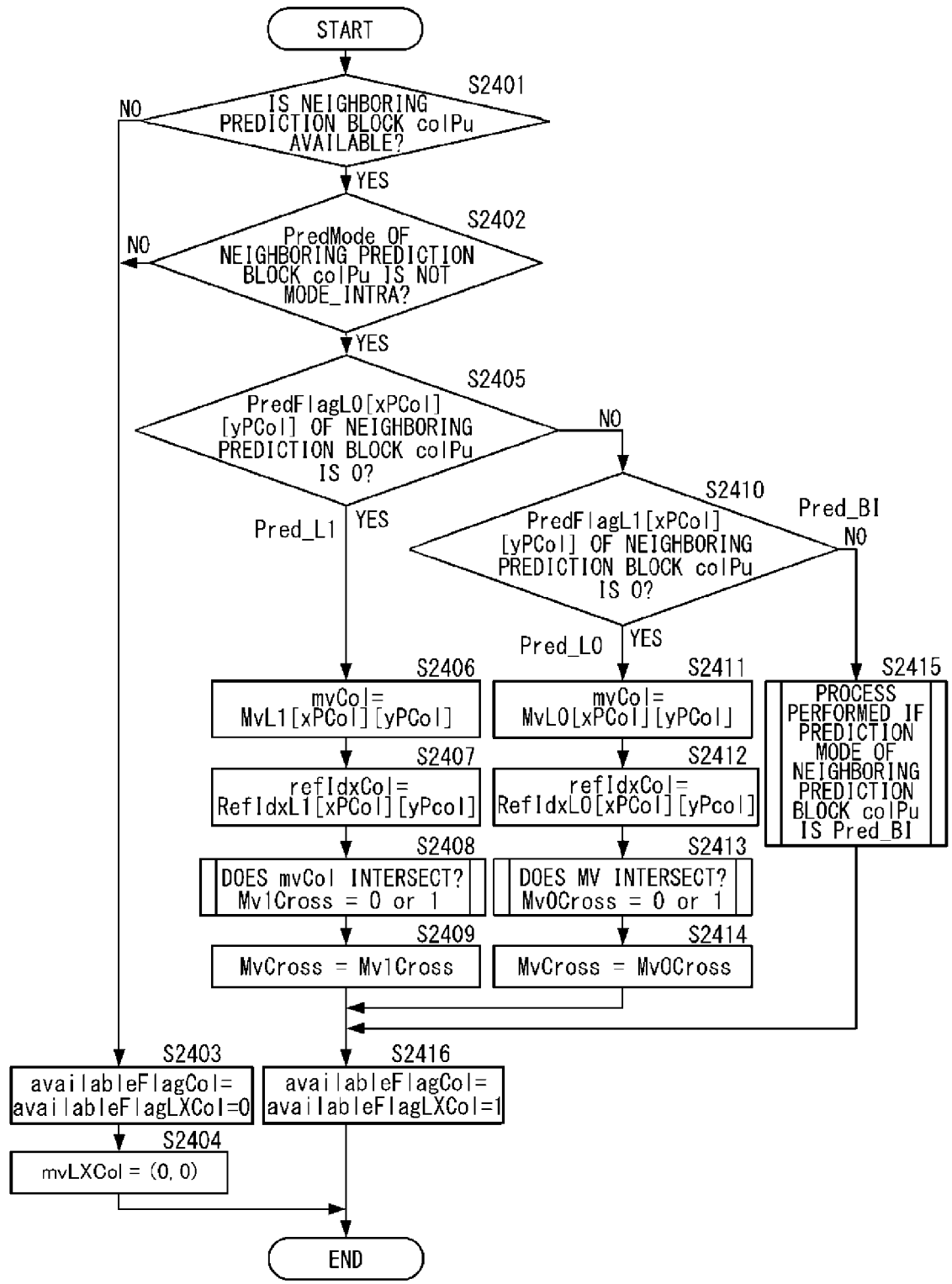
FIG. 27 is a flowchart showing a method of deriving a motion vector predictor candidate.

FIG. 27 is a flowchart showing the processing steps of deriving inter prediction information in step S2103 of FIG. 24.

If PredMode of the prediction block colPu is MODE_INTRA or if the block is not available (NO in S2401, NO in S2402 of FIG. 27), availableFlagLXCol is set to 0, mvLXCol is set to (0,0) (S2403, S2404 of FIG. 27), and the process is terminated.

If the prediction block colPu is available and PredMode is not MODE_INTRA (YES in S2401, YES in S2402 of FIG. 27), mvCol and refIdxCol are derived through the following steps.

If the L0 prediction flag PredFlagL0[xPCol][yPCol] of the prediction block colPu is 0 (YES in S2405 of FIG. 27), the prediction mode of the prediction block colPu is PredL1 so that the motion vector mvCol and the reference index refIdxCol are set to MvL1[xPCol][yPCol], the L1 motion vector of the prediction block colPu, and the L1 reference index RefIdxL1[xPCol][yPCol], respectively (S2406, S2407 of FIG. 27).

A decision is made as to whether the motion vector mvCol thus set intersects the picture including the prediction block subject to coding/decoding and Mv1Cross is set accordingly (S2408 of FIG. 27).

Figure 29:
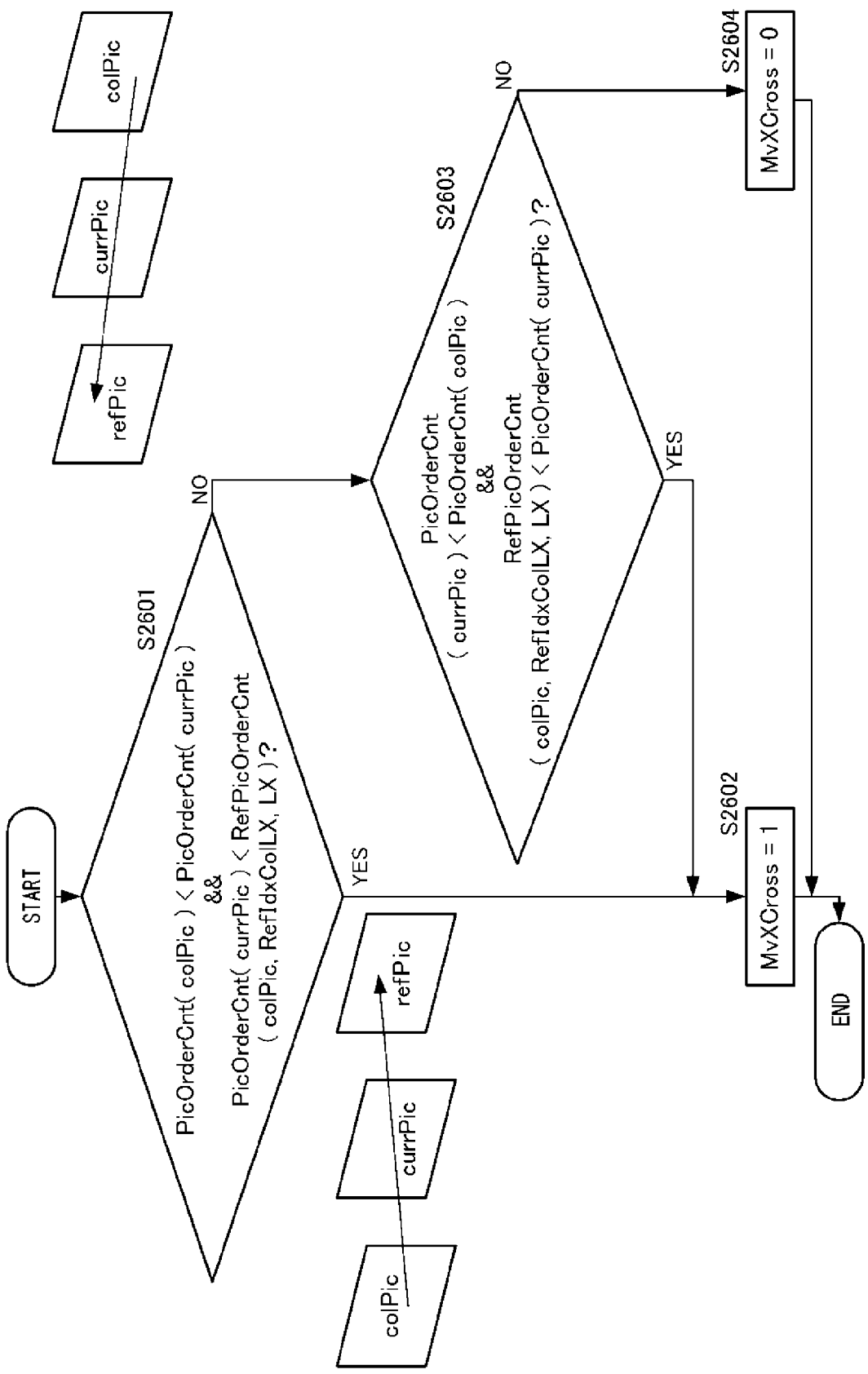
FIG. 29 is a flowchart showing a method of deriving a motion vector predictor candidate.

Decision as to whether the motion vector MV intersects a picture will be described with reference to FIG. 29. FIG. 29 is a flowchart showing a process of examining whether the motion vector mvCol of colPu refers to a reference picture, intersecting the picture that includes the prediction block subject to coding/decoding. If POCPicOrderCnt (colPic) of the reference picture colPic is smaller than POCPicOrderCnt (currPic) of the picture subject to coding/decoding, and if POCRefPicOrderCnt (colPic, RefIdxColLX, LX) of the reference picture referred to by mvCol is larger than POCPicOrderCnt (currPic) of the picture subject to coding/decoding (YES in S2601 of FIG. 27), it means that the reference picture colPic is located in the past and the reference picture is located in the future, sandwiching the picture subject to coding/decoding. A decision is then made that the motion vector mvCol refers to a reference picture, intersecting the picture that includes the prediction block subject to coding/decoding so that MvXCross is set to 1 (S2602 of FIG. 27). If the above condition is not met (NO in S2601 of FIG. 27), i.e., if POCPicOrderCnt (colPic) of the reference picture colPic is larger than POCPicOrderCnt (currPic) of the picture subject to coding/decoding, and if POCRefPicOrderCnt (colPic, RefIdxColLX, LX) of the reference picture referred to by mvCol is smaller than POCPicOrderCnt (currPic) of the picture subject to coding/decoding (YES in S2603 of FIG. 27), it means that the reference picture colPic is located in the future and the reference picture is located in the past, sandwiching the picture subject to coding/decoding. A decision is then made that the motion vector mvCol refers to a reference picture, intersecting the picture that includes the prediction block subject to coding/decoding so that MvXCross is set to 1 (S2602 of FIG. 27). If none of the conditions is met (NO in S2601, NO in S2603 of FIG. 27), a decision is made that the motion vector mvCol does not refer to a reference picture and does not intersect the picture that includes the prediction block subject to coding/decoding so that MvXCross is set to 0 (S2604 of FIG. 27).

Referring back to FIG. 27, MvCross is set to the value of Mv1Cross (S2409 of FIG. 27).

According to the embodiment, if the flag MvXCross is 1, i.e., if the motion vector mvCol of colPu in the reference picture colPic refers to a reference picture, intersecting the picture that includes the prediction block subject to coding/decoding, the motion vector mvCol is determined to be relatively more suitable as a candidate motion vector predictor for the prediction block subject to coding/decoding. Meanwhile, if the flag MvXCross is 0, i.e., if the motion vector mvCol of colPu in the reference picture colPic does not refer to a reference picture, intersecting the picture that includes the prediction block subject to coding/decoding, the motion vector mvCol is determined to be less suitable as a candidate motion vector predictor for the prediction block subject to coding/decoding. In other words, the flag MvCross is used as a guideline to determine whether a motion vector is suitable as a motion vector predictor candidate. If the L1 prediction flag PredFlagL1[xPCol][yPCol] is not 0 (YES in S2410 of FIG. 27), the prediction mode of the prediction block colPu is Pred_BI so that one of the two motion vectors is selected (S2415 of FIG. 27).

Figure 28:
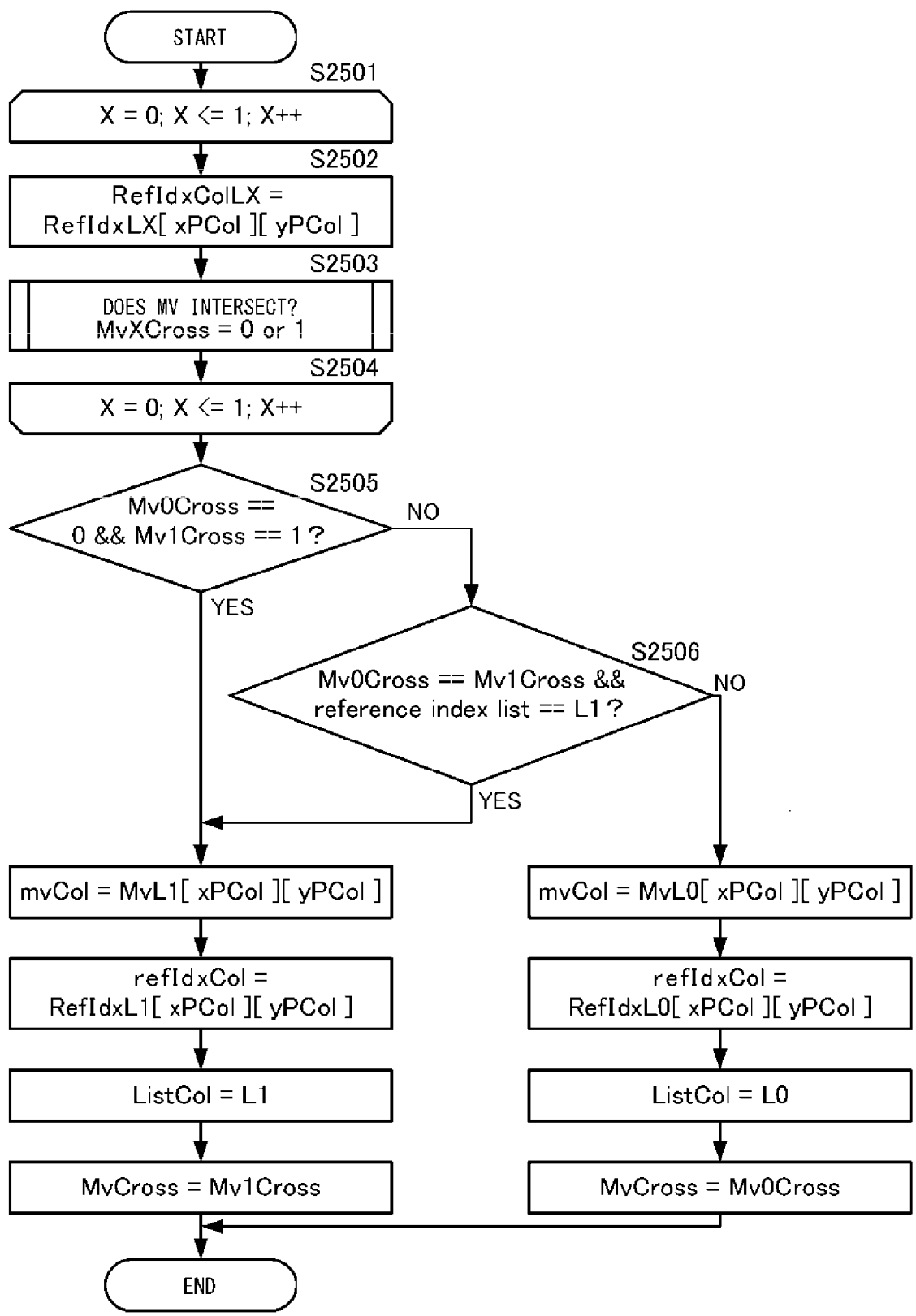
FIG. 28 is a flowchart showing a method of deriving a motion vector predictor candidate.

FIG. 28 is a flowchart showing a method of deriving inter prediction information of a prediction block when the prediction mode of the prediction block colPu is Pred_BI.

The motion vector mvCol and the reference index RefIdxCol are set to the L0 motion vector MvL0[xPCol][yPCol] of the prediction block colPu, and the L0 reference index RefIdxL0[xPCol][yPCol], respectively (S2411, S2412 of FIG. 27).

First, RefIdxColLX is set to the L0 reference index RefIdxL0[xPCol][yPCol] (S2502 of FIG. 28). Examination is made as to whether the L0 motion vector intersects the picture that includes the prediction block subject to coding/decoding, and Mv0Cross is set accordingly (S2503 of FIG. 28). Further, RefIdxColLX is set to the reference index RefIdxL1[xPCol][yPCol] (S2502 of FIG. 28). Examination is made as to whether the L1 motion vector intersects the picture that includes the prediction block subject to coding/decoding, and Mv1Cross is set accordingly (S2503 of FIG. 28).

If Mv0Cross is 0 and Mv1Cross is 1 (YES in S2505 in FIG. 28), or if Mv0Cross is equal to Mv1Cross and the reference index list is L1 (YES in S2506 in FIG. 28), the L1 inter prediction information is selected so that the motion vector mvCol, the reference index refIdxCol, the list ListCol, and MvCross are set to MvL1[xPCol][yPCol], RefIdxColL1, L1, and Mv0Cross, respectively.

Otherwise (NO in S2505, NO in S2506 of FIG. 28), the L0 inter prediction information is selected so that the motion vector mvCol, the reference index refIdxCol, the list ListCol, and MvCross are set to MvL0[xPCol][yPCol], RefIdxColL0, L0, and Mv0Cross, respectively.

Referring back to FIG. 27, when the inter prediction information is derived, availableFlagLXCol is set to 1 (S2416 of FIG. 27).

Then, referring back to the flowchart of FIG. 24, when availableFlagLXCol is 1 (YES in S2104 of FIG. 24), mvLXCol is scaled as needed. For scaling of mvLXCol, the same method as described with reference to FIG. 22 is used (S2105 of FIG. 24).

(Addition of Motion Vector Predictor Candidates to the MVP List (S304 of FIG. 16)

Figure 30:
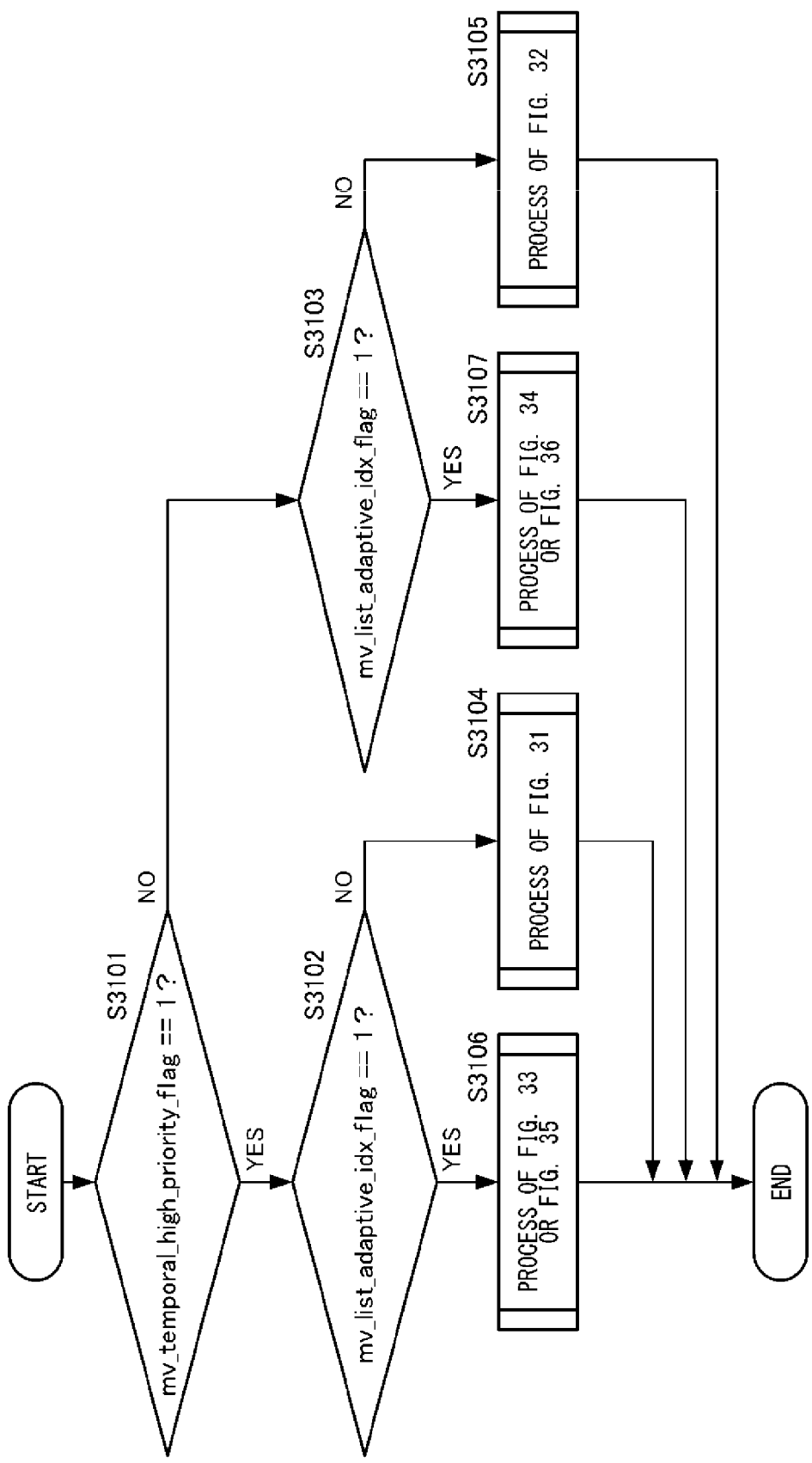
FIG. 30 is a flowchart showing a method of adding motion vector predictor candidate in a motion vector predictor candidate list.

The motion vector predictor candidates mvLXN (N=A, B, Col) derived in S301, S302, and S303 of FIG. 16 are added to the MVP list mvpListLX (S304). FIG. 30 is a flowchart showing the processing steps of adding motion vector predictor candidates to the MVP list. According to the scheme described herein, the candidates are arranged in the order of priority. The motion vector predictor candidates are added in the MVP list mvpListLX in the order of priority so as to reduce the code size of the MVP indices mvp_idx_LX[x0][y0]. By locating elements with higher priority toward the top of the MVP list, the code size is reduced. For example, if the number of elements in the MVP list mvpListLX is 3, the code size required to define an index 0 will be 1 bit by representing the index 0 in the MVP list as "0", the index 1 as "10", and the index 2 as "11". By adding an element with the highest frequency of occurrence at the index 0, the code size is reduced.

The MVP list mvpListLX is built as a list. The MVP list is provided with a storage area for storing, as elements, indices indicating the location inside the MVP list and motion vector predictor candidates corresponding to the indices. The indices start with 0. The storage area for the MVP list mvpListLX stores motion vector predictor candidates. In the following description of the steps, the motion vector predictor candidate assigned an index i added in the MVP list mvpListLX will be denoted by mvpListLX[i] so as to distinguish it from the MVP list mvpListLX by using array notation.

Figure 31:
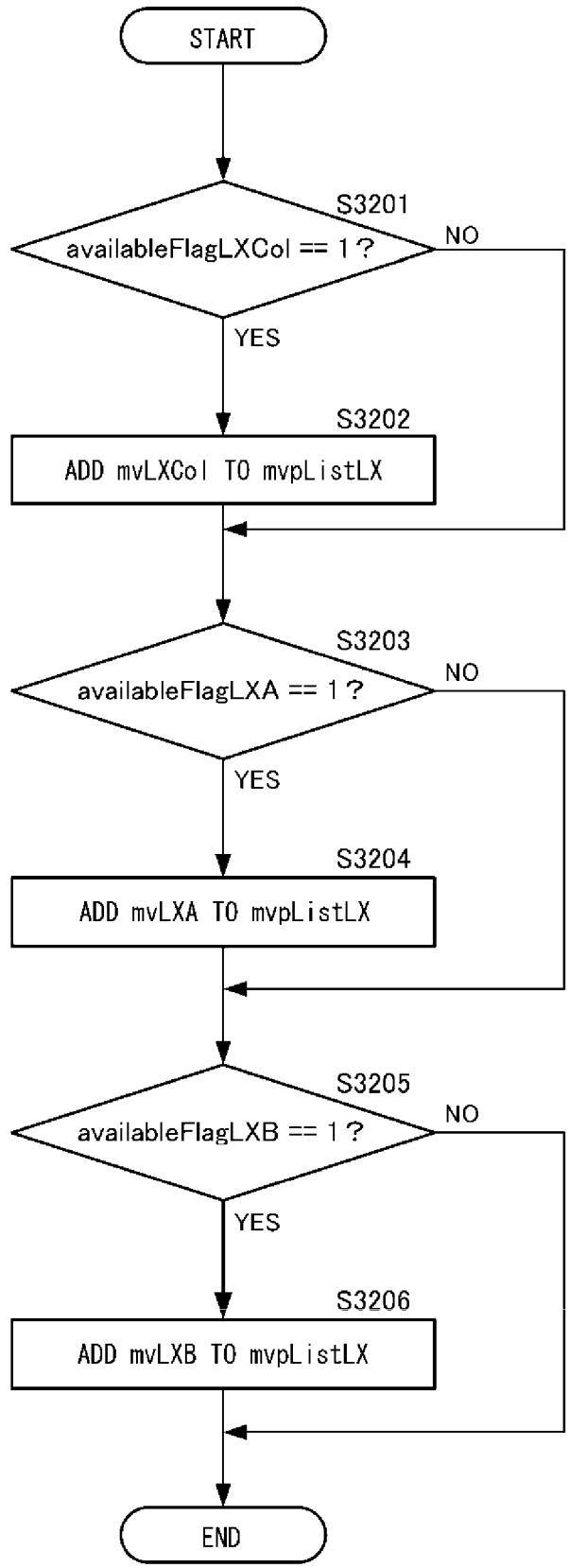
FIG. 31 is a flowchart showing a method of adding motion vector predictor candidate in a motion vector predictor candidate list.

If the flag mv_temporal_high_priority_flag coded for each slice, sequence, or picture is 1, and if mv_list_adaptive_idx_flag is 0 (YES in S3101, NO in S3102), motion vector predictor candidates are added in the MVP list according to the processing steps of the flowchart shown in FIG. 31 such that the motion vector predictor candidate mvLXCol from the prediction block located at the same position as or in the neighborhood of the target prediction block in a picture at a point of time is given higher priority than the motion vector predictor candidates mvLXA, mvLXB from the prediction blocks neighboring to the left and above (S3104).

Figure 32:
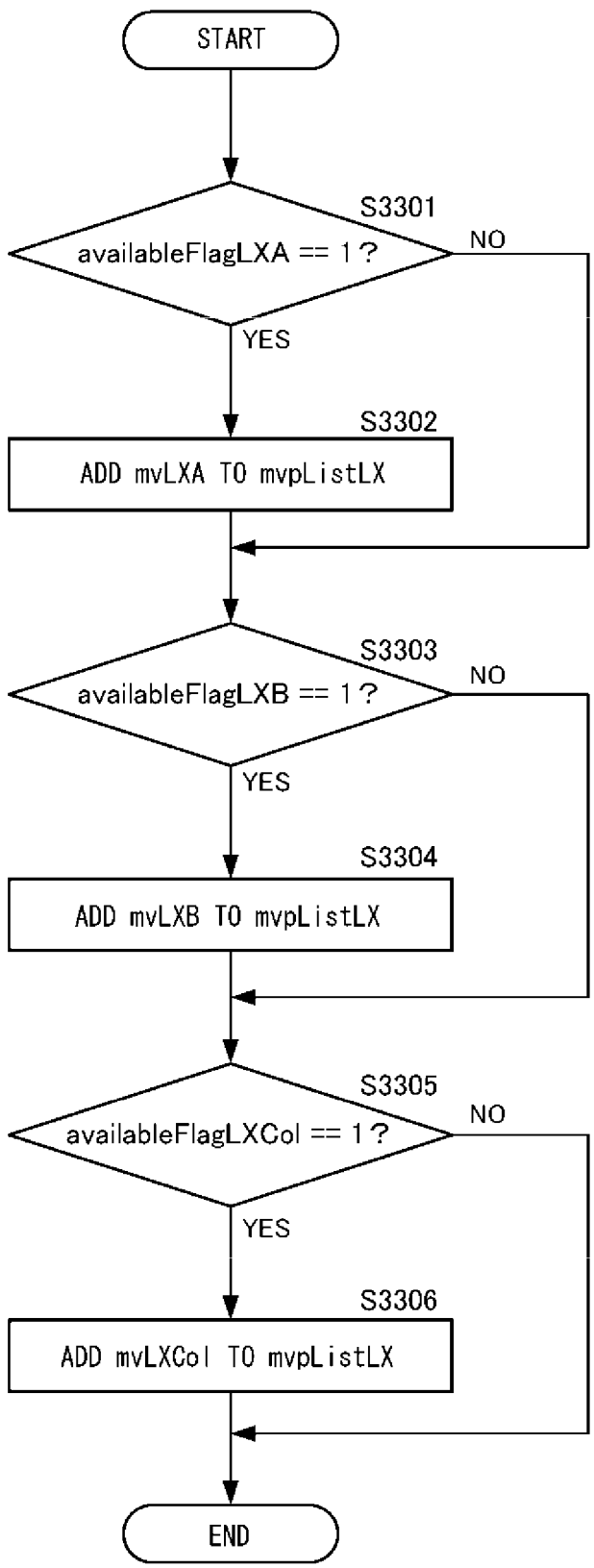
FIG. 32 is a flowchart showing a method of adding motion vector predictor candidate in a motion vector predictor candidate list.

If the flag mv_temporal_high_priority_flag is 0, and if mv_list_adaptive_idx_flag is 0 (NO in S3101, NO in S3103), motion vector predictor candidates are added in the MVP list according to the processing steps of the flowchart shown in FIG. 32 such that the motion vector predictor candidates mvLXA, mvLXB from the prediction blocks neighboring to the left and above are given higher priority than the motion vector predictor candidate mvLXCol from the prediction block located at the same position as or in the neighborhood of the target prediction block in a picture at a point of time (S3105).

Figure 33:
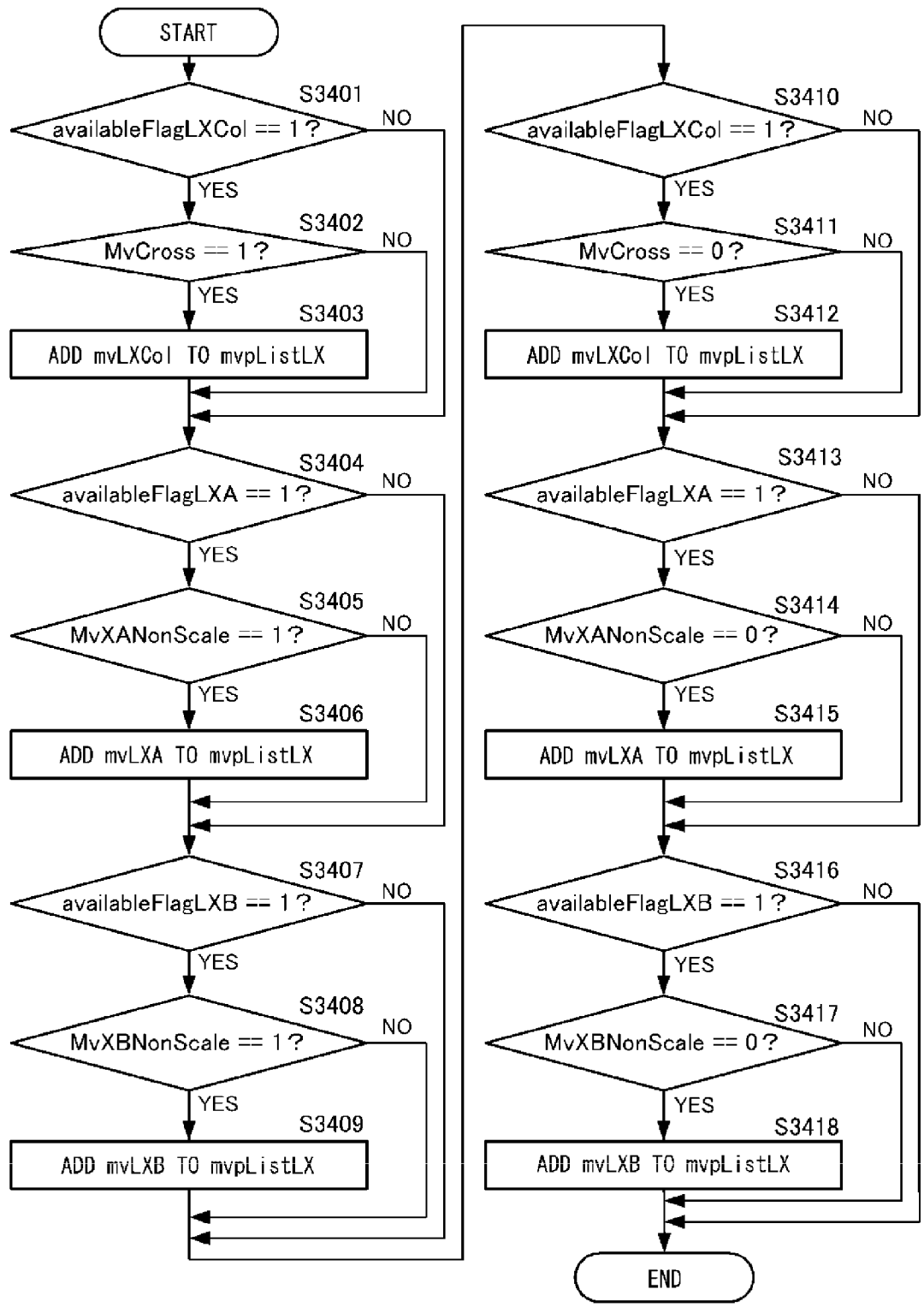
FIG. 33 is a flowchart showing a method of adding motion vector predictor candidate in a motion vector predictor candidate list.

If the flag mv_temporal_high_priority_flag is 1, and if mv_list_adaptive_idx_flag is 1 (YES in S3101, YES in S3102), motion vector predictor candidates are added in the MVP list according to the processing steps of the flowchart shown in FIG. 33 such that motion vector predictor candidates considered to be relatively more reliable are given priority, and the motion vector predictor candidate mvLXCol from the prediction block located at the same position as or in the neighborhood of the target prediction block in a picture at a point of time is given higher priority than the motion vector predictor candidates mvLXA, mvLXB from the prediction blocks neighboring to the left and above (S3106).

Figure 34:
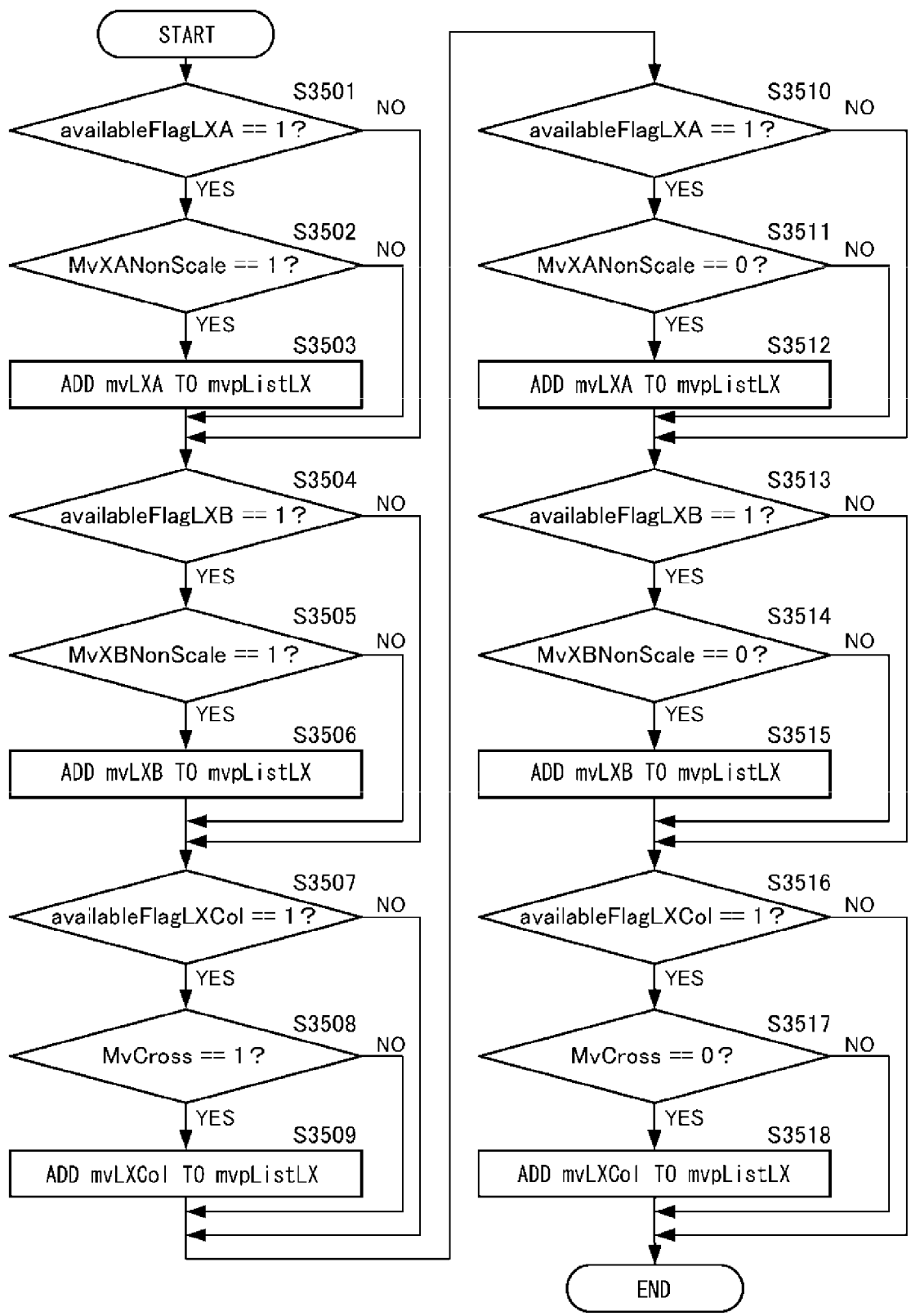
FIG. 34 is a flowchart showing a method of adding motion vector predictor candidate in a motion vector predictor candidate list.

If the flag mv_temporal_high_priority_flag is 0, and if mv_list_adaptive_idx_flag is 1 (NO in S3101, YES in S3103), motion vector predictor candidates are added in the MVP list according to the processing steps of the flowchart shown in FIG. 34 such that motion vector predictor candidates considered to be relatively more reliable are given priority, and the motion vector predictor candidates mvLXA, mvLXB from the prediction blocks neighboring to the left and above are given higher priority than the motion vector predictor candidate mvLXCol from the prediction block located at the same position as or in the neighborhood of the target prediction block in a picture at a point of time (S3107).

As described above, the value of the second flag mv_temporal_high_priority_flag is coded for each frame or slice for the purpose of improving the coding efficiency, changing the value adaptively. The code size of the MVP indices can be reduced by setting mv_temporal_high_priority_flag to true (1) if the distance between the picture subject to coding/decoding and the closest reference picture is small, and setting the flag to false (0) if the distance between the picture subject to coding/decoding and the reference picture is large. In case the distance is relatively small, a decision is made that the candidate of MVP from a different point of time is relatively more suitable as the candidate. For example, in the case of the frame rate of 30 Hz, the code size of the MVP indices may be reduced by setting mv_temporal_high_priority_flag to true (1) if the distance between the picture subject to coding/decoding and the closest reference picture is less than or equal to X frames (X=1-3), and by setting the flag to false (0) if the distance between the picture subject to coding/decoding and the reference picture is more than X frames. By modifying the threshold X depending on the content of sequence, the code size is reduced more efficiently. In the case of a motion-rich and complicated sequence, the coding efficiency is improved by decreasing the threshold X and thereby lowering the order of priority of the MVP candidate in the temporal dimension.

FIG. 31 is a flowchart showing the processing steps of adding motion vector predictor candidates in the MVP list mvpListLX if the flag mv_temporal_high_priority_flag coded for each slice, sequence, or picture is 1, and if mv_list_adaptive_idx_flag is 0 (YES in S3101, NO in S3102).

First, if availableFlagLXCol is 1 (YES in S3201), mvLXCol is added at the top of the MVP list mvpListLX (S3202). Subsequently, if availableFlagLXA is 1 (YES in S3203), mvLXA is added at the end of the MVP list mvpListLX (S3204). Subsequently, if availableFlagLXB is 1 (YES in S3205), mvLXB is added at the end of the MVP list mvpListLX (S3206).

FIG. 32 is a flowchart showing the processing steps of adding motion vector predictor candidates in the MVP list mvpListLX if the flag mv_temporal_high_priority_flag coded for each slice, sequence, or picture is 1, and if mv_list_adaptive_idx_flag is 0 (NO in S3101, NO in S3103).

First, if availableFlagLXA is 1 (YES in S3301), mvLXA is added at the top of the MVP list mvpListLX (S3302). Subsequently, if availableFlagLXB is 1 (YES in S3303), mvLXB is added at the end of the MVP list mvpListLX (S3304). Subsequently, if availableFlagLXCol is 1 (YES in S3305), mvLXCol is added at the end of the MVP list mvpListLX (S3306).

FIG. 33 is a flowchart showing the processing steps of adding motion vector predictor candidates in the MVP list mvpListLX if the flag mv_temporal_high_priority_flag coded for each slice, sequence, or picture is 1, and if mv_list_adaptive_idx_flag is 1 (YES in S3101, YES in S3102).

First, if availableFlagLXCol is 1 and MvCross is 1 (YES in S3401, YES in S3402), mvLXCol is added at the top of the MVP list mvpListLX (S3403). Subsequently, if availableFlagLXA is 1 and MvXANonScale is 1 (YES in S3404, YES in S3405), mvLXA is added at the end of the MVP list mvpListLX (S3406). Subsequently, if availableFlagLXB is 1 and MvXBNonScale is 1 (YES in S3407, YES in S3408), mvLXB is added at the end of the MVP list mvpListLX (S3409). Subsequently, if availableFlagLXCol is 1 and MvCross is 0 (YES in S3401, YES in S3411), mvLXCol is added at the end of the MVP list mvpListLX (S3412). Subsequently, if availableFlagLXA is 1 and MvXANonScale is 0 (YES in S3413, YES in S3414), mvLXA is added at the end of the MVP list mvpListLX (S3415). Subsequently, if availableFlagLXB is 1 and MvXBNonScale is 1 (YES in S3417, YES in S3408), mvLXB is added at the end of the MVP list mvpListLX (S3418).

FIG. 34 is a flowchart showing the processing steps of adding motion vector predictor candidates in the MVP list mvpListLX if the flag mv_temporal_high_priority_flag coded for each slice, sequence, or picture is 0, and if mv_list_adaptive_idx_flag is 1 (NO in S3101, YES in S3103).

First, if availableFlagLXA is 1 and MvXANonScale is 1 (YES in S3501, YES in S3502), mvLXA is added at the top of the MVP list mvpListLX (S3503). Subsequently, if availableFlagLXB is 1 and MvXBNonScale is 1 (YES in S3504, YES in S3505), mvLXB is added at the end of the MVP list mvpListLX (S3506). Subsequently, if availableFlagLXCol is 1 and MvCross is 1 (YES in S3507, YES in S3508), mvLXCol is added at the end of the MVP list mvpListLX (S3509). Subsequently, if availableFlagLXA is 1 and MvXANonScale is 0 (YES in S3510, YES in S3511), mvLXA is added at the end of the MVP list mvpListLX (S3512). Subsequently, if availableFlagLXB is 1 and MvXBNonScale is 0 (YES in S3513, YES in S3514), mvLXB is added at the end of the MVP list mvpListLX (S3515). Subsequently, if availableFlagLXCol is 1 and MvCross is 0 (YES in S3516, YES in S3517), mvLXCol is added at the end of the MVP list mvpListLX (S3518).

In the processing steps of FIG. 30 of adding motion vector predictor candidates in the MVP list mvpListLX, the code size is reduced by adding the temporal motion vector mvLXCol toward the top of the MVP list in preference to the spatial motion vectors, if mv_temporal_high_priority_flag is 1, and adding the spatial vectors mvLXA, mvLXB toward the top of the MVP list in preference to the temporal motion vector, if mv_temporal_high_priority_flag is 0.

In the processing steps of FIGS. 33 and 34 of adding motion vector predictor candidates in the MVP list mvpListLX, it is determined that the motion vector predictor candidate for which the flag MvCross is set to 1, i.e., the motion vector predictor derived from the motion vector mvCol of colPu that refers to a reference picture, intersecting the picture that includes the prediction block subject to coding/decoding, has a value closer to that of the motion vector subject to coding/decoding and produces a smaller value of the motion vector difference than the motion vector predictor candidate for which the flag MvCross is set to 0, i.e., the motion vector predictor derived from the motion vector mvCol of colPu that refers to a reference picture without intersecting the picture that includes the prediction block subject to coding/decoding. The code size is reduced by preferentially adding the motion vector predictor of the prediction block Col toward the top of the MVP list. In other words, the code size is reduced by modifying the order of priority depending on the value of coding information of the prediction block Col in the picture at a different point of time and adding the candidates accordingly.

Further, given a prediction block N (N is A or B), it is determined that the motion vector predictor candidate predicted from the motion vector for which MvXNNonScale is set to 1 is relatively more suitable as a motion vector predictor candidate of the predictor block subject to coding/decoding and has a value closer to that of the motion vector subject to coding/decoding than the motion vector predictor candidate predicted from the motion vector for which MvXNNonScale is set to 0. The code size is reduced by preferentially adding the candidate for which MvXNNonScale is set to 1 in the MVP list.

Figure 35:
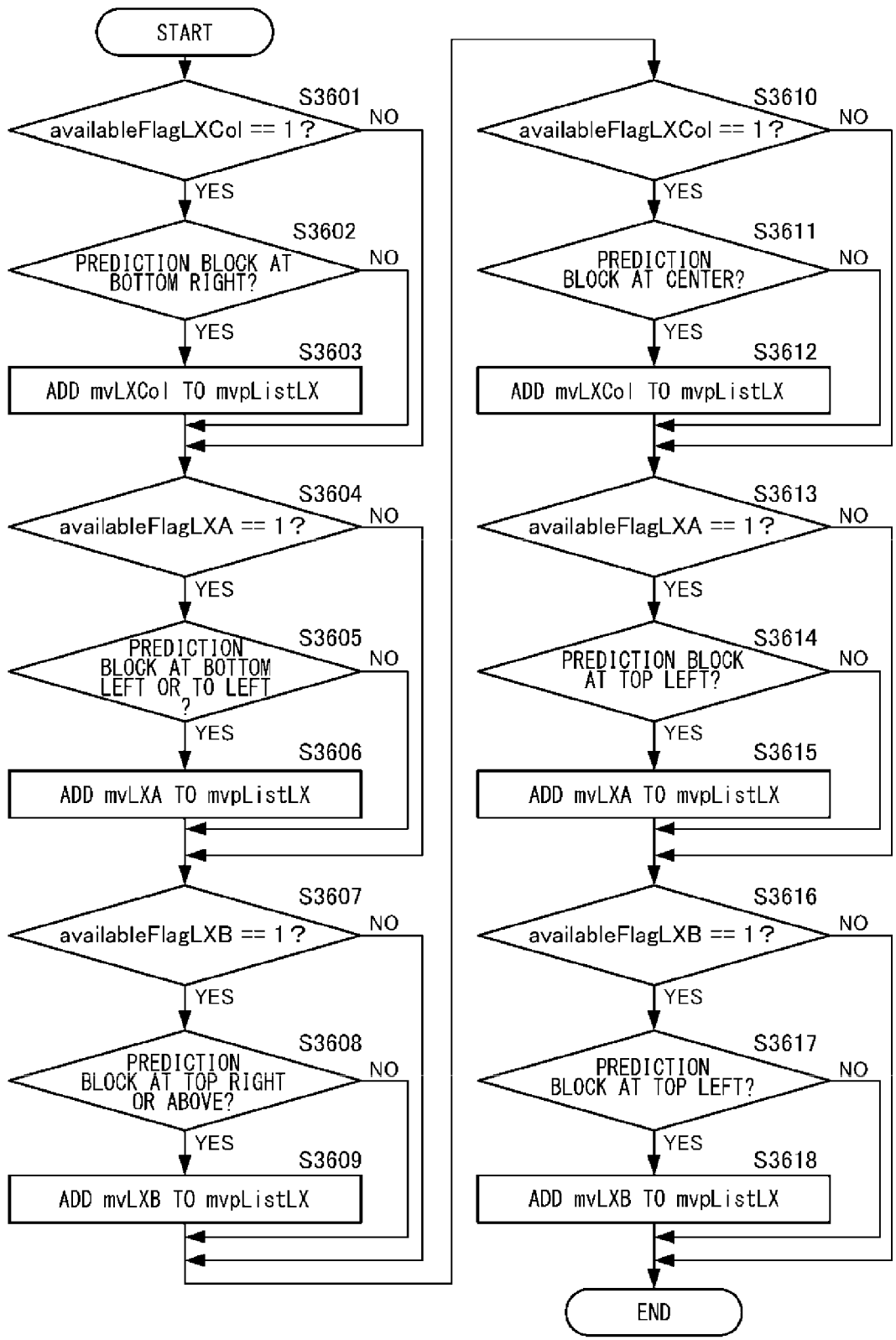
FIG. 35 is a flowchart showing a method of adding motion vector predictor candidate in a motion vector predictor candidate list.
Figure 36:
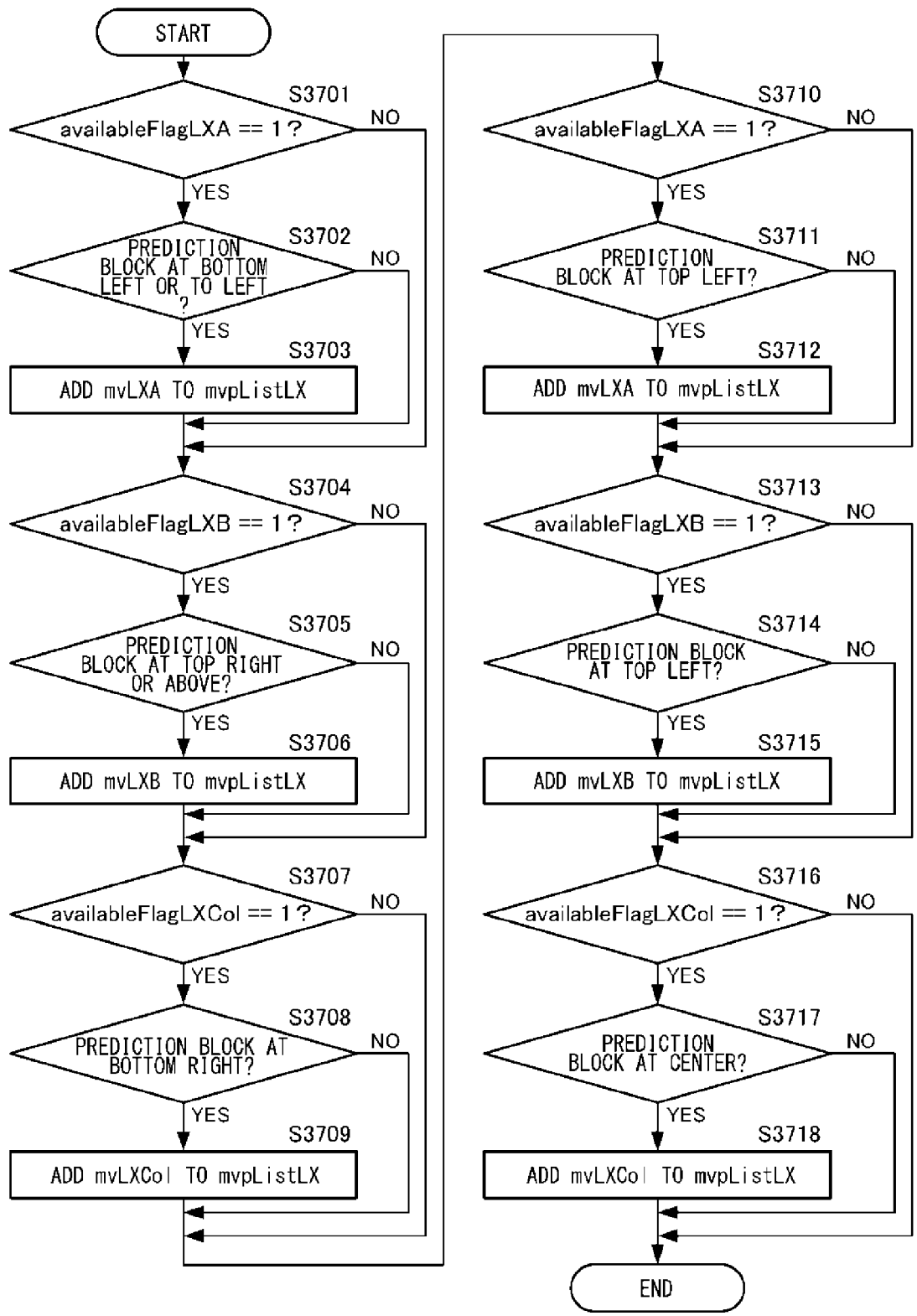
FIG. 36 is a flowchart showing a method of adding motion vector predictor candidate in a motion vector predictor candidate list.

Motion vector predictor candidates may be added according to the processing steps of FIGS. 35 and 36 instead of the steps of FIGS. 33 and 34.

FIG. 35 is a flowchart showing the processing steps of adding motion vector predictor candidates in the second MVP list mvpListLX if the flag mv_temporal_high_priority_flag coded for each slice, sequence, or picture is 1, and if mv_list_adaptive_idx_flag is 1 (YES in S3101, YES in S3102).

First, if availableFlagLXCol is 1 and the prediction block at bottom right is selected in the prediction block group at a different point of time (YES in S3601, YES in S3602), mvLXCol is added at the top of the MVP list mvpListLX (S3603). Subsequently, if availableFlagLXA is 1 and the prediction block at bottom left or left is selected in the prediction block group neighboring to the left (YES in S3604, YES in S3605), mvLXA is added at the end of the MVP list mvpListLX (S3606). Subsequently if availableFlagLXB is 1 and the prediction block at top right or above is selected in the prediction block group neighboring above (YES in S3607, YES in S3608), mvLXB is added at the end of the MVP list mvpListLX (S3609). Subsequently, if availableFlagLXCol is 1 and the prediction block at center is selected in the prediction block group at a different point of time (YES in S3610, YES in S3611), mvLXCol is added at the end of the MVP list mvpListLX (S3612). Subsequently, if availableFlagLXA is 1 and the prediction block at top left is selected in the prediction block group neighboring to the left (YES in S3613, YES in S3614), mvLXA is added at the end of the MVP list mvpListLX (S3615). Subsequently if availableFlagLXB is 1 and the prediction block at top left is selected in the prediction block group neighboring above (YES in S3617, YES in S3616), mvLXB is added at the end of the MVP list mvpListLX (S3618).

FIG. 36 is a flowchart showing the processing steps of adding motion vector predictor candidates in the second MVP list mvpListLX if the flag mv_temporal_high_priority_flag coded for each slice, sequence, or picture is 0, and if mv_list_adaptive_idx_flag is 1 (NO in S3101, YES in S3103).

First, if availableFlagLXA is 1 and the prediction block at bottom left or left is selected in the prediction block group neighboring to the left (YES in S3701, YES in S3702), mvLXA is added at the top of the MVP list mvpListLX (S3703). Subsequently, if availableFlagLXB is 1 and the prediction block at top right or above is selected in the prediction block group above (YES in S3704, YES in S3705), mvLXB is added at the end of the MVP list mvpListLX (S3706). Subsequently, if availableFlagLXCol is 1 and the prediction block at bottom right is selected in the prediction block group at a different point of time (YES in S3707, YES in S3708), mvLXCol is added at the end of the MVP list mvpListLX (S3709). Subsequently, if availableFlagLXA is 1 and the prediction block at top left is selected in the prediction block group neighboring to the left (YES in S3710, YES in S3711), mvLXA is added at the end of the MVP list mvpListLX (S3712). Subsequently if availableFlagLXB is 1 and the prediction block at top left is selected in the prediction block group neighboring above (YES in S3713, YES in S3714), mvLXB is added at the end of the MVP list mvpListLX (S3715). Subsequently, if availableFlagLXCol is 1 and the prediction block at center is selected in the prediction block group at a different point of time (YES in S3716, YES in S3717), mvLXCol is added at the end of the MVP list mvpListLX (S3718).

In the processing steps of FIGS. 35 and 36 of adding motion vector predictor candidates in the MVP list mvpListLX, it is determined that the motion vector predictor candidate predicted from the motion vector of the prediction block at bottom right in the prediction block group at a different point of time has a value closer to that of the motion vector subject to coding/decoding and produces a smaller value of the motion vector difference than the motion vector predictor candidate predicted from the motion vector of the prediction block at center in the prediction block group at a different point of time. The code size is reduced by preferentially adding the motion vector predictor predicted from the motion vector of the prediction block at bottom right in the MVP list. In the prediction block group neighboring to the left, it is determined that the motion vector predictor candidate predicted from the motion vector of the prediction block at bottom left or left has a value closer to that of the motion vector subject to coding/decoding and produces a smaller value of the motion vector difference than the motion vector predictor candidate predicted from the motion vector of the prediction block at top left. The code size is reduced by preferentially adding the motion vector predictor predicted from the motion vector of the prediction block at bottom left or left in the MVP list. In the prediction block group neighboring above, it is determined that the motion vector predictor candidate predicted from the motion vector of the prediction block at top right or above has a value closer to that of the motion vector subject to coding/decoding and produces a smaller value of the motion vector difference than the motion vector predictor candidate predicted from the motion vector of the prediction block at top left. The code size is reduced by preferentially adding the motion vector predictor predicted from the motion vector of the prediction block at top right or above in the MVP list.

[Deletion of Motion Vector Predictor Candidates in the MVP List Having the Same Value (S305 of FIG. 16)]

If there are motion vector predictor candidates having the same value of motion vector in the MVP list mvpListLX, all candidates are deleted except for the motion vector predictor candidate having the smallest index in the MVP list mvpListLX. After the deletion, the storage area in the MVP list mvpListLX previously occupied by the deleted motion vector predictor candidate is left unfilled so that the vacancy is filled by motion vector predictor candidates in the ascending order of the index, the index 0 being the reference. For example, if the motion vector predictor candidates with the indices 1, 4 are deleted and the indices 0, 2, and 3 remain, the index 0 should remain as previously. The motion vector predictor candidates with the index 2 is moved to the storage area for the index 1, and the motion vector predictor candidate with the index 3 is moved to the storage area for the index 2, thereby updating the content of the MVP list mvpListLX.

The order of performing steps S301, S302, and S303 may be changed. Alternatively, the steps may be performed in parallel.

A description will now be given of the merge mode. Described above is the method of deriving a motion vector predictor and the method of building a motion vector predictor list performed in the motion vector difference derivation unit 103 in the moving picture coding device and in the motion vector derivation unit 204 in the moving picture decoding device. The inter prediction information estimation unit 104 in the moving picture coding device and the inter prediction information estimation unit 205 in the moving picture decoding device perform a similar process.

As described above, the merge mode does not code/decode inter prediction information such as a prediction mode, a reference index, a motion vector, etc. of the prediction block. Instead, the merge mode uses inter prediction information of a coded neighboring prediction block subjected to inter prediction or inter prediction information of a prediction block in a different picture subjected to inter prediction.

Figure 37:
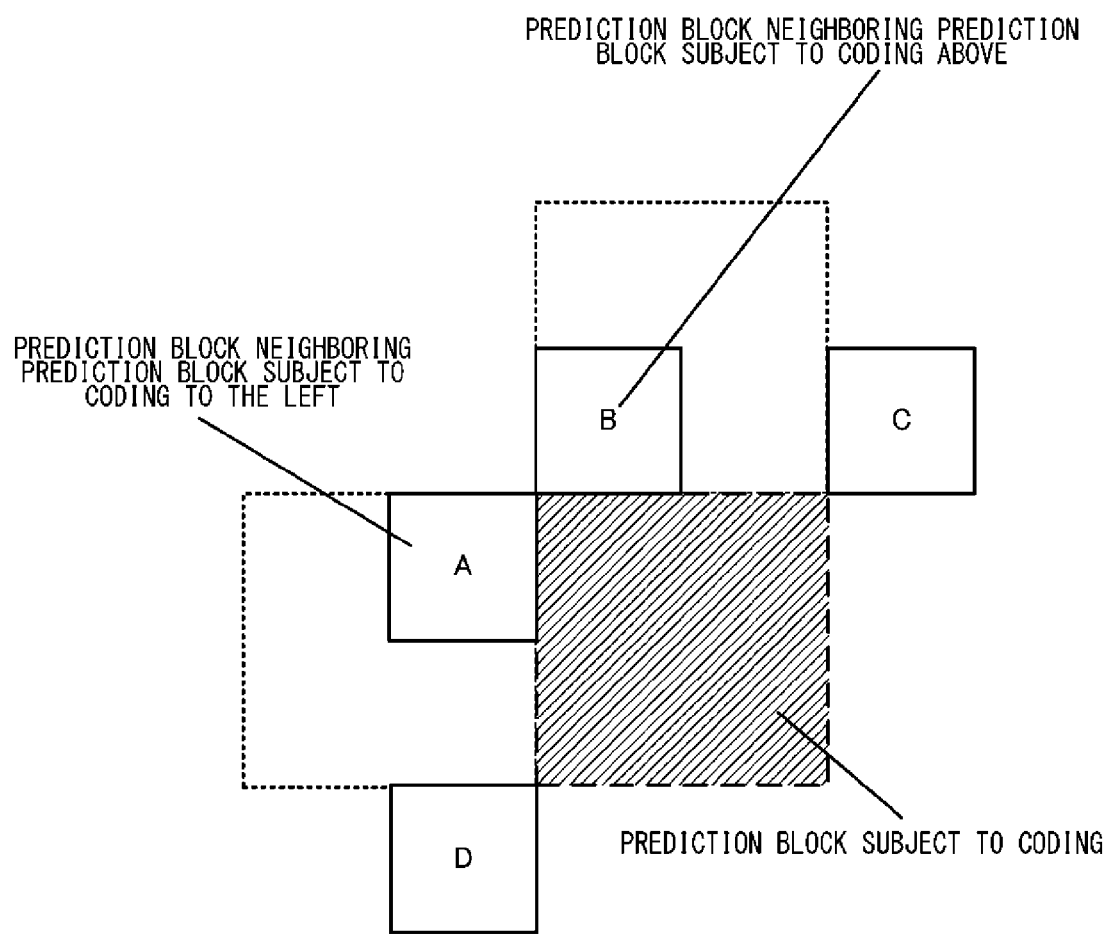
FIG. 37 shows neighboring prediction blocks in the merge mode.

FIG. 37 shows the positions of neighboring prediction blocks in the merge mode. In the merge mode, a total of 5 prediction blocks including the prediction block Col (one of T0-T3) described with reference to FIG. 9 as being located at the same position as or in the neighborhood of the target prediction block in a picture at a different point of time as well as including the prediction block A neighboring to the left, the prediction block B neighboring above, the prediction block C neighboring at top right, and the prediction block D neighboring at bottom left are defined as candidates. The inter prediction information estimation unit 104 of the moving picture coding device and the inter prediction information estimation unit 205 of the moving picture decoding device add the 5 candidates in the merge candidate list according to the order commonly defined on the coding side and on the decoding side. The inter prediction information estimation unit 104 of the moving picture coding device determines a merge index that identifies an element in the merge candidate list and codes the merge index via the first bitstream generation unit. The inter prediction information estimation unit 205 of the moving picture decoding device is supplied with a merge index decoded by the first bitstream decoding unit 202, selects the prediction block determined by the merge index, and performs motion compensation prediction using the inter prediction information such as the prediction mode, the reference index, the motion vector, etc. of the selected prediction block.

Figure 38:
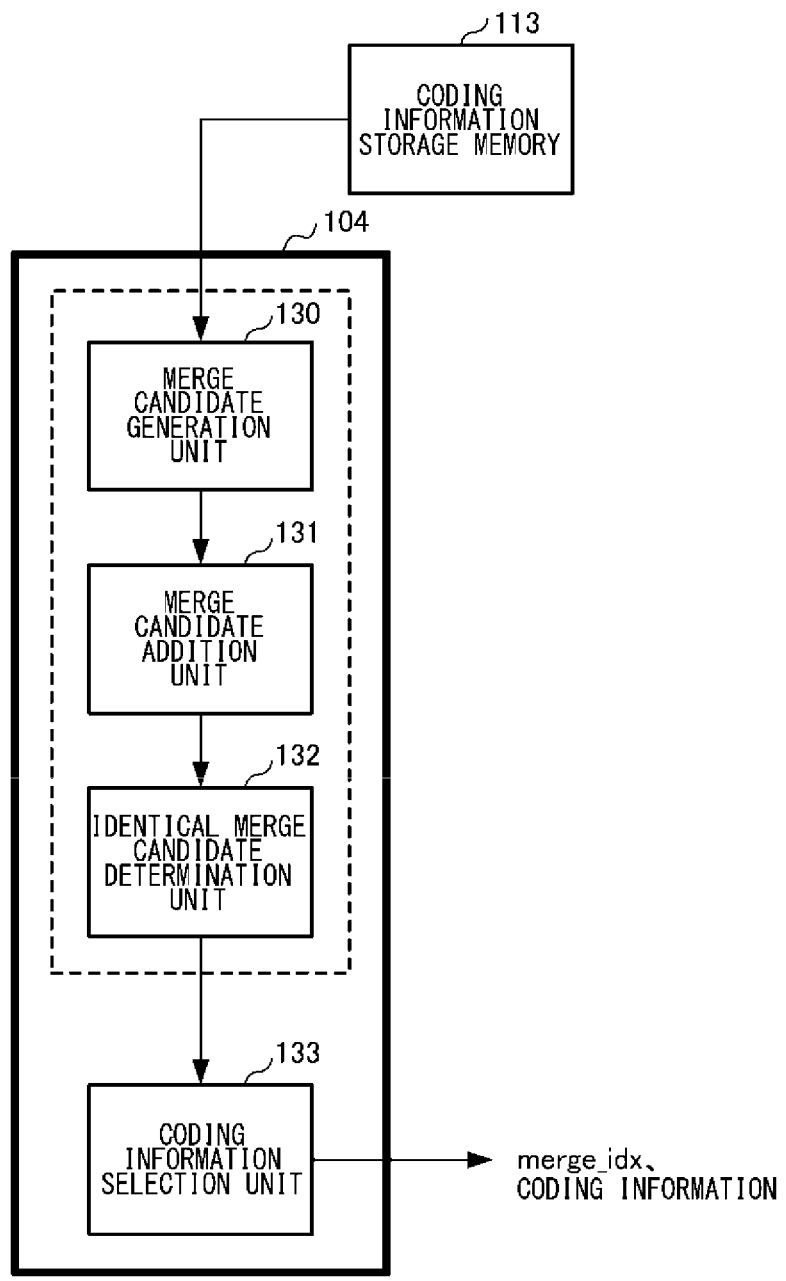
FIG. 38 is a block diagram showing the detailed configuration of the inter prediction information estimation unit of FIG. 1.
Figure 39:
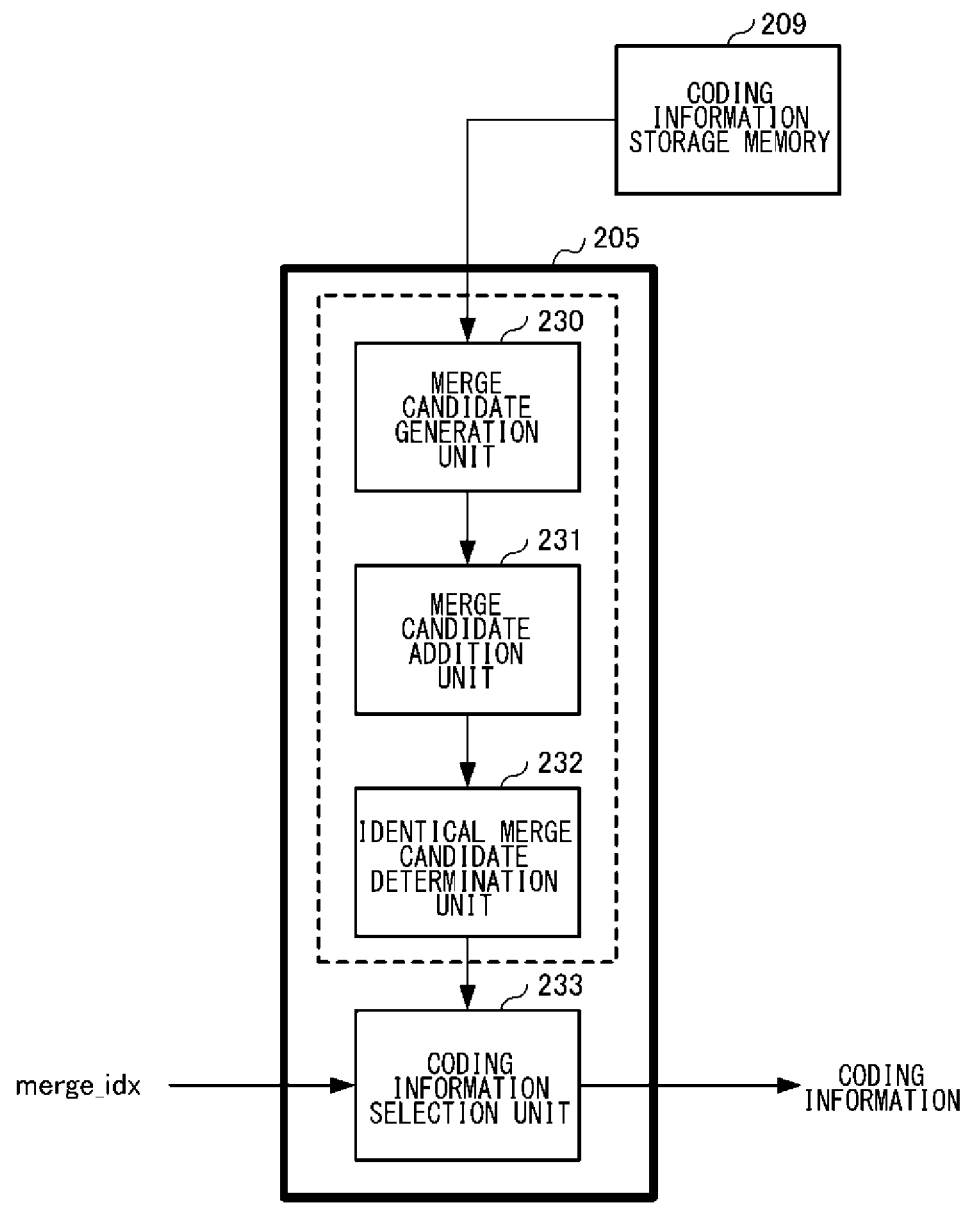
FIG. 39 is a block diagram showing the detailed configuration of the inter prediction information estimation unit of FIG. 2.

FIG. 38 shows the detailed configuration of the inter prediction information estimation unit 104 of the moving picture coding device of FIG. 1. FIG. 39 shows the detailed configuration of the inter prediction information estimation unit 205 of the moving picture decoding device of FIG. 2.

The parts bounded by the heavy dotted lines in FIGS. 38 and 39 respectively represent the inter prediction information estimation unit 104 and the inter prediction information estimation unit 205.

The part bounded by the heavy dotted line further inside indicates the part where the method of estimating inter prediction information is performed. The moving picture decoding device corresponding to the moving picture coding device according to the embodiment contains a similar part so that the consistent, same result of decision is obtained on the coding side and the decoding side.

The inter prediction information estimation unit 104 includes a merge candidate generation unit 130, a merge candidate addition unit 131, an identical merge candidate decision unit 132, and a coding information selection unit 133.

The inter prediction information estimation unit 205 includes a merge candidate generation unit 230, a merge candidate addition unit 231, an identical merge candidate decision unit 232, and a coding information selection unit 233.

Figure 40:
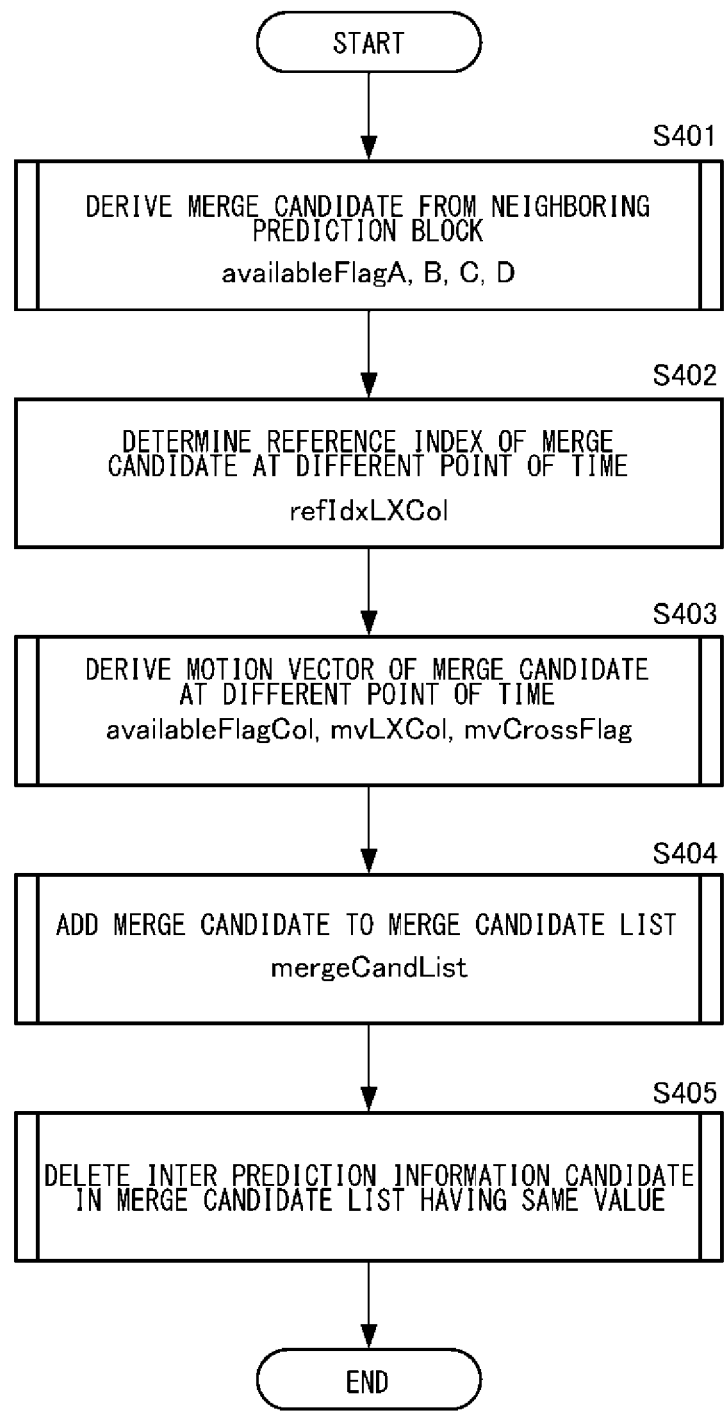
FIG. 40 is a flowchart showing the operation in the merge mode.

FIG. 40 is a flowchart showing the flow of the process of deriving merge candidates and building a merge candidate list commonly performed in the inter prediction information estimation unit 104 of the moving picture coding device and in the inter prediction information estimation unit 205 of the moving picture decoding device. The steps will be described in sequence.

The merge candidate generation unit 130 of the inter prediction information estimation unit 104 of the moving picture coding device and the merge candidate generation unit 230 of the inter prediction information estimation unit 205 of the moving picture decoding device derive, for each list, merge candidate prediction blocks from the neighboring prediction blocks A, B, C, D. The merge candidate generation units 130 and 230 output a flag availableFlagN indicating whether the neighboring block is available, a motion vector mvLXN, a reference index refIdxLXN, and an LN prediction flag predFlagLXN (N=A, B, C, D) indicating whether LN prediction is performed (S401 of FIG. 40). In the case of L0, X is 0. In the case of L1, X is 1 (the same shall apply hereinafter). The common processing steps to derive the flag availableFlagLXN indicating whether the neighboring block is available, the motion vector mvLXN, the reference index refIdxLXN, and the LN prediction flag predFlagLXN (N=A, B, C, D) will be described later in detail with reference to the flowchart of FIG. 41.

Subsequently, a merge candidate at a different point of time is derived. For inter prediction using coding information of a merge candidate at a different point of time, two items of coding information for L0 and L1 are derived for bi-prediction. First, the merge candidate generation unit 130 of the inter prediction information estimation unit 104 of the moving picture coding device and the merge candidate generation unit 230 of the inter prediction information estimation unit 205 of the moving picture decoding device determine a reference index refIdxLXCol of a merge candidate at a different point of time and output the index (S402 of FIG. 40). The coding information of coded neighboring prediction blocks are examined both in the L0 and L1 predictions. The value of the reference index that occurs most frequently is defined as the value of the reference index refIdxLXCol. If a plurality of reference indices are identified as occurring most frequently, the one with a smaller value of the reference index is defined as the value of the reference index refIdxLXCol. If there are no reference indices (either the neighboring prediction blocks are unavailable, or the intra prediction mode is designated), the value of the reference index refIdxLXCol is set to be 0.

Subsequently, the merge candidate generation unit 130 of the inter prediction information estimation unit 104 of the moving picture coding device and the merge candidate generation unit 230 of the inter prediction information estimation unit 205 of the moving picture decoding device determine a motion vector predictor candidate from a picture at a different point of time and output a flag availableFlagCol indicating whether the candidate is available, a flag mvCrossFlag indicating whether intersection occurs, and a motion vector mvLXCol (S403 of FIG. 40). The processing steps for the derivation are described with reference to the flowcharts of FIGS. 24-29 and FIG. 22. In the merge mode, however, MV scaling according to FIG. 22 is performed such that the motion vector is scaled in accordance with the reference index refIdxLXCol derived in step S402.

Subsequently, the merge candidate addition unit 131 of the inter prediction information estimation unit 104 of the moving picture coding device and the merge candidate addition unit 231 of the inter prediction information estimation unit 205 of the moving picture decoding device construct a merge candidate list mergeCandList and adds the motion vector predictor candidate mvLXN (N is A, B, C, D, or Col, the same also applies hereinafter) in the list (S404 of FIG. 40). The processing steps for addition will be described later in detail with reference to the flowcharts of FIGS. 42-45.

Subsequently, if merge candidates in the merge candidate list mergeCandList have the same reference index and the same motion vector value, the identical merge candidate decision unit 132 of the inter prediction information estimation unit 104 of the moving picture coding device and the identical merge candidate decision unit 232 of the inter prediction information estimation unit 205 of the moving picture decoding device remove the associated motion vectors except for the merge candidate with the smallest index.

[(Derivation of a Merge Candidate from Neighboring Prediction Blocks (S401 of FIG. 40)]

Figure 41:
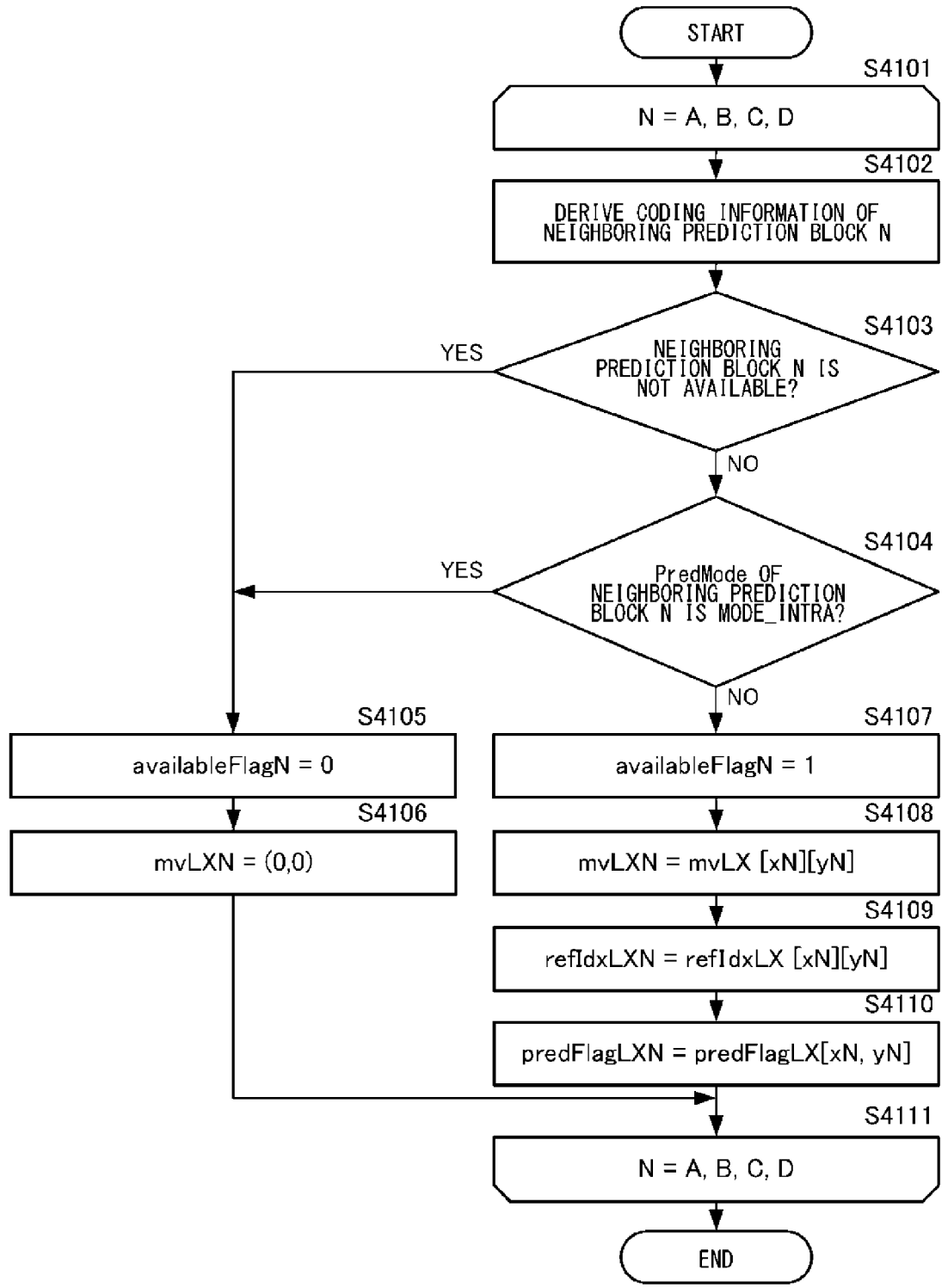
FIG. 41 is a flowchart showing the operation in the merge mode.

The method of deriving a prediction block N from the neighboring prediction block group N (i.e., the step S401 of FIG. 40) will be described with reference to the flowchart of FIG. 41. 0 or 1, indicating a reference list, is substituted into the suffix X. A (left) or B (above), C (top right), or D (bottom left) indicating an area of neighboring prediction block group, is substituted into N.

Referring to FIG. 40, the variable N is set such that N=A to examine the prediction block neighboring the prediction block subject to coding/decoding to the left, N=B to examine the prediction block neighboring above, N=C to examine the prediction block neighboring at top right, and N=D to examine the prediction block neighboring at bottom left, before deriving motion vector predictor candidates in the following steps (S4101-S4110).

First, the prediction block neighboring the prediction block subject to coding/decoding is identified. If the prediction block N is available, the associated coding information is derived (S4102).

If the neighboring prediction block N is not available (YES in S4103) or if the coding mode PredMode of the prediction block N is intra (MODE_INTRA) (YES in S4104), the flag availableFlagN is set to 0 (S4105), and mvLXN is set to (0, 0) (S4106).

Meanwhile, if the neighboring prediction block N is available (NO in S4103) and if the coding mode PredMode of the prediction block N is not intra (MODE_INTRA) (NO in S4104), the flag availableFlagN is set to 1 (S4107), and the inter prediction information of the prediction block N is derived. In other words, the motion vector mvLXN, the reference index refIdxLX[xN,yN], and the flag predFlagLX [xN,yN] indicating whether prediction from LX is performed, of the prediction block N are assigned as mvLXN, refIdxLXN, and predFlagLXN, respectively (S4108, S4108, S4110). X is set to 0 or 1 for derivation of the L0 or L1 inter prediction information. If weighted prediction is performed and weight factors are set in units of prediction blocks, the weight factors are also derived. If interlace coding is performed and if the frame mode and the field mode are switchably used in units of prediction blocks, the frame/field switching mode is also derived. Parameters other than inter prediction information (e.g., quantization parameter) may also be derived. The above steps S4102-S4110 are repeated for N=A, B, C, D (S4101-S4111).

[Addition of a Prediction Block Candidate to the Merge Candidate List S404 of FIG. 40)]

Figure 42:
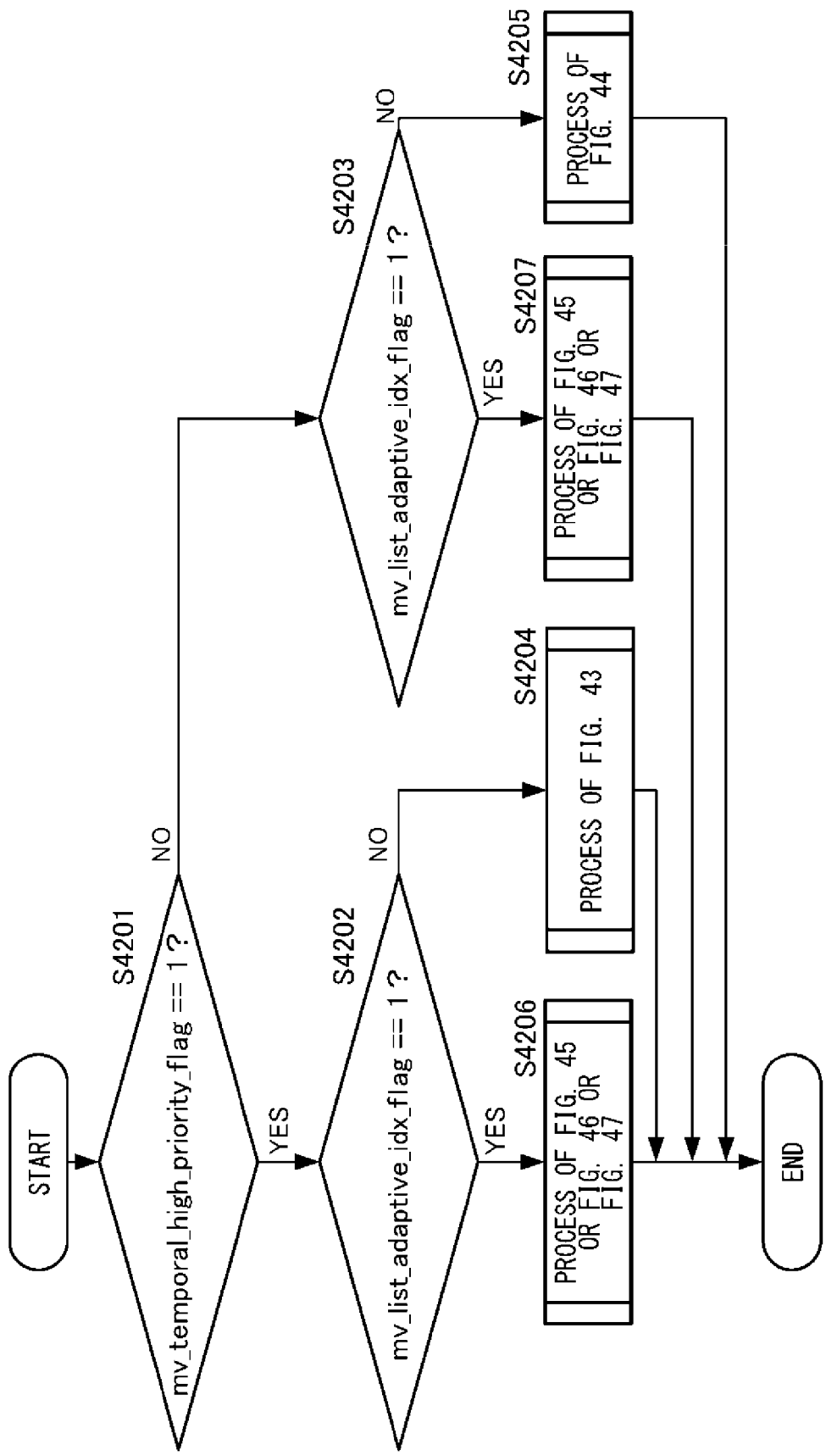
FIG. 42 is a flowchart showing the operation in the merge mode.

A description will now be given of the method of adding a merge candidate prediction block described with reference to FIGS. 37 and 9 to the merge candidate list. FIG. 42 is a flowchart showing the processing steps of adding merge candidate prediction blocks to the merge candidate list. According to the scheme described herein, the code size of merge indices merge_idx[x0][y0] is reduced by adding the motion vector predictor candidates to the merge candidate list mergeCandList in the order of priority. By locating elements with higher priority toward the top of the merge candidate list, the code size is reduced. For example, if the number of elements in the merge candidate list mergeCandList is 5, the code size required to define an index 0 will be 1 bit by representing the index 0 in the merge candidate list as "0", the index 1 as "10", the index 2 as "110", the index 3 as "1110, and the index 4 as "1110". By adding an element with the highest frequency of occurrence at the index 0, the code size is reduced.

The merge candidate list mergeCandList is built as a list. The merge candidate list is provided with a storage area for storing, as elements, a merge index indicating the location inside the merge candidate list and a motion vector predictor candidate corresponding to the index. Merge indices start with 0. The storage area for the merge candidate list mergeCandList stores the motion vector predictor candidates. In the following description of the steps, the merge candidate prediction block added in the merge candidate list mergeCandList at the merge index i will be denoted by mergeCandList[i] so as to distinguish it from the merge candidate list mergeCandList by using array notation.

Figure 43:
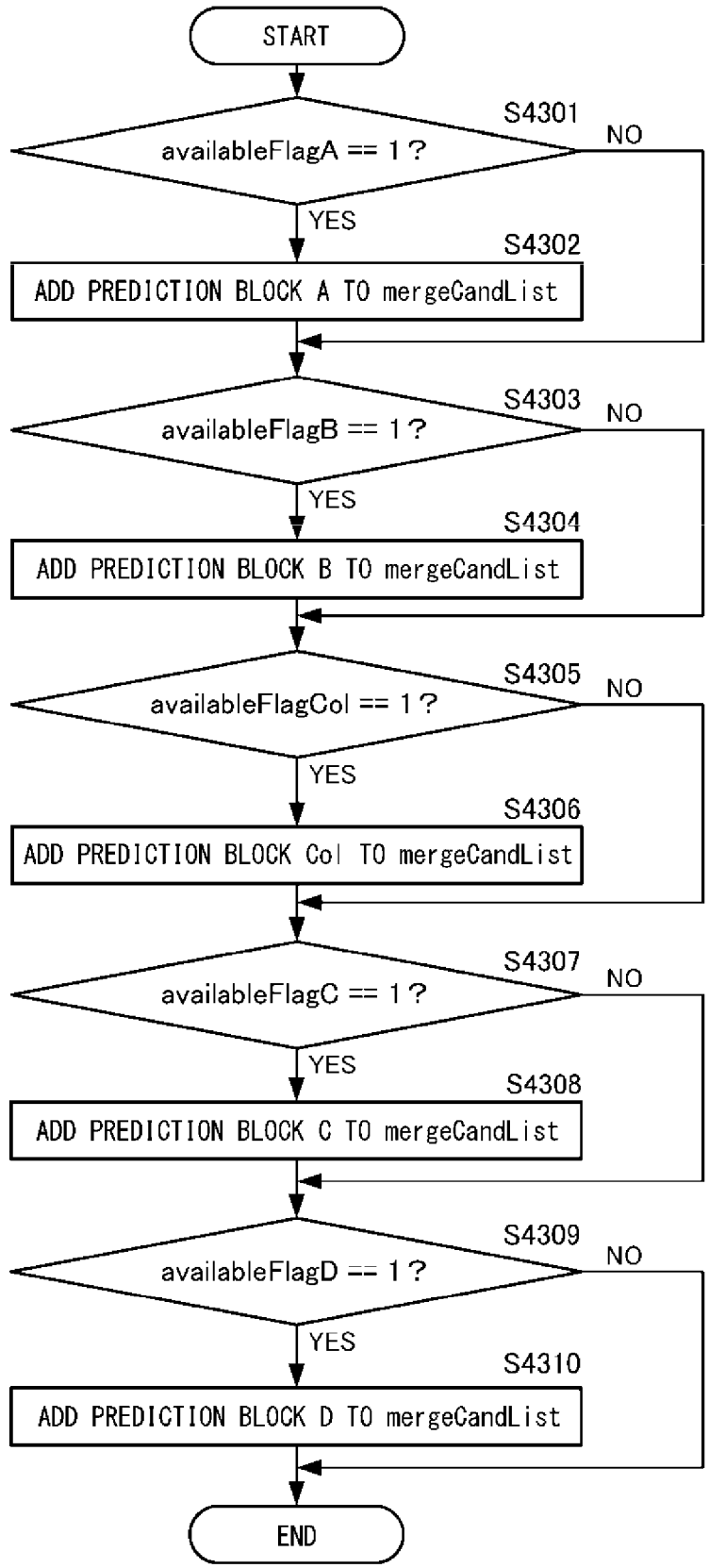
FIG. 43 is a flowchart showing the operation in the merge mode.

If the flag mv_temporal_high_priority_flag coded for each slice, sequence, or picture is 1, and if mv_list_adaptive_idx_flag is 0 (YES in S4201, NO in S4202), merge candidate prediction blocks are added in the merge candidate list according to the processing steps of the flowchart shown in FIG. 43 such that the prediction block Col located at the same position as or in the neighborhood of the target prediction block in a picture at a point of time is given higher priority than the prediction blocks C, D neighboring at top right and bottom left (S4204).

Figure 44:
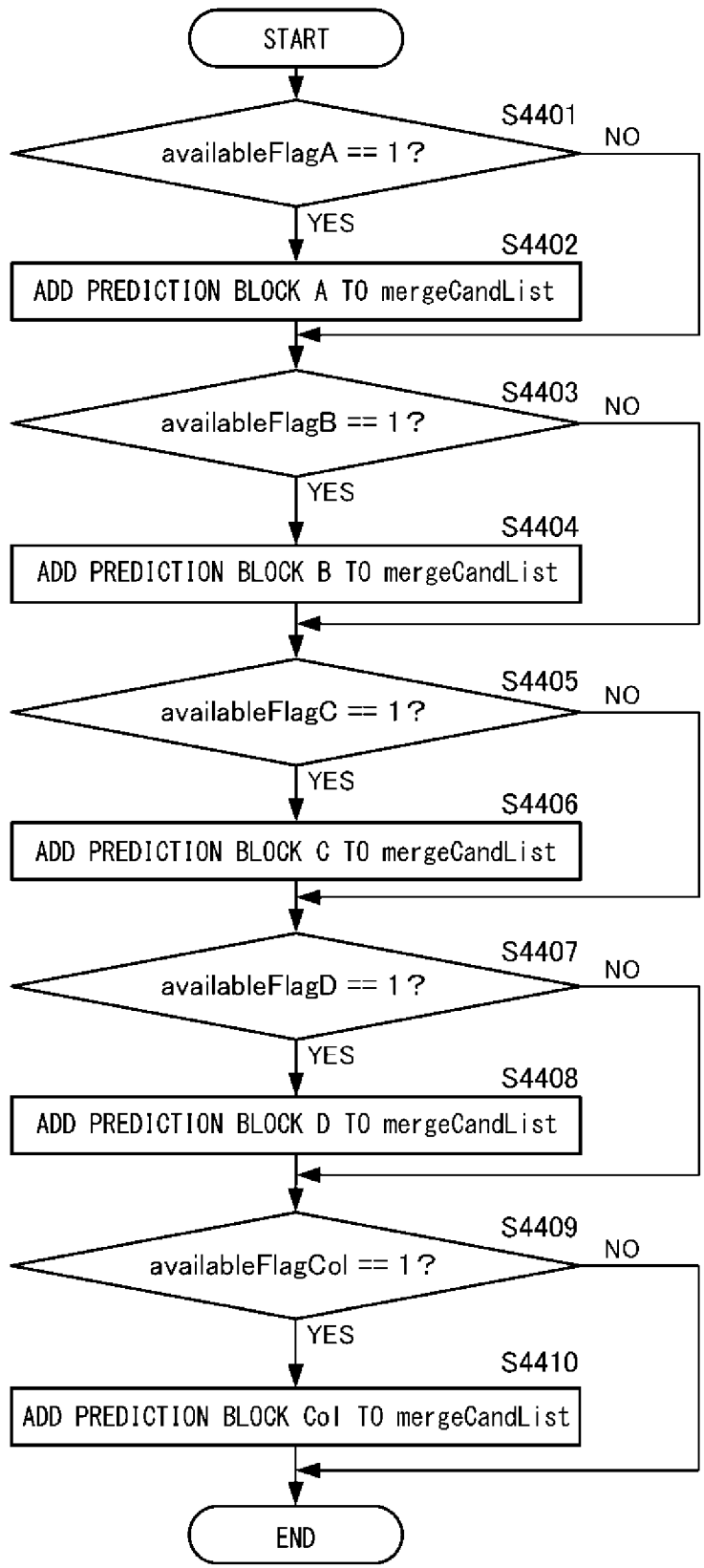
FIG. 44 is a flowchart showing the operation in the merge mode.

Further, If mv_temporal_high_priority_flag is 0, and if mv_list_adaptive_idx_flag is 0 (NO in S4201, NO in S4203), merge candidate prediction blocks are added in the merge candidate list according to the processing steps of the flowchart shown in FIG. 44 such that the prediction blocks C, D neighboring at top right and bottom left are given higher priority than the merge candidate prediction block Col located at the same position as or in the neighborhood of the target prediction block in a picture at a point of time (S4205).

Figure 45:
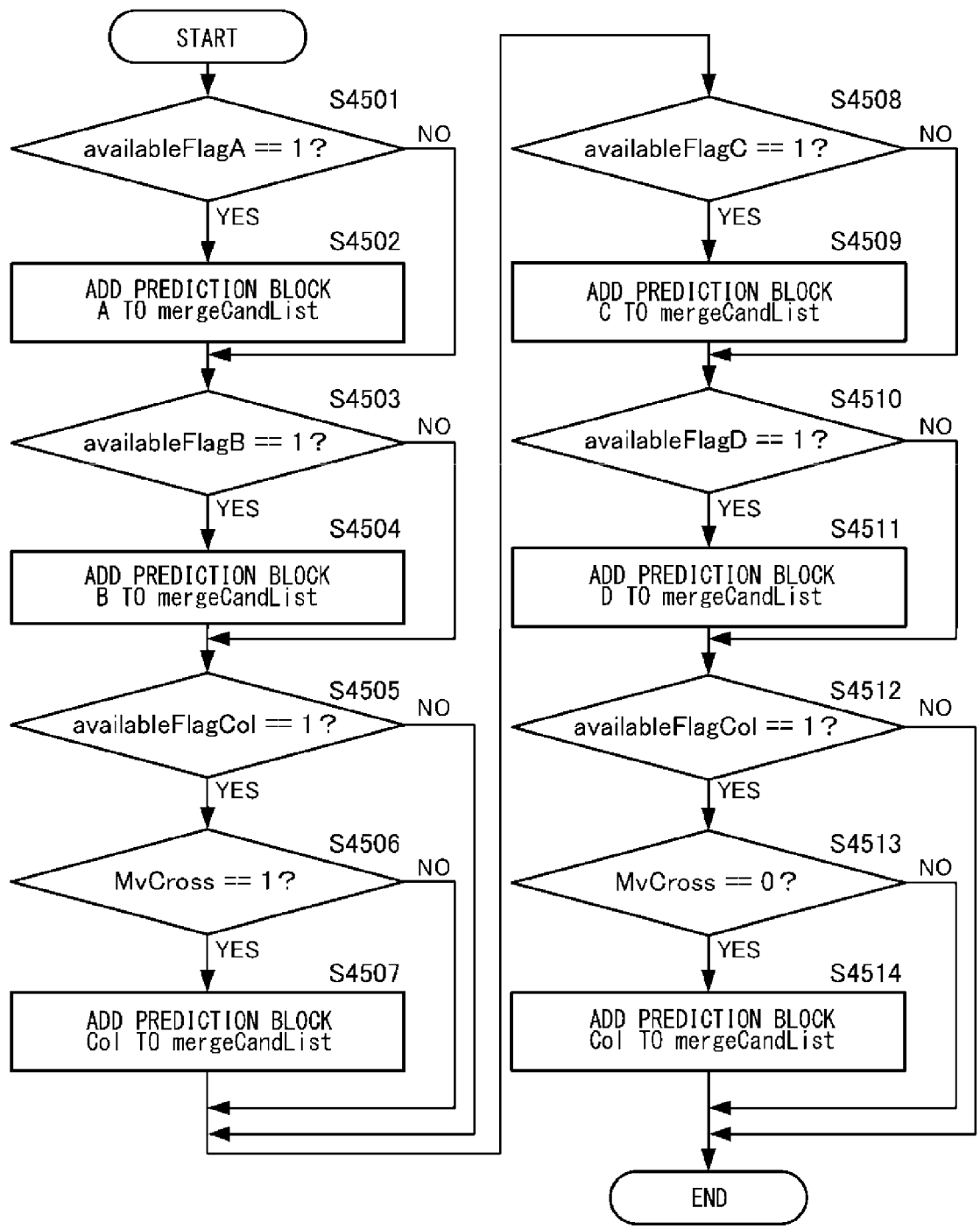
FIG. 45 is a flowchart showing the operation in the merge mode.

If mv_list_adaptive_idx_flag is 1 (YES in S4202, YES in S4203), merge candidate prediction blocks are added in the merge candidate list according to the processing steps of the flowchart shown in FIG. 45 such that merge candidates considered to be relatively more reliable are given priority (S4206).

As described above, the value of the second flag mv_temporal_high_priority_flag is coded for each frame or slice for the purpose of improving the coding efficiency, changing the value adaptively. The code size of the merge indices can be reduced by setting mv_temporal_high_priority_flag to true (1) if the distance between the picture subject to coding/decoding and the closest reference picture is small, and setting the flag to false (0) if the distance between the picture subject to coding/decoding and the reference picture is large. In case that the distance is relatively small, a decision is made that the merge candidate from a different point of time is relatively more suitable as the candidate. For example, if the frame rate is 30 Hz, and the distance between the picture subject to coding/decoding and the closest reference picture is X frames (X=1-3) or less, mv_temporal_high_priority_flag may be set to true (1). If the distance between the picture subject to coding/decoding and the reference picture is more than X frames, mv_temporal_high_priority_flag may be set to true (0). In this way, the code size of the merge indices is reduced. By modifying the threshold X depending on the content of sequence, the code size is reduced more efficiently. In the case of a motion-rich and complicated sequence, the coding efficiency is improved by decreasing the threshold X and thereby lowering the order of priority of the merge candidate in the temporal dimension.

FIG. 43 is a flowchart showing the processing steps of adding merge candidate prediction blocks in the merge candidate list mergeCandList if the flag mv_temporal_high_priority_flag coded for each slice, sequence, or picture is 1, and if mv_list_adaptive_idx_flag is 0 (YES in S4201, NO in S4202).

First, if availableFlagA is 1 (YES in S4301), the prediction block A is added as a merge candidate at the top of the merge candidate list mergeCandList (S4302). Subsequently, if availableFlagB is 1 (YES in S4303), the prediction block B is added as a merge candidate at the end of the merge candidate list mergeCandList (S4304). Subsequently, if availableFlagCol is 1 (YES in S4305), the prediction block Col is added as a merge candidate at the end of the merge candidate list mergeCandList (S4306). Subsequently, if availableFlagC is 1 (YES in S4307), the prediction block C is added as a merge candidate at the end of the merge candidate list mergeCandList (S4308). Subsequently, if availableFlagD is 1 (YES in S4309), the prediction block D is added as a merge candidate at the end of the merge candidate list mergeCandList (S4310).

FIG. 44 is a flowchart showing the processing steps of adding merge candidate prediction blocks in the merge candidate list mergeCandList if the flag mv_temporal_high_priority_flag coded for each slice, sequence, or picture is 1, and if mv_list_adaptive_idx_flag is 0 (NO in S4201, NO in S4203).

First, if availableFlagA is 1 (YES in S4401), the prediction block A is added as a merge candidate at the top of the merge candidate list mergeCandList (S4402). Subsequently, if availableFlagB is 1 (YES in S4403), the prediction block B is added as a merge candidate at the end of the merge candidate list mergeCandList (S4404). Subsequently, if availableFlagC is 1 (YES in S4405), the prediction block C is added as a merge candidate at the end of the merge candidate list mergeCandList (S4406). Subsequently, if availableFlagD is 1 (YES in S4407), the prediction block D is added as a merge candidate at the end of the merge candidate list mergeCandList (S4408). Subsequently, if availableFlagCol is 1 (YES in S4409), the prediction block Col is added as a merge candidate at the end of the merge candidate list mergeCandList (S4410).

FIG. 45 is a flowchart showing the processing steps of adding merge candidate prediction blocks in the merge candidate list mergeCandList if the flag mv_temporal_high_priority_flag coded for each slice, sequence, or picture is 0 or 1, and if mv_list_adaptive_idx_flag is 1 (YES in S4201, YES in S4202).

First, if availableFlagA is 1 (YES in S4501), the prediction block A is added as a merge candidate at the top of the merge candidate list mergeCandList (S4502). Subsequently, if availableFlagB is 1 (YES in S4503), the prediction block B is added as a merge candidate at the end of the merge candidate list mergeCandList (S4504). Subsequently, if availableFlagCol is 1 and MvXCross is 1 (YES in S4505, YES in S4506), the prediction block Col is added as a merge candidate at the end of the merge candidate list mergeCandList (S4507). Subsequently, if availableFlagC is 1 (YES in S4508), the prediction block C is added as a merge candidate at the end of the merge candidate list mergeCandList (S4509). Subsequently, if availableFlagD is 1 (YES in S4510), the prediction block D is added as a merge candidate at the end of the merge candidate list mergeCandList (S4511). Subsequently, if availableFlagCol is 1 and MvXCross is 0 (YES in S4511, YES in S4513), the prediction block Col is added as a merge candidate at the end of the merge candidate list mergeCandList (S4514).

In the processing steps of FIG. 42 of adding motion vector predictor candidates in the merge candidate list mergeCandList, the code size is reduced by adding the temporal prediction block Col toward the top of the merge candidate list in preference to the prediction blocks C, D neighboring at top right and bottom left, respectively, if mv_temporal_high_priority_flag is 1, and adding the prediction blocks C, D neighboring at top right and bottom left, respectively, in preference to the temporal prediction block Col, if mv_temporal_high_priority_flag is 0.

In the processing steps of FIG. 45 of adding prediction blocks in the merge candidate list mergeCandList, it is determined that the merge candidate for which the flag MvCross is set to 1, i.e., the merge candidate using the motion vector derived from the motion vector mvCol of ColPu that refers to a reference picture, intersecting the picture that includes the prediction block subject to coding/decoding, is relatively more suitable as a merge candidate than the merge candidate for which the flag MvCross is set to 0, i.e., the merge candidate using a motion vector derived from the motion vector mvCol of ColPu that refers to a reference picture without intersecting the picture that includes the prediction block subject to coding/decoding. The code size is reduced by adding the temporal prediction block Col toward the top of the merge candidate list, giving the block Col relatively higher priority, when MvCross is set to 1, and adding the temporal prediction block Col toward the end of the merge candidate list, giving the block Col relatively lower priority, when MvCross is set to 0. In other words, the code size is reduced by modifying the order of priority depending on the value of coding information of the prediction block Col in the picture at a different point of time and modifying the order or adding blocks to the merge candidate list accordingly.

In the merge mode, the prediction block A neighboring to the left and the prediction block B neighboring above are likely to undergo similar motion as the prediction block subject to coding/decoding. Accordingly, the block A or block B is added toward the top of the merge candidate list in preference to the other prediction blocks C, D, Col.

Figure 46:
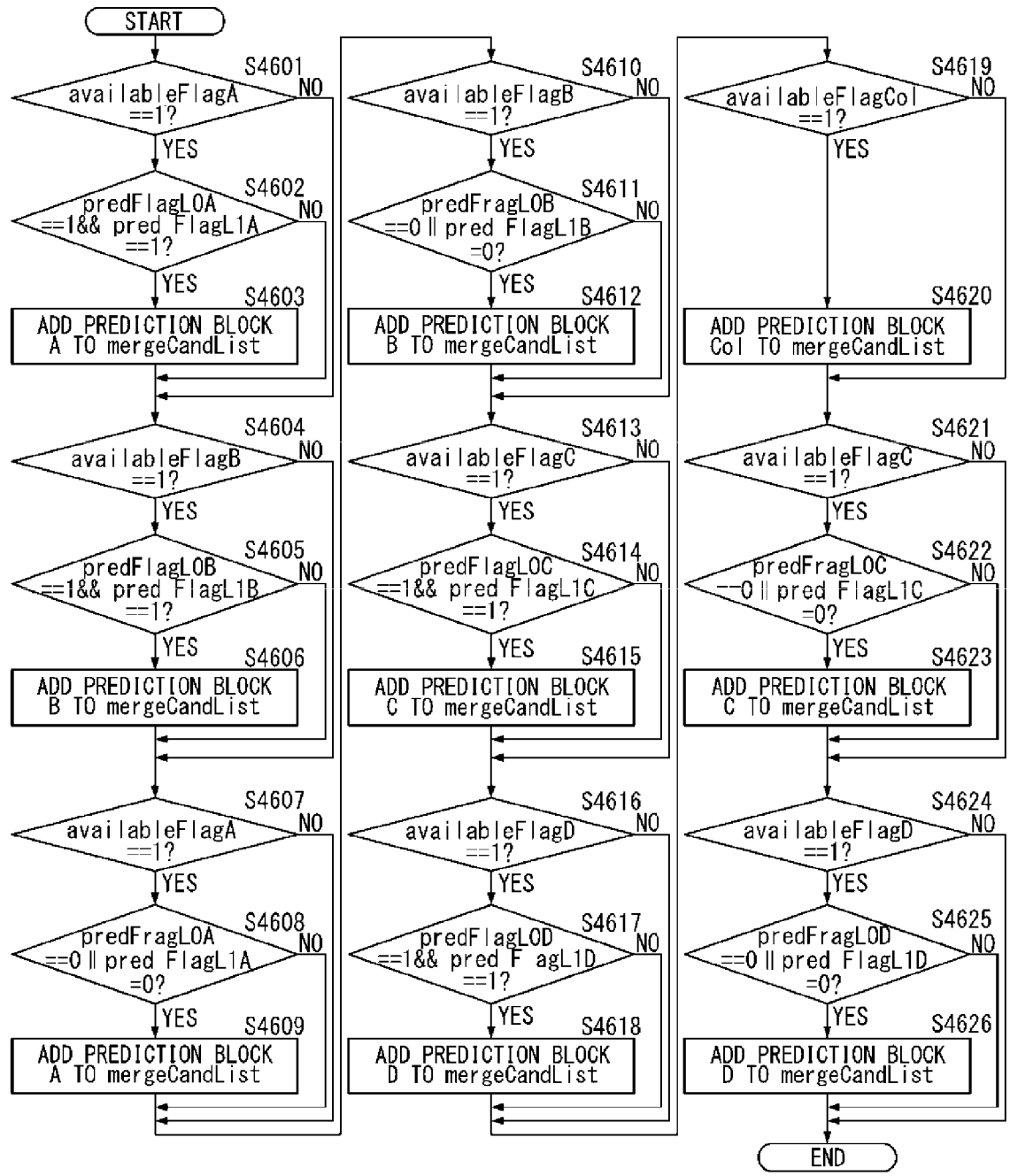
FIG. 46 is a flowchart showing the operation in the merge mode.

Merge candidates may be added through the processing steps of FIG. 46 instead of those of FIG. 45.

FIG. 46 is a flowchart showing the processing steps of adding merge candidate prediction blocks in the merge candidate list mergeCandList if the flag mv_temporal_high_priority_flag coded for each slice, sequence, or picture is 0 or 1, and if mv_list_adaptive_idx_flag is 1 (YES in S4202, YES in S4203).

First, if availableFlagA is 1 and predFlagL0A and predFlagL1A are both 1 (YES in S4601, YES in S4602), the prediction block A for bi-prediction is added as a merge candidate at the top of the merge candidate list mergeCandList (S4603). Subsequently, if availableFlagB is 1 and predFlagL0B and predFlagL1B are both 1 (YES in S4604, YES in S4605), the prediction block B for bi-prediction is added as a merge candidate at the end of the merge candidate list mergeCandList (S4606). Subsequently, if availableFlagA is 1 and one of predFlagL0A and predFlagL1A is 0 (YES in S4607, YES in S4608), the prediction block A for non-bi-prediction is added as a merge candidate at the end of the merge candidate list mergeCandList (S4609). Subsequently, if availableFlagB is 1 and one of predFlagL0B and predFlagL1B is 0 (YES in S4610, YES in S4611), the prediction block B for non-bi-prediction is added as a merge candidate at the end of the merge candidate list mergeCandList (S4612). Subsequently, if availableFlagC is 1 and predFlagL0C and predFlagL1C are both 1 (YES in S4613, YES in S4614), the prediction block C for bi-prediction is added as a merge candidate at the end of the merge candidate list mergeCandList (S4615). Subsequently, if availableFlagD is 1 and predFlagL0D and predFlagL1D are both 1 (YES in S4616, YES in S4617), the prediction block D for bi-prediction is added as a merge candidate at the end of the merge candidate list mergeCandList (S4618). Subsequently, if availableFlagCol is 1 (YES in S4619), the prediction block Col is added as a merge candidate at the end of the merge candidate list mergeCandList (S4620). Subsequently, if availableFlagC is 1 and one of predFlagL0C and predFlagL1C is 0 (YES in S4621, YES in S4622), the prediction block C for non-bi-prediction is added as a merge candidate at the end of the merge candidate list mergeCandList (S4623). Subsequently, if availableFlagD is 1 and one of predFlagL0D and predFlagL1D is 0 (YES in S4624, YES in S4625), the prediction block C for non-bi-prediction is added as a merge candidate at the end of the merge candidate list mergeCandList (S4626).

In the processing steps of FIG. 46 of adding prediction blocks in the merge candidate list mergeCandList, it is determined that the merge candidate for which the prediction flag predFlagL0N and predFlagL1N of the neighboring prediction block N (N is A, B, C, D) are both set to 1, i.e., the merge candidate in which motion compensation is performed using bi-prediction is relatively more suitable as a merge candidate than the merge candidate for which one of the prediction flags predFlagL0N and predFlagL1N of the neighboring prediction block N (N is A, B, C, D) is set to 0, i.e., the merge candidate in which motion compensation is performed using non-bi-prediction (i.e., L0 prediction or L1 prediction). The code size is reduced by adding the merge candidate in which bi-prediction is performed toward the top of the merge candidate list, giving such a candidate relatively higher priority, and adding the merge candidate in which bi-prediction is not performed toward the end of the merge candidate list, giving such a candidate relatively lower priority. In other words, the code size is reduced by modifying the order of priority depending on the value of coding information of the neighboring prediction block N Col and modifying the order or adding candidates to the merge candidate list accordingly.

Figure 47:
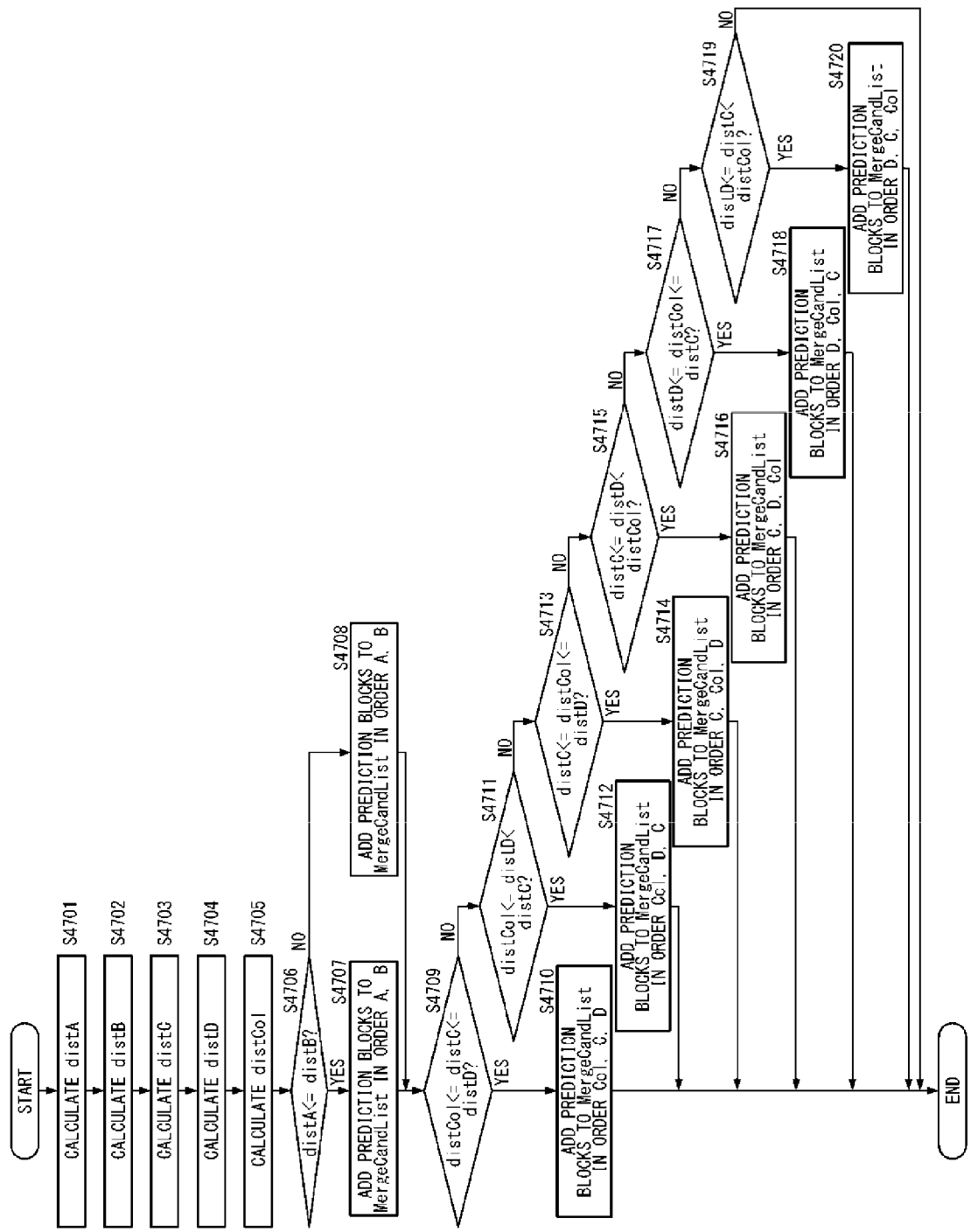
FIG. 47 is a flowchart showing the operation in the merge mode.
Figure 48A:
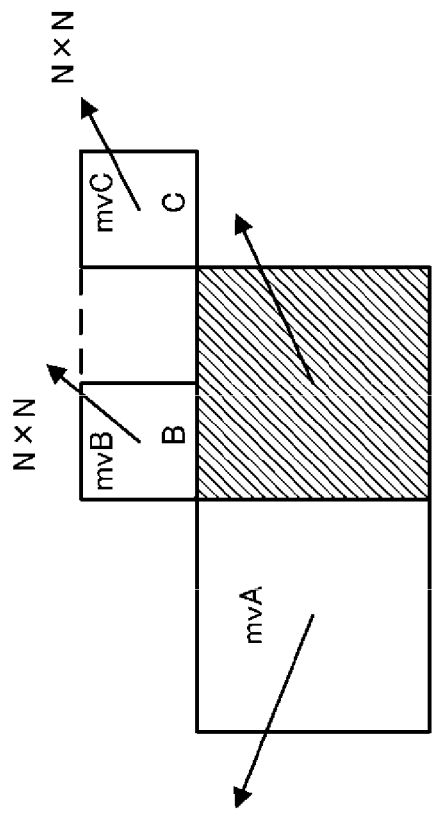
FIGS. 48A-48D show a method of deriving a motion vector predictor according to the related art.
Figure 48B:
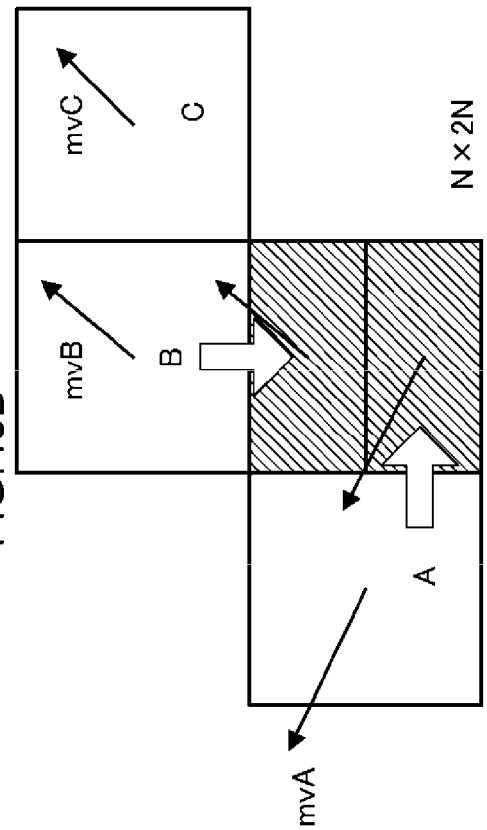
Figure 48C:
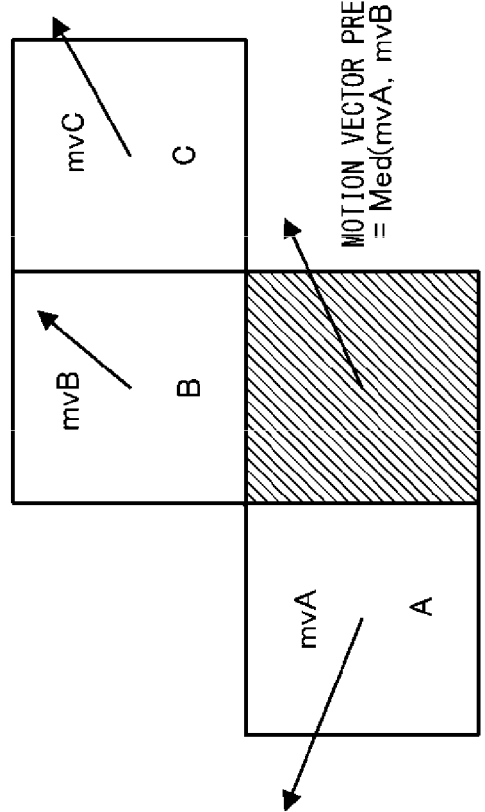
Figure 48D:
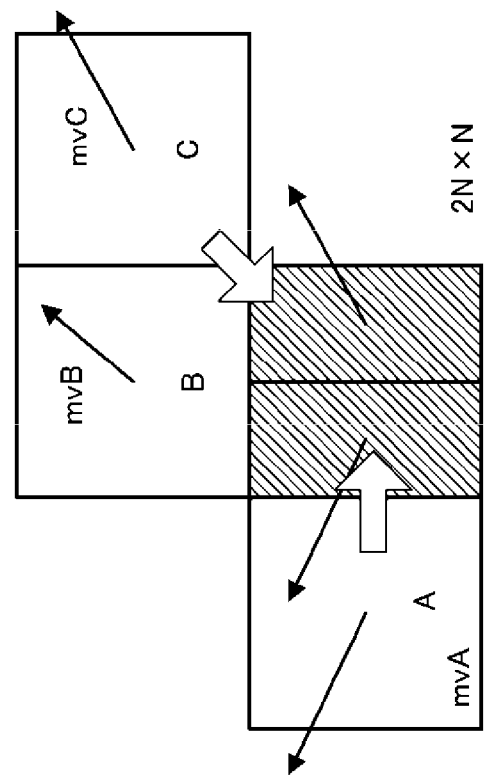

Merge candidates may be added through the processing steps of FIG. 47 instead of those of FIG. 45 or FIG. 46 such that the candidates are arranged according to priority depending on the distance between the picture subject to coding/decoding and the reference picture of the merge candidate.

FIG. 47 is a flowchart showing the processing steps of adding merge candidate prediction blocks in the merge candidate list mergeCandList if the flag mv_temporal_high_priority_flag coded for each slice, sequence, or picture is 0 or 1, and if mv_list_adaptive_idx_flag is 1 (YES in S4202, YES in S4203).

First, an absolute value of a difference between POC of the picture subject to coding/decoding and POC of the reference picture used for inter prediction in the prediction block A is derived and is defined as an inter prediction inter-picture distance distA (S4701). Similarly, absolute values of differences between POC of the picture subject to coding/decoding and POC of the reference picture used for inter prediction in the prediction blocks B, C, D, Col are derived and are defined as inter prediction inter-picture distances distB, distC, distD, distCol, respectively (S4701-S4705). If bi-prediction is performed in the prediction block N (N=A, B, C, D, or Col), the L0 inter prediction inter-picture distance and the L1 inter prediction inter-picture distance are derived. The smaller of the distances is selected and is defined as the inter prediction inter-picture distance distN (N=A, B, C, D, or Col). If L0 prediction or L1 prediction is performed in the prediction block N (N=A, B, C, D, or Col), the L0 inter prediction inter-picture distance or the L1 inter prediction inter-picture distance is derived, depending on which prediction is used. The smaller of the distances is selected and is defined as the inter prediction inter-picture distance distN (N=A, B, C, D, or Col).

If the prediction block N (N=A, B, C, D, or Col) is not available, and if intra prediction is used, the inter prediction inter-picture distance distN (N=A, B, C, D, or Col) is set to the maximum value that distN can take.

Subsequently, the merge candidates A, B, C, D, and Col are added to the merge candidate list mergeCandList in accordance with the derived values of the inter prediction inter-picture distances distA, distB, distC, distD, and distCol of the prediction blocks A, B, C, D, Col (S4706-S4720).

First, the merge candidate prediction blocks A, B are added to the merge candidate list mergeCandList in the ascending order of inter prediction inter-picture distances distA, distB (S4706-S4708).

The value of the inter prediction inter-picture distance distA of the prediction block A and the value of the inter prediction inter-picture distance distB of the prediction block B are compared (S4706). If distA is less than distB, the prediction blocks A, B are added to the merge candidate list mergeCandList in the stated order (S4707). In other words, the prediction block A is added and then the prediction block B is added behind the block A. If the value of distB is smaller than the value of distA, the prediction blocks B, A are added in the merge candidate list mergeCandList in the stated order (S4708).

Subsequently, the merge candidate prediction blocks C, D, Co are added to the merge candidate list mergeCandList in the ascending order of inter prediction inter-picture distances distC, distD, distCol (S4709-S4720).

In the processing steps of FIG. 47 of adding prediction blocks in the merge candidate list mergeCandList, it is determined that the merge candidate for which the distance between the picture including the prediction block subject to coding/decoding and the reference picture of the merge candidate is small is relatively more suitable as a merge candidate than the merge candidate for which the distance between the picture including the prediction block subject to coding/decoding and the reference picture of the merge candidate is large. The code size is reduced by adding the merge candidate with a smaller distance toward the top of the merge candidate list in preference to the merge candidate with a large distance. In other words, the code size is reduced by modifying the order of priority depending on the value of coding information of the neighboring prediction block N Col and modifying the order or adding candidates to the merge candidate list accordingly.

In the merge mode, the coding information of the merge candidate prediction blocks may be checked so that the candidates are arranged in the descending order of richness of the coding information. Alternatively, the size of the merge candidate prediction blocks may be checked so that the candidates are arranged in the descending order of size.

Referring back to FIG. 38, the coding information selection unit 133 of the inter prediction information estimation unit 104 of the moving picture coding device selects the optimum candidate from the candidates added in the merge candidate list and outputs the merge index and the coding information corresponding to the merge index.

For selection of the optimum candidate, a similar method as used in the prediction method decision unit 106 may be used. The code size and coding distortion for each merge candidate are derived and the coding information with the smallest code size and coding distortion is identified. The merge index merge_idx of each merge candidate is coded and the code size of the coding information is derived. Further, the code size of a prediction residual signal is derived for each merge candidate. The prediction residual signal indicates an error between the motion compensated prediction signal derived from performing motion compensation in accordance with the coding information of each merge candidate using the method performed in the motion compensation prediction unit 105 and the picture signal subject to coding supplied from the picture memory 101. The total generated code size is determined by deriving a sum of the code size of the coding information (merge index) and the code size of the prediction residual signal. The derived size is defined as the first evaluation value.

The picture difference thus coded is then decoded for evaluation as to the amount of distortion. Coding distortion is derived as a ratio indicating an error from the original picture produced as a result of coding. By comparing the total generated code size and coding distortion of a given merge candidate with those of another, the coding information with the smallest code size and coding distortion is identified. The merge index corresponding to the identified coding information is coded as a flag merge_idx defined in the second syntax pattern for each prediction block. While it is desirable to derive the generated code size by simulating the coding steps, the generated code size may be determined by approximate derivation or rough estimation.

Meanwhile, referring to FIG. 39, the coding information selection unit 233 of the inter prediction information estimation unit 205 of the moving picture coding device selects the coding information corresponding to the supplied merge index from merge candidates added in the merge candidate list, supplies the selected coding information to the motion compensation prediction unit 206, and stores the selected coding information in the coding information storage memory 209.

As described above, according to the motion vector prediction method of the embodiment, the code size is reduced by performing prediction from a motion vector for a prediction block already coded and coding a vector difference between the motion vector of a target block and a predicted value, for the purpose of improving the efficiency of coding a motion vector for moving picture coding whereby a picture is partitioned into rectangular blocks and motion estimation and compensation is performed between pictures in units of blocks. In this process, a plurality of motion vector predictors obtained as a result are arranged according to priority before being added in the motion vector predictor list. As described in the embodiment, the sequence of addition may be modified depending on the order of priority. Alternatively, the motion vector predictors may be added in a predefined order and are then rearranged in the list in accordance with the order of priority. These approaches are also within the scope of the present invention. For example, the motion vector predictor derived from the first prediction block group A neighboring to the left may be temporarily added with the index 0 in the motion vector predictor list, the motion vector predictor derived from the second prediction block group B neighboring above may be temporarily added with the index 1, and the motion vector predictor derived from the third prediction block group C at a different point of time may be temporarily added with the index 2. The motion vector predictors may be subsequently rearranged as needed in accordance with the order of priority.

In further accordance with the motion vector prediction method of the embodiment, the code size can be reduced by using the coding information of blocks already coded, for the purpose of improving the efficiency of coding information for moving picture coding whereby a picture is partitioned into rectangular blocks and motion estimation and compensation is performed between pictures in units of blocks. In this process, a plurality of merge candidates obtained as a result are arranged according to priority before being added in the merge candidate list. As described in the embodiment, the sequence of addition may be modified depending on the order of priority. Alternatively, the merge candidates may be added in a predefined order and are then rearranged in the list in accordance with the order of priority. These approaches are also within the scope of the present invention. For example, the merge candidate A may be temporarily added at a position in the merge candidate list with the index 0, the merge candidate B may be temporarily added at a position with the index 1, and the merge candidate Col may be temporarily added at a position with the index 2, the merge candidate C may be temporarily added at a position with the index 3, and the merge candidate D may be temporarily added at a position with the index 4. The merge candidates may be subsequently rearranged as needed in accordance with the order of priority. Information on a merge candidate added in the merge candidate list may be the entirety of the coding information of the merge candidate. Alternatively, a pointer or address information pointing to a memory that can be referred to for the coding information of the merge candidate may be added in the merge candidate list.

Further embodiments of the moving picture coding device according to the present invention include the following.

A moving picture coding device adapted to code moving pictures in units of blocks obtained by partitioning each picture of the moving pictures, by using motion compensation, comprising: a motion vector predictor candidate generation unit configured to generate a plurality of motion vector predictor candidates by prediction from a coded block neighboring a block subject to coding within the same picture as the block subject to coding, or from a coded block located at the same position as or in the neighborhood of the block subject to coding in a picture different from that of the block subject to coding, wherein the motion vector predictor candidate generation unit adds motion vector predictor candidates in a motion vector predictor candidate list such that the order of priority is changed in units of pictures or slices.

A moving picture coding device adapted to code moving pictures in units of blocks obtained by partitioning each picture of the moving pictures, by using motion compensation, comprising: a motion vector predictor candidate generation unit configured to generate a plurality of motion vector predictor candidates by prediction from a coded block neighboring a block subject to coding within the same picture as the block subject to coding, or from a coded block located at the same position as or in the neighborhood of the block subject to coding in a picture different from that of the block subject to coding; wherein the motion vector predictor candidate generation unit adds motion vector predictor candidates in a motion vector predictor candidate list such that the order of priority is changed in units of blocks.

A moving picture coding device adapted to code moving pictures in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a coded block neighboring a block subject to coding within the same picture as the block subject to coding, or of a coded block located at the same position as or in the neighborhood of the block subject to coding in a picture different from that of the block subject to coding, wherein the inter prediction information generation unit adds merge candidates in a merge candidate list such that the order of priority is changed in units of pictures or slices.

A moving picture coding device adapted to code moving pictures in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a coded block neighboring a block subject to coding within the same picture as the block subject to coding, or of a coded block located at the same position as or in the neighborhood of the block subject to coding in a picture different from that of the block subject to coding, wherein the inter prediction information generation unit adds merge candidates in a merge candidate list such that the order of priority is changed in units of blocks.

A moving picture coding device adapted to code moving pictures in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a coded block neighboring a block subject to coding within the same picture as the block subject to coding, or of a coded block located at the same position as or in the neighborhood of the block subject to coding in a picture different from that of the block subject to coding, wherein, when a merge candidate located in a spatial dimension is subjected to bi-predictive inter prediction, the inter prediction information generation unit adds merge candidates in the merge candidate list, giving priority to the merge candidate located in the spatial dimension.

A moving picture coding device adapted to code moving pictures in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a coded block neighboring a block subject to coding within the same picture as the block subject to coding, or of a coded block located at the same position as or in the neighborhood of the block subject to coding in a picture different from that of the block subject to coding, wherein, the inter prediction information generation unit adds merge candidates in the merge candidate list, giving higher priority to a merge candidate in which a distance between a picture subject to coding and a reference picture is relatively small than the other merge candidates.

A moving picture coding device adapted to code moving pictures in units of blocks obtained by partitioning each picture of the moving pictures, by using motion compensation, comprising: a motion vector predictor candidate generation unit configured to generate a plurality of motion vector predictor candidates by prediction from a coded block neighboring a block subject to coding within the same picture as the block subject to coding, or from a coded block located at the same position as or in the neighborhood of the block subject to coding in a picture different from that of the block subject to coding, wherein the motion vector predictor candidate generation unit scans prediction blocks in the spatial dimension such that the motion vector predictor candidate generation unit processes prediction blocks in a prediction block group neighboring to the left and in a prediction block group neighboring above, according to conditions 1 through 4 below in the stated order, 1: whether there is found a motion vector that is predicted by using the same reference list and the same reference picture as that of a coding mode selected in the prediction block subject to coding; 2: whether there is found a motion vector that is predicted by using a reference list different from that of the coding mode selected in the prediction block subject to coding and using the same reference picture as that of the coding mode selected in the prediction block subject to coding; 3: whether there is found a motion vector that is predicted by using the same reference list as that of the coding mode selected in the prediction block subject to coding and using a reference picture different from that of the coding mode selected in the prediction block subject to coding; and 4: whether there is found a motion vector that is predicted by using a reference list different from that of the coding mode selected in the prediction block subject to coding and using a reference picture different from that of the coding mode selected in the prediction block subject to coding.

The moving picture coding device, wherein prediction blocks are scanned in the spatial dimension such that, when the first prediction block is processed according to the first condition, a neighboring prediction block is then processed according to the first condition, followed by processing of the subsequent neighboring prediction blocks according to the second, third, and fourth conditions successively.

The moving picture coding device, wherein prediction blocks are scanned in the spatial dimension such that, when the first prediction block is processed according to the first and second of the four conditions, a neighboring prediction block is then processed according to the first and second conditions, and, when the first prediction block is processed according to the third and fourth conditions, the subsequent neighboring prediction blocks are processed according to the conditions successively.

The moving picture coding device, wherein prediction blocks are scanned in the spatial dimension such that, when the first prediction block is processed according to the first of the four conditions, a neighboring prediction block is then processed according to the first condition, and, when the first prediction block is processed according to the second, third, and fourth conditions, the subsequent neighboring prediction blocks are processed according to the conditions successively.

The moving picture coding device, wherein prediction blocks are scanned in the spatial dimension such that, when none of the conditions is met by the first prediction block, it is determined that no motion vectors that meet a condition is available in the prediction block, whereupon the subsequent neighboring prediction blocks are successively processed to find whether any of the four conditions is met.

Further embodiments of the moving picture coding device according to the present invention include the following.

A moving picture decoding device adapted to decode a bitstream in which moving pictures are coded in units of blocks obtained by partitioning each picture of the moving pictures, by using motion compensation, comprising: a motion vector predictor candidate generation unit configured to generate a plurality of motion vector predictor candidates by prediction from a coded block neighboring a block subject to decoding within the same picture as the block subject to decoding, or from a decoded block located at the same position as or in the neighborhood of the block subject to decoding in a picture different from that of the block subject to decoding, wherein the motion vector predictor candidate generation unit adds motion vector predictor candidates in a motion vector predictor candidate list such that the order of priority is changed in units of pictures or slices.

A moving picture decoding device adapted to decode a bitstream in which moving pictures are coded in units of blocks obtained by partitioning each picture of the moving pictures, by using motion compensation, comprising: a motion vector predictor candidate generation unit configured to generate a plurality of motion vector predictor candidates by prediction from a coded block neighboring a block subject to decoding within the same picture as the block subject to decoding, or from a decoded block located at the same position as or in the neighborhood of the block subject to decoding in a picture different from that of the block subject to decoding, wherein the motion vector predictor candidate generation unit adds motion vector predictor candidates in a motion vector predictor candidate list such that the order of priority is changed in units of blocks.

A moving picture decoding device adapted to decode a bitstream in which moving pictures are coded in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a decoded block neighboring a block subject to decoding within the same picture as the block subject to decoding, or of a decoded block located at the same position as or in the neighborhood of the block subject to decoding in a picture different from that of the block subject to decoding, wherein the inter prediction information generation unit adds merge candidates in a merge candidate list such that the order of priority is changed in units of pictures or slices.

A moving picture decoding device adapted to decode a bitstream in which moving pictures are coded in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a decoded block neighboring a block subject to decoding within the same picture as the block subject to decoding, or of a decoded block located at the same position as or in the neighborhood of the block subject to decoding in a picture different from that of the block subject to decoding, wherein the inter prediction information generation unit adds merge candidates in a merge candidate list such that the order of priority is changed in units of blocks.

A moving picture decoding device adapted to decode a bitstream in which moving pictures are coded in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a decoded block neighboring a block subject to decoding within the same picture as the block subject to decoding, or of a decoded block located at the same position as or in the neighborhood of the block subject to decoding in a picture different from that of the block subject to decoding, wherein, when a merge candidate located in a spatial dimension is subjected to bi-predictive inter prediction, the inter prediction information generation unit adds merge candidates in the merge candidate list, giving priority to the merge candidate located in the spatial dimension.

A moving picture decoding device adapted to decode a bitstream in which moving pictures are coded in units of blocks obtained by partitioning each picture of the moving pictures, by using motion compensation, comprising: an inter prediction information generation unit configured to generate merge candidates that are coding information including a plurality of items of inter prediction information, by referring to coding information including inter prediction information of a decoded block neighboring a block subject to decoding within the same picture as the block subject to decoding, or of a decoded block located at the same position as or in the neighborhood of the block subject to decoding in a picture different from that of the block subject to decoding, wherein, the inter prediction information generation unit adds merge candidates in the merge candidate list, giving priority to a merge candidate in which a distance between a picture subject to coding and a reference picture is relatively small.

A moving picture decoding device adapted to decode a bitstream in which moving pictures are coded in units of blocks obtained by partitioning each picture of the moving pictures, by using motion compensation, comprising: a motion vector predictor candidate generation unit configured to generate a plurality of motion vector predictor candidates by prediction from a coded block neighboring a block subject to decoding within the same picture as the block subject to decoding, or from a decoded block located at the same position as or in the neighborhood of the block subject to decoding in a picture different from that of the block subject to decoding, wherein the motion vector predictor candidate generation unit scans prediction blocks in the spatial dimension such that the motion vector predictor candidate generation unit processes prediction blocks in a prediction block group neighboring to the left and in a prediction block group neighboring above, according to conditions 1 through 4 below in the stated order, 1: whether there is found a motion vector that is predicted by using the same reference list and the same reference frame as that of a coding mode selected in the prediction block subject to decoding; 2: whether there is found a motion vector that is predicted by using a reference list different from that of the coding mode selected in the prediction block subject to decoding and using the same reference frame as that of the coding mode selected in the prediction block subject to decoding; 3: whether there is found a motion vector that is predicted by using the same reference list as that of the coding mode selected in the prediction block subject to decoding and using a reference frame different from that of the coding mode selected in the prediction block subject to decoding; and 4: whether there is found a motion vector that is predicted by using a reference list different from that of the coding mode selected in the prediction block subject to decoding and using a reference frame different from that of the coding mode selected in the prediction block subject to decoding.

The moving picture decoding device, wherein prediction blocks are scanned in the spatial dimension such that, when the first prediction block is processed according to the first condition, a neighboring prediction block is then processed according to the first condition, followed by processing of the subsequent neighboring prediction blocks according to the second, third, and fourth conditions successively.

The moving picture decoding device, wherein prediction blocks are scanned in the spatial dimension such that, when the first prediction block is processed according to the first and second of the four conditions, a neighboring prediction block is then processed according to the first and second conditions, and, when the first prediction block is processed according to the third and fourth conditions, the subsequent neighboring prediction blocks are processed according to the conditions successively.

The moving picture decoding device, wherein prediction blocks are scanned in the spatial dimension such that, when the first prediction block is processed according to the first of the four conditions, a neighboring prediction block is then processed according to the first condition, and, when the first prediction block is processed according to the second, third, and fourth conditions, the subsequent neighboring prediction blocks are processed according to the conditions successively.

The moving picture decoding device, wherein prediction blocks are scanned in the spatial dimension such that, when none of the conditions is met by the first prediction block, it is determined that no motion vectors that meet a condition is available in the prediction block, whereupon the subsequent neighboring prediction blocks are successively processed to find whether any of the four conditions is met.

The bitstream of moving pictures output from the moving picture coding device according to any of the embodiments has a predefined format so that it can be decoded in accordance with the coding method used in the embodiments. The moving picture decoding device compatible with the moving picture coding device is capable of decoding the bitstream of the predefined data format.

If a wired or wireless network is used to exchange bitstreams between the moving picture coding device and the moving picture decoding device, the bitstream may be converted into a data format suited to the mode of transmission over the communication channel and be transmitted accordingly. In this case, there should be provided a moving picture transmitting device for converting the bitstreams output from the moving picture coding device into coded data of a data format suited to the mode of transmission over the communication channel and for transmitting the bitstreams over the network, and a moving picture receiving device for receiving the bitstreams from the network to recover the bitstream and supplying the recovered bitstreams to the moving picture decoding device.

The moving picture transmitting device includes a memory for buffering bitstreams output from the moving picture coding device, a packet processing unit for packetizing the bitstreams, and a transmitting unit for transmitting the packetized bitstreams over the network. The moving picture receiving device includes a receiving unit for receiving the packetized coded data over the network, a memory for buffering the received coded data, and a packet processing unit for subjecting the coded data to a packet process so as to generate bitstreams and providing the generated bitstreams to the moving picture decoding device.

The above-described processes related to coding and decoding can of course be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be made available from a server via a wired or wireless network. Still alternatively, the programs may be made available in the form of data transmission over terrestrial or satellite digital broadcast systems.

Described above is an explanation based on an exemplary embodiment. The embodiment is intended to be illustrative only and it will be obvious to those skilled in the art that various modifications to constituting elements and processes could be developed and that such modifications are also within the scope of the present invention.

[Item 1]

A moving picture coding device adapted to code moving pictures in units of blocks obtained by partitioning each picture of the moving pictures, by using motion compensation, comprising: a motion vector predictor candidate generation unit configured to derive a plurality of motion vector predictor candidates by prediction from first coded prediction blocks neighboring a prediction block subject to coding within the same picture as the prediction block subject to coding, or from a second coded prediction block located at the same position as or in the neighborhood of the prediction block subject to coding in a picture different from that of the prediction block subject to coding, and to add the derived motion vector predictor candidates in a motion vector predictor candidate list; a motion vector predictor selection unit configured to select a motion vector predictor from the motion vector predictor candidate list; and a coding unit configured to code information indicating a position of the motion vector predictor candidate selected in the motion vector predictor candidate list, wherein the motion vector predictor candidate generation unit determines, for the purpose of obtaining a predetermined number of motion vector predictor candidates, which of first coded prediction blocks provides the motion vector from which to derive the motion vector predictor candidate, organizing the blocks in the order of priority, such that the motion vector predictor candidate generation unit processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to coding; condition 2: there is found a motion vector that is predicted by using a reference list different from that of the coding mode selected in the prediction block subject to coding and using the same reference picture as that of the coding mode selected in the prediction block subject to coding; condition 3: there is found a motion vector that is predicted by using the same reference list as that of the coding mode selected in the prediction block subject to coding and using a reference picture different from that of the coding mode selected in the prediction block subject to coding; and condition 4: there is found a motion vector that is predicted by using a reference list different from that of the coding mode selected in the prediction block subject to coding and using a reference picture different from that of the coding mode selected in the prediction block subject to coding.

[Item 2] The moving picture coding device according to Item 1, wherein, when a prediction block that meets condition 1 or condition 2 is found, the motion vector predictor candidate generation unit defines the found prediction block as the motion vector predictor candidate.

[Item 3] A moving picture coding method adapted to code moving pictures in units of blocks obtained by partitioning each picture of the moving pictures, by using motion compensation, comprising: generating motion vector predictor candidates by deriving a plurality of motion vector predictor candidates by prediction from a first coded prediction block neighboring a prediction block subject to coding within the same picture as the prediction block subject to coding, or from a second coded prediction block located at the same position as or in the neighborhood of the prediction block subject to coding in a picture different from that of the prediction block subject to coding, and by adding the derived motion vector predictor candidates in a motion vector predictor candidate list; selecting a motion vector predictor from the motion vector predictor candidate list; and coding information indicating a position of the motion vector predictor candidate selected in the motion vector predictor candidate list, wherein the generating of motion vector predictor candidates determines, for the purpose of obtaining a predetermined number of motion vector predictor candidates, which prediction block within the first coded prediction blocks provides the motion vector from which to derive the motion vector predictor candidate, organizing the blocks in the order of priority, such that the generating of motion vector predictor candidates processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to coding; condition 2: there is found a motion vector that is predicted by using a reference list different from that of the coding mode selected in the prediction block subject to coding and using the same reference picture as that of the coding mode selected in the prediction block subject to coding; condition 3: there is found a motion vector that is predicted by using the same reference list as that of the coding mode selected in the prediction block subject to coding and using a reference picture different from that of the coding mode selected in the prediction block subject to coding; and condition 4: there is found a motion vector that is predicted by using a reference list different from that of the coding mode selected in the prediction block subject to coding and using a reference picture different from that of the coding mode selected in the prediction block subject to coding.

[Item 4] The moving picture coding method according to Item 3, wherein, when a prediction block that meets condition 1 or condition 2 is found, the generating of motion vector predictor candidates defines the found prediction block as the motion vector predictor candidate.

[Item 5] A moving picture coding program embedded on a non-transitory computer-readable recording medium and adapted to code moving pictures in units of blocks obtained by partitioning each picture of the moving pictures, by using motion compensation, the program comprising: a motion vector predictor candidate generation module configured to derive a plurality of motion vector predictor candidates by prediction from a first coded prediction block neighboring a prediction block subject to coding within the same picture as the prediction block subject to coding, or from a second coded prediction block located at the same position as or in the neighborhood of the prediction block subject to coding in a picture different from that of the prediction block subject to coding, and to add the derived motion vector predictor candidates in a motion vector predictor candidate list; a motion vector predictor selection module configured to select a motion vector predictor from the motion vector predictor candidate list; and a coding module configured to code information indicating a position of the motion vector predictor candidate selected in the motion vector predictor candidate list, wherein the motion vector predictor candidate generation module determines, for the purpose of obtaining a predetermined number of motion vector predictor candidates, which prediction block within the first coded prediction blocks provides the motion vector from which to derive the motion vector predictor candidate, organizing the blocks in the order of priority, such that the motion vector predictor candidate generation module processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to coding; condition 2: there is found a motion vector that is predicted by using a reference list different from that of the coding mode selected in the prediction block subject to coding and using the same reference picture as that of the coding mode selected in the prediction block subject to coding; condition 3: there is found a motion vector that is predicted by using the same reference list as that of the coding mode selected in the prediction block subject to coding and using a reference picture different from that of the coding mode selected in the prediction block subject to coding; and condition 4: there is found a motion vector that is predicted by using a reference list different from that of the coding mode selected in the prediction block subject to coding and using a reference picture different from that of the coding mode selected in the prediction block subject to coding.

[Item 6] The moving picture coding program according to Item 5, wherein, when a prediction block that meets condition 1 or condition 2 is found, the motion vector predictor candidate generation module defines the found prediction block as the motion vector predictor candidate.

[Item 7] A moving picture decoding device adapted to decode a bitstream in which moving pictures are coded in units of blocks obtained by partitioning each picture of the moving pictures, by using motion compensation, comprising: a motion vector predictor candidate generation unit configured to derive a plurality of motion vector predictor candidates by prediction from first decoded prediction blocks neighboring a prediction block subject to decoding within the same picture as the prediction block subject to decoding, or from a second decoded prediction block located at the same position as or in the neighborhood of the prediction block subject to decoding in a picture different from that of the prediction block subject to decoding, and to add the derived motion vector predictor candidates in a motion vector predictor candidate list; a decoding unit configured to decode information indicating a position of the motion vector predictor candidate that should be selected in the motion vector predictor candidate list; and a motion vector predictor selection unit configured to select a motion vector predictor from the motion vector predictor candidate list, based on the decoded information indicating the position of the motion vector predictor that should be selected, wherein the motion vector predictor candidate generation unit determines, for the purpose of obtaining a predetermined number of motion vector predictor candidates, which of the first decoded prediction blocks provides the motion vector from which to derive the motion vector predictor candidate, organizing the blocks in the order of priority, such that the motion vector predictor candidate generation unit processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to decoding; condition 2: there is found a motion vector that is predicted by using a reference list different from that of the coding mode selected in the prediction block subject to decoding and using the same reference picture as that of the coding mode selected in the prediction block subject to decoding; condition 3: there is found a motion vector that is predicted by using the same reference list as that of the coding mode selected in the prediction block subject to decoding and using a reference picture different from that of the coding mode selected in the prediction block subject to decoding; and condition 4: there is found a motion vector that is predicted by using a reference list different from that of the coding mode selected in the prediction block subject to decoding and using a reference picture different from that of the coding mode selected in the prediction block subject to decoding.

[Item 8] The moving picture decoding device according to Item 7, wherein, when a prediction block that meets condition 1 or condition 2 is found, the motion vector predictor candidate generation unit defines the found prediction block as the motion vector predictor candidate.

[Item 9] A moving picture decoding method adapted to decode a bitstream in which moving pictures are coded in units of blocks obtained by partitioning each picture of the moving pictures, by using motion compensation, comprising: generating motion vector predictor candidates by deriving a plurality of motion vector predictor candidates by prediction from first decoded prediction blocks neighboring a prediction block subject to decoding within the same picture as the prediction block subject to decoding, or from a second decoded prediction block located at the same position as or in the neighborhood of the prediction block subject to decoding in a picture different from that of the prediction block subject to decoding, and by adding the derived motion vector predictor candidates in a motion vector predictor candidate list; decoding information indicating a position of the motion vector predictor candidate that should be selected in the motion vector predictor candidate list; and selecting a motion vector predictor from the motion vector predictor candidate list, based on the decoded information indicating the position of the motion vector predictor that should be selected, wherein the generating of motion vector predictor candidates determines, for the purpose of obtaining a predetermined number of motion vector predictor candidates, which of the first decoded prediction blocks provides the motion vector from which to derive the motion vector predictor candidate, organizing the blocks in the order of priority, such that the generating of motion vector predictor candidates processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to decoding; condition 2: there is found a motion vector that is predicted by using a reference list different from that of the coding mode selected in the prediction block subject to decoding and using the same reference picture as that of the coding mode selected in the prediction block subject to decoding; condition 3: there is found a motion vector that is predicted by using the same reference list as that of the coding mode selected in the prediction block subject to decoding and using a reference picture different from that of the coding mode selected in the prediction block subject to decoding; and condition 4: there is found a motion vector that is predicted by using a reference list different from that of the coding mode selected in the prediction block subject to decoding and using a reference picture different from that of the coding mode selected in the prediction block subject to decoding.

[Item 10] The moving picture decoding method according to Item 9, wherein, when a prediction block that meets condition 1 or condition 2 is found, the generating of motion vector predictor candidates defines the found prediction block as the motion vector predictor candidate.

[Item 11] A moving picture decoding program embedded on a non-transitory computer-readable recording medium and adapted to decode a bitstream in which moving pictures are coded in units of blocks obtained by partitioning each picture of the moving pictures, by using motion compensation, comprising: a motion vector predictor candidate generation module configured to derive a plurality of motion vector predictor candidates by prediction from first decoded prediction blocks neighboring a prediction block subject to decoding within the same picture as the prediction block subject to decoding, or from a second decoded prediction block located at the same position as or in the neighborhood of the prediction block subject to decoding in a picture different from that of the prediction block subject to decoding, and to add the derived motion vector predictor candidates in a motion vector predictor candidate list; a decoding module configured to decode information indicating a position of the motion vector predictor candidate that should be selected in the motion vector predictor candidate list; and a motion vector predictor selection module configured to select a motion vector predictor from the motion vector predictor candidate list, based on the decoded information indicating the position of the motion vector predictor that should be selected, wherein the motion vector predictor candidate generation module determines, for the purpose of obtaining a predetermined number of motion vector predictor candidates, which of the first decoded prediction blocks provides the motion vector from which to derive the motion vector predictor candidate, organizing the blocks in the order of priority, such that the motion vector predictor candidate generation module processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of a coding mode selected in the prediction block subject to decoding; condition 2: there is found a motion vector that is predicted by using a reference list different from that of the coding mode selected in the prediction block subject to decoding and using the same reference picture as that of the coding mode selected in the prediction block subject to decoding; condition 3: there is found a motion vector that is predicted by using the same reference list as that of the coding mode selected in the prediction block subject to decoding and using a reference picture different from that of the coding mode selected in the prediction block subject to decoding; and condition 4: there is found a motion vector that is predicted by using a reference list different from that of the coding mode selected in the prediction block subject to decoding and using a reference picture different from that of the coding mode selected in the prediction block subject to decoding.

{Item 12] The moving picture decoding program according to Item 11, wherein, when a prediction block that meets condition 1 or condition 2 is found, the motion vector predictor candidate generation module defines the found prediction block as the motion vector predictor candidate.

What is claimed is:

1. A moving picture coding device adapted to code moving pictures in units of blocks obtained by partitioning each picture of the moving pictures, comprising:
   a motion vector predictor candidate generation unit configured to derive one or more motion vector predictor candidates from motion vectors of coded prediction blocks neighboring a prediction block subject to coding within the same picture as the prediction block subject to coding, and to add the derived motion vector predictor candidates in a motion vector predictor candidate list,
   wherein the motion vector predictor candidate generation unit determines, for the purpose of obtaining a predetermined number of motion vector predictor candidates, which of the coded prediction blocks provides the motion vector from which to derive the motion vector predictor candidate, such that the motion vector predictor candidate generation unit processes, in a predetermined order, prediction blocks in a block group neighboring to the left and in a block group neighboring above, said processing being done according to conditions 1 and 2 below in the stated order and then according to conditions 3 and 4 below in the stated order,
   condition 1: there is found a motion vector that is predicted by using the same reference list and the same reference picture as that of the motion vector predictor subject to derivation in the prediction block subject to coding;
   condition 2: there is found a motion vector that is predicted by using a reference list different from that of the motion vector predictor subject to derivation in the prediction block subject to coding and using the same reference picture as that of the motion vector predictor subject to derivation in the prediction block subject to coding;
   condition 3: there is found a motion vector that is predicted by using the same reference list as that of the motion vector predictor subject to derivation in the prediction block subject to coding and using a reference picture different from that of the motion vector predictor subject to derivation in the prediction block subject to coding; and
   condition 4: there is found a motion vector that is predicted by using a reference list different from that of the motion vector predictor subject to derivation in the prediction block subject to coding and using a reference picture different from that of the motion vector predictor subject to derivation in the prediction block subject to coding;
   wherein the motion vector predictor candidate generation unit includes a processor and a memory storing software for executing by the processor.

2. A transmitting device comprising:
   a packet processing unit adapted to packetize a bitstream coded by a moving picture coding method for coding moving pictures in units of blocks obtained by partitioning each picture of the moving pictures, so as to obtain a bitstream; and
   a transmitting unit for transmitting the packetized bitstreams,
   the moving picture coding method comprising:
   deriving one or more motion vector predictor candidates from motion vectors of coded prediction blocks neighboring a prediction block subject to coding within the same picture as the prediction block subject to coding, and adding the derived motion vector predictor candidates in a motion vector predictor candidate list, wherein the deriving of one or more motion vector predictor candidates determines, for the purpose of obtaining a predetermined number of motion vector predictor candidates, which of the coded prediction blocks provides the motion vector from which to derive the motion vector predictor candidate, such that the deriving of one or more motion vector predictor candidates processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of the motion vector predictor subject to derivation in the prediction block subject to coding;

condition 2: there is found a motion vector that is predicted by using a reference list different from that of the motion vector predictor subject to derivation in the prediction block subject to coding and using the same reference picture as that of the motion vector predictor subject to derivation in the prediction block subject to coding;

condition 3: there is found a motion vector that is predicted by using the same reference list as that of the motion vector predictor subject to derivation in the prediction block subject to coding and using a reference picture different from that of the motion vector predictor subject to derivation in the prediction block subject to coding; and condition 4: there is found a motion vector that is predicted by using a reference list different from that of the motion vector predictor subject to derivation in the prediction block subject to coding and using a reference picture different from that of the motion vector predictor subject to derivation in the prediction block subject to coding.

3. A transmitting method comprising:

packetizing a bitstream coded by a moving picture coding method adapted to code moving pictures in units of blocks obtained by partitioning each picture of the moving pictures, so as to obtain a bitstream; and transmitting the packetized bitstreams, the moving picture coding method comprising:

deriving one or more motion vector predictor candidates from motion vectors of coded prediction blocks neighboring a prediction block subject to coding within the same picture as the prediction block subject to coding, and adding the derived motion vector predictor candidates in a motion vector predictor candidate list, wherein the deriving of one or more motion vector predictor candidates determines, for the purpose of obtaining a predetermined number of motion vector predictor candidates, which of the coded prediction blocks provides the motion vector from which to derive the motion vector predictor candidate, such that the deriving of one or more motion vector predictor candidates processes, in a predetermined order, prediction blocks in a block group neighboring to the left and in a block group neighboring above, said processing being done according to conditions 1 and 2 below in the stated order and then according to conditions 3 and 4 below in the stated order, condition 1: there is found a motion vector that is predicted by using the same reference list and the same reference picture as that of the motion vector predictor subject to derivation in the prediction block subject to coding;

condition 2: there is found a motion vector that is predicted by using a reference list different from that of the motion vector predictor subject to derivation in the prediction block subject to coding and using the same reference picture as that of the motion vector predictor subject to derivation in the prediction block subject to coding;

condition 3: there is found a motion vector that is predicted by using the same reference list as that of the motion vector predictor subject to derivation in the prediction block subject to coding and using a reference picture different from that of the motion vector predictor subject to derivation in the prediction block subject to coding; and condition 4: there is found a motion vector that is predicted by using a reference list different from that of the motion vector predictor subject to derivation in the prediction block subject to coding and using a reference picture different from that of the motion vector predictor subject to derivation in the prediction block subject to coding.

* * * * *